(12) United States Patent
Luby et al.

(10) Patent No.: US 9,900,166 B2
(45) Date of Patent: Feb. 20, 2018

(54) METHODS FOR DELIVERY OF FLOWS OF OBJECTS OVER BROADCAST/MULTICAST ENABLED NETWORKS

(71) Applicant: QUALCOMM Incorporated, San Diego, CA (US)

(72) Inventors: Michael George Luby, Berkeley, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 14/249,499

(22) Filed: Apr. 10, 2014

(65) Prior Publication Data

US 2014/0307734 A1    Oct. 16, 2014

Related U.S. Application Data

(60) Provisional application No. 61/811,693, filed on Apr. 12, 2013, provisional application No. 61/818,912, (Continued)

(51) Int. Cl.
 *H04L 12/18*  (2006.01)
 *H04W 4/06*  (2009.01)
 (Continued)

(52) U.S. Cl.
 CPC ............ *H04L 12/18* (2013.01); *H04L 12/189* (2013.01); *H04L 12/1868* (2013.01); (Continued)

(58) Field of Classification Search
 None
 See application file for complete search history.

(56) References Cited

U.S. PATENT DOCUMENTS

| 2005/0160345 A1* | 7/2005 | Walsh | H04L 1/1812 |
| | | | 714/776 |
| 2005/0182842 A1* | 8/2005 | Walsh | H04L 1/1607 |
| | | | 709/230 |

(Continued)

FOREIGN PATENT DOCUMENTS

| CN | 101073237 A | 11/2007 |
| CN | 101185283 A | 5/2008 |

(Continued)

OTHER PUBLICATIONS

International Search Report and Written Opinion—PCT/US2014/033838—ISA/EPO—dated Dec. 9, 2014.

(Continued)

*Primary Examiner* — Kodzovi Acolatse
(74) *Attorney, Agent, or Firm* — The Marbury Law Group, PLLC

(57) ABSTRACT

Content (e.g., multimedia streams, audio-video streams, video files, text, etc.) may be delivered to receiver devices over a broadcast channel and/or via a broadcast network via components (e.g., servers, receiver device, software applications, modules, processes, etc.) configured to communicate the content in a manner that reduces the amount of information communicated over the broadcast network, reduces the amount network bandwidth consumed by the communication, meets precise timing requirements for the individual objects that are communicated, and enables each receiver device to receive, decode, and render the content without consuming an excess amount of that receiver device's battery or processing resources.

82 Claims, 22 Drawing Sheets

Related U.S. Application Data filed on May 2, 2013, provisional application No. 61/878,368, filed on Sep. 16, 2013, provisional application No. 61/912,145, filed on Dec. 5, 2013.

(51) Int. Cl.

| | |
|---|---|
| *H04L 29/08* | (2006.01) |
| *H04N 21/00* | (2011.01) |
| *H04L 29/06* | (2006.01) |
| *H04N 21/845* | (2011.01) |
| *H04N 21/854* | (2011.01) |

(52) U.S. Cl.
CPC .......... *H04L 12/1886* (2013.01); *H04L 65/00* (2013.01); *H04L 65/608* (2013.01); *H04L 67/06* (2013.01); *H04N 21/00* (2013.01); *H04W 4/06* (2013.01); *H04L 69/22* (2013.01); *H04N 21/8456* (2013.01); *H04N 21/85406* (2013.01)

(56) References Cited

U.S. PATENT DOCUMENTS

| | | | | |
|---|---|---|---|---|
| 2005/0207415 | A1* | 9/2005 | Curcio | H04L 67/14 370/390 |
| 2006/0015568 | A1 | 1/2006 | Walsh et al. | |
| 2006/0023732 | A1* | 2/2006 | Vedantham | H04L 1/1628 370/432 |
| 2007/0204196 | A1* | 8/2007 | Watson | H04L 1/1607 714/751 |
| 2008/0031243 | A1* | 2/2008 | Gershinsky | H04L 12/1859 370/390 |
| 2008/0307041 | A1* | 12/2008 | Bouazizi | H04L 12/189 709/203 |
| 2012/0239785 | A1* | 9/2012 | Pazos | H04L 12/1881 709/219 |
| 2015/0172348 | A1* | 6/2015 | Lohmar | H04L 65/607 709/219 |

FOREIGN PATENT DOCUMENTS

| | | |
|---|---|---|
| CN | 100579129 C | 1/2010 |
| WO | 2006058544 A1 | 6/2006 |
| WO | 2006100616 A2 | 9/2006 |
| WO | 2007036032 A1 | 4/2007 |
| WO | 2013149144 A1 | 10/2013 |

OTHER PUBLICATIONS

Masinter L., "Hypertext Transfer Protocol—HTTP/1.1; rfc2616. Txt," Jun. 1, 1999, Jun. 1, 1999 (Jun. 1, 1999), XP015008399, pp. 1-177, ISSN: 0000-0003.

Stockhammer T., "MMT Delivery Protocol as Extensions of Existing Protocols," 104.MPEG Meeting; Apr. 22, 2013-Apr. 26, 2013; Incheon; (Motion Picture Expert Group or ISO/IECJTC1/SC29/WG11), No. m29250, Apr. 17, 2013 (Apr. 17, 2013), XP030057782, pp. 1-16.

Stockhammer T., "On DASH and MMT," 99. MPEG Meeting; Feb. 6, 2012-Feb. 19, 2012; San Josa CR; (Motion Picture Expert or ISO/IEC JTC1/SC29/WG11), No. M23888, Feb. 6, 2012, (Feb. 6, 2012), XP030052413, pp. 1-25.

Tanenbaum A., et al., "Computer Networks, Fourth edition", In: "Computer Networks, Fourth edition", Aug. 9, 2002 (Aug. 9, 2002), Prentice Hall International Edition, XP055178040, p. 397.

"3rd Generation Partnership Project; Technical Specification Group Services and System Aspects; Multimedia, Broadcast/Multicast Service (MBMS); Protocols and codecs ( Release 11)", 3GPP Draft; 26346-B40, 3rd Generation Partnership Project (3GPP), Mobile Competence Centre ; 650, Route Des Lucioles; F-06921 Sophia-Antipolis Cedex; France, Mar. 5, 2013 (Mar. 5, 2013), XP050710191, Retrieved from the Internet:URL:http://www.3gpp.org/ftp/tsg_sa/WG4_COD EC/Specs_update_after_SA59/ [retrieved on Mar. 5, 2013].

Nokia P.T., et al., "FLUTE—File Delivery over Unidirectional Transport; rfc6726.txt", FLUTE—File Delivery Over Unidirectional Transport; RFC6726.TXT, Internet Engineering Task Force, IETF; Standard, Internet Society (ISOC) 4, Rue Des Falaises CH—1205 Geneva, Switzerland, Nov. 6, 2012 (Nov. 6, 2012), pp. 1-46, XP015086468, [retrieved on Nov. 6, 2012].

Partial International Search Report—PCT/US2014/033838—ISA/EPO—dated Oct. 6, 2014.

Qualcomm Incorporated : "MI-EMO: Potential FLUTE Enhancements", 3GPP Draft; S4-130419, MBMS-FLUTE-Enhancements-R1, 3rd Generation Partnership Project (3GPP), Mobile Competence Centre; 650, Route Des Lucioles; F-06921 Sophia-Antipolis Cedex; France, vol. SA WG4, No. Qingdao, China; Apr. 15, 2013-Apr. 19, 2013, Apr. 14, 2013 (Apr. 14, 2013), XP050710480, Retrieved from the Internet URL: http://www.3gpp.org/ftp/tsg_sa/WG4_COD EC/TSGS4_73/Docs/ [retrieved on Apr. 14, 2013].

Qualcomm Incorporated: "MI-EMO: FLUTE Enhancemets—Design Details" FLUTE-Enhancements, 3rd Generation Partnership Project (3GPP), Mobile Competence Centre; 650, Route Des Lucioles ; F-06921 Sophia-Antipolis Cedex; France, vol. SA WG4, No. Vancouver, Canada; Sep. 23, 2013-Sep. 27, 2013, Sep. 18, 2013 (Sep. 18, 2013), XP050727617,Retrieved from the Internet:URL:http://www.3gpp.org/ftp/tsg_sa/WG4_COD EC/TSGS4_75/Docs/ [retrieved on Sep. 18, 2013].

Roca I V., "FCAST: Scalable Object Delivery on top of the ALC Protocol; draft-roca-rmt-newfcast-01. txt", Feb. 25, 2008, No. 1, Feb. 25, 2008 (Feb. 25, 2008),XP015054519,ISSN: 0000-0004.

Roca I.B., et al., "FCAST: Object Delivery for the ALC and NORM Protocols; draft-ietf-rmt-feast-08.txt", FCAST: Object Delivery for the ALC and NORM Protocols; DRAFT-IETF-RMT-FCAST-08. TXT, Internet Engineering Task Force, IETF; Standard Working Draft, Internet Society (ISOC) 4, Rue Des Falaises CH—1205, Geneva, Switzerland, Mar. 26, 2013 (Mar. 26, 2013), pp. 1-38, XP015091782,[retrieved on Mar. 26, 2013].

Watson, M., et, al. "Asynchronous Layered Coding (ALC) Protocol Instantiation", IETF RFC 5775, pp. 1-23, (Apr. 2010).

\* cited by examiner

METHODS FOR DELIVERY OF FLOWS OF OBJECTS OVER BROADCAST/MULTICAST ENABLED NETWORKS

RELATED APPLICATIONS

This application claims the benefit of priority to each of U.S. Provisional Application No. 61/811,693, entitled "Methods for Delivery of Flows of Objects over Broadcast/Multicast Enabled Networks" filed Apr. 12, 2013; U.S. Provisional Application No. 61/818,912, entitled "Methods for Delivery of Flows of Objects over Broadcast/Multicast Enabled Networks" filed May 2, 2013; U.S. Provisional Application No. 61/878,368, entitled "Methods for Delivery of Flows of Objects over Broadcast/Multicast Enabled Networks" filed Sep. 16, 2013; and U.S. Provisional Application No. 61/912,145, entitled "Methods for Delivery of Flows of Objects over Broadcast/Multicast Enabled Networks" filed Dec. 5, 2013, the entire contents of all of which are hereby incorporated by reference.

BACKGROUND

Wireless communication technologies have seen explosive growth over the past several years. Wireless service providers now offer their customers an array of services, and provide users with unprecedented levels of access to information, resources, and communications. A recent addition to wireless communication services has been the ability to broadcast television and other content to receiver devices. Multimedia forward link only (FLO) broadcast services allow users to view multimedia programming, such as television shows, as well as receive mobile editions of news, entertainment, sports, business, Internet data, data files and other content, using a mobile receiver device configured to receive the mobile broadcast transmissions. Multimedia broadcast services represent significant bandwidth that may be used for delivering a variety of services to receiver devices.

One protocol for delivering broadcast services is File Delivery over Unidirectional Transport (FLUTE), which is defined in Internet Engineering Task Force (IETF) Request for Comments (RFC) 3926 and RFC 6726. FLUTE may be used for the delivery of large and small files to many hosts, using delivery sessions of several seconds or more. For instance, FLUTE could be used for the delivery of large software updates to many hosts simultaneously. FLUTE could also be used for continuous, but segmented, data such as time-lined text for subtitling—potentially leveraging its layering inheritance from Asynchronous Layered Coding (ALC, as specified in IETF RFC 3450 and IETF RFC 5775) and Layered Coding Transport (LCT, as specified in IETF RFC 3451 and IETF RFC 5651) to scale the richness of the session to the congestion status of the network. FLUTE is also suitable for the basic transport of metadata, for example Session Description Protocol (SDP) files that enable user applications to access multimedia sessions. FLUTE can be used with both multicast and unicast delivery, but its primary application is for unidirectional multicast file delivery.

There has been a recent trend to deliver streams, e.g., video and/or audio streams, over unidirectional multicast systems as a sequence of files. For example, the primary streaming delivery mechanism in the 3GPP MBMS system has evolved over the past couple of years from RTP delivery of streams to delivery using FLUTE of DASH (MPEG Dynamic Adaptive Streaming over HTTP, as specified in ISO/IEC 23009-1 and the 3GPP version of DASH specified in TS26.247) formatted streaming content, where typically equal length durations of streaming content are formatted as DASH segment files and then each DASH segment file is delivered as an object using the FLUTE protocol. However, FLUTE was not specifically designed for such streaming applications, and thus has certain limitations in this context.

SUMMARY

The various aspects include methods of transmitting information via a broadcast network by associating a collection of related source objects with a source flow, and transmitting source objects in the collection of related source objects associated with the source flow over the broadcast network so that the source objects may be received and recovered by a receiver device based on their relationship to each other. In an aspect, the method may include determining a source flow identifier for the source flow, and including the source flow identifier in a packet that may include data of at least one source object in the collection of related source objects associated with the source flow.

In a further aspect, the method may include using a byte range in the packet to identify data in the packet. In a further aspect, the method may include including a byte range in the packet that identifies data of a source object in the packet. In a further aspect, the method may include using a transmission session identifier (TSI) field of the packet as the source flow identifier. In a further aspect, including the source flow identifier in the packet may involve including the source flow identifier in a TSI field of the packet. In a further aspect, the method may include using a combination of an Internet protocol (IP) destination address field and a user datagram protocol (UDP) port number field of the packet as the source flow identifier. In a further aspect, including the source flow identifier in the packet may include including the source flow identifier in a combination of an Internet protocol (IP) destination address field and a UDP port number field.

In a further aspect, the method may include using a codepoint (CP) field of the packet as the source flow identifier. In a further aspect, including the source flow identifier in the packet may include including the source flow identifier in a codepoint (CP) field of a data packet. In a further aspect, transmitting the collection of related source objects may include transmitting a plurality of collections of related source objects, each collection being associated with one of a plurality of different source flows, each of the plurality of different source flows including a unique source flow identifier. In this aspect, including the source flow identifier in the packet that may include data of at least one source object in the collection of related source objects associated with the source flow may include including the unique source flow identifier of the source flow in the packet that may include data of that source object.

In a further aspect, transmitting the collection of related source objects may include transmitting at least one packet that may include FEC repair data, a repair flow identifier, and a repair object identifier, the method further including associating a repair flow with one or more of the plurality of different source flows, determining the repair flow identifier for the repair flow, determining a collection of repair object identifiers for the repair flow, and determining, based at least in part on a combination of the repair flow identifier and the repair object identifier of a packet, from which of the source objects from the associated plurality of source flows the FEC repair data included in the packet is generated.

In a further aspect, the repair flow identifier is included in a TSI field. In a further aspect, the repair flow identifier is included in the combination of an Internet protocol (IP) destination address field and a UDP port number field. In a further aspect, the repair flow identifier is included in a codepoint (CP) field. In a further aspect, the repair object identifier is a transmission object identifier (TOI).

In a further aspect, the repair object identifier is an object sequence number (OSN). In a further aspect, transmitting at least one packet that may include FEC repair data may include transmitting at least one packet that may include FEC repair data in the same time interval as the packet that may include data for a corresponding source object. In a further aspect, the method may include generating FEC repair data for packets having the same repair flow identifier and same repair object identifier from two source objects in different source flows so that an amount of data received in combination from the packets having the same repair flow identifier and same repair object identifier and from packets containing data for either of the two source objects that is greater than or equal to an aggregate size of the two source objects is sufficient to decode the two source objects. In a further aspect, portions of the repair flow identifier are included in different data fields of the packet that may include FEC repair data.

In a further aspect, the method may include determining a repair flow declaration for the repair flow so that the repair flow declaration may include information suitable for signaling a relationship between the repair object identifier in the packet that may include FEC repair data and the source objects from the collection of related source objects associated with source flows from which the FEC repair data in the packet is generated. In a further aspect, the method may include using a template to signal the relationship via the repair flow declaration. In a further aspect, a portion of the repair flow declaration is transmitted to the receiver device in advance of at least one source object associated with the source flow associated with the repair flow.

In a further aspect, the method may include determining a source object identifier for each source object in the collection of related source objects, and including the source object identifier in one or more packets that include data for the source objects. In a further aspect, the method may include using a combination of the source flow identifier and the source object identifier to identify a corresponding source object in the collection of related source objects. In a further aspect, including the source object identifier in the packet that may include data may include including the source object identifier in the packet so that a combination of the source flow identifier and the source object identifier identifies a corresponding source object for which the packet carries data. In a further aspect, the method may include using a TOI as the source object identifier.

In a further aspect, the method may include using an OSN as the source object identifier. In a further aspect, the method may include transmitting FEC repair data for the collection of related source objects associated with the source flow over the broadcast network so that the source objects can be received and recovered by the receiver device based on their relationship to each other, in which each packet that may include FEC repair data for one or more of related source objects associated with the source flow may include the source flow identifier identifying the source flow for which the packet may include FEC repair data, in which each packet that may include FEC repair data for one or more of the related source objects associated with the source flow carries one or more source object identifiers of one or more source objects from which the FEC repair data carried in the packet is generated, and in which a combination of the source flow identifier and one or more source object identifiers identifies one or more source objects from the collection of related source objects associated with the source flow from which the FEC repair data carried in the packet is generated.

In a further aspect, the method may include transmitting packets carrying FEC repair data generated from the one or more source objects in the same interval of time as packets carrying data for the one or more source objects. In a further aspect, transmitting the source objects in the collection of related source objects associated with the source flow over the broadcast network may include transmitting the source objects independent of their corresponding repair objects. In a further aspect, the method may include using session description protocol (SDP) information to distinguish a source object from its corresponding repair object.

In a further aspect, at least one source object in the collection of related source objects may include a byte range of a file. In a further aspect, a uniform resource locator (URL) is associated with the file, the method further including identifying the at least one source object via the URL and the byte range. In a further aspect, at least one source object in the collection of related source objects is a file. In a further aspect, a URL is associated with the file, the method further including identifying the at least one source object via the URL. In a further aspect, at least one source object in the collection of related source objects may include a hypertext transfer protocol (HTTP) header and a byte range of a file. In a further aspect at least some of the source objects may include an HTTP header, an associated file, and an HTTP trailer.

In a further aspect, the method may include determining a source flow declaration for a collection of source objects associated with the source flow so that the source flow declaration may include information suitable for signaling relationships between a location, name, availability time, or other metadata for the collection of source objects associated with the source flow. In a further aspect, transmitting the collection of related source objects may include transmitting the collection of related source objects via multimedia broadcast multicast services (MBMS). In a further aspect, transmitting the collection of related source objects may include transmitting the collection of related source objects via file delivery over unidirectional transport (FLUTE). In a further aspect, transmitting the collection of related source objects may include transmitting the source objects without transmitting forward error correction (FEC) signaling information. In a further aspect, at least some of the source objects include an HTTP header and a byte range of a file.

The various aspects also include methods of transmitting one or more source objects over a broadcast network, including receiving portions of an entire file, generating source objects based on the received portions prior to receiving the entire file, and transmitting the generated source objects to a receiver device prior to receiving the entire file. In an aspect, transmitting the generated source objects to the receiver device prior to receiving the entire file may include transmitting data for the generated source objects in a different order than a data order of the entire file. In a further aspect, receiving portions of the entire file may include receiving portions of a file that may include a file size at the beginning of the file, and in which data of a source object is transmitted in an order such that at least some data of the file after the file size is transmitted before the file size.

In a further aspect, a source object may include an HTTP header and an associated file. In a further aspect, a source object may include an HTTP header, an associated file, and an HTTP trailer. In a further aspect, the method may include determining a source flow declaration for a collection of source objects associated with a source flow, in which the source flow declaration signals relationships between a location, name, availability time, or other metadata for the collection of source objects associated with the source flow. In a further aspect, the method may include using a template to signal relationship information in the source flow declaration.

In a further aspect, the method may include transmitting portions of the source flow declaration for the source flow to the receiver device in advance of at least one related source object associated with the source flow. In a further aspect, transmitting portions of the source flow declaration for the source flow to the receiver device in advance of at least one related source object associated with the source flow may include transmitting a portion that may include at least one of timing information, uniform resource identifier (URI), and information identifying decryption keys for source objects. In a further aspect, transmitting portions of the source flow declaration for the source flow to the receiver device in advance of at least one related source object associated with the source flow may include sending a portion of the source flow declaration out-of-band to the receiver device in advance of transmitting at least one source object associated with the source flow, and sending another portion of the source flow declaration in-band with a source object.

In a further aspect, sending another portion of the source flow declaration in-band with the source object may include sending an indication of a last portion of the data for the source object. In a further aspect, providing portions of the source flow declaration to the receiver device may include sending portions of the source flow declaration via a unidirectional transport protocol without sending a file delivery table. In a further aspect, transmitting the generated source objects to the receiver device prior to receiving the entire file may include transmitting a collection of related source objects via multimedia broadcast multicast services (MBMS). In a further aspect, transmitting the generated source objects to the receiver device prior to receiving the entire file may include transmitting a collection of related source objects via file delivery over unidirectional transport (FLUTE).

In a further aspect, transmitting a collection of related source objects may include transmitting the source objects independent of their corresponding repair objects. In a further aspect, the method may include using session description protocol (SDP) information to distinguish a source object from its corresponding repair object. In a further aspect, transmitting the generated source objects to the receiver device prior to receiving the entire file may include transmitting the source objects without transmitting FEC signaling information.

In a further aspect, the method may include performing FEC operations to protect portions of an individual source object. In a further aspect, the method may include transmitting the individual source object with multiple FEC encodings. In a further aspect, the method may include adding a TOI or OSN for a protected portion of a source object in a repair packet header, and adding a byte range of the protected portion at an end of its transport source block. In a further aspect, the method may include adding source symbols at the beginning of a portion of a source object to be protected, and adding a byte range of a protected portion in a repair packet header.

In a further aspect, the method may include adding a starting position of a byte range of a protected portion of a source object and a number of symbols that are covered by the byte range within a repair packet header, and adding a size of the protected portion in bytes or octets at an end of a transport source block. In a further aspect, transmitting the generated source objects to the receiver device prior to receiving the entire file may include delivering a source object to the receiver device via a unidirectional protocol as a combination of an HTTP entity header and an HTTP entity body so that the source object is suitable for use in the receiver device as a regularly delivered HTTP resource.

Further aspects may include a communication system including a transmitter and a computing device configured with processor-executable instructions to perform various operations corresponding to the methods discussed above.

Further aspects may include a communication system having various means for performing functions corresponding to the method operations discussed above.

Further aspects may include a non-transitory computer-readable storage medium having stored thereon processor-executable instructions configured to cause a computing device in a communication system to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
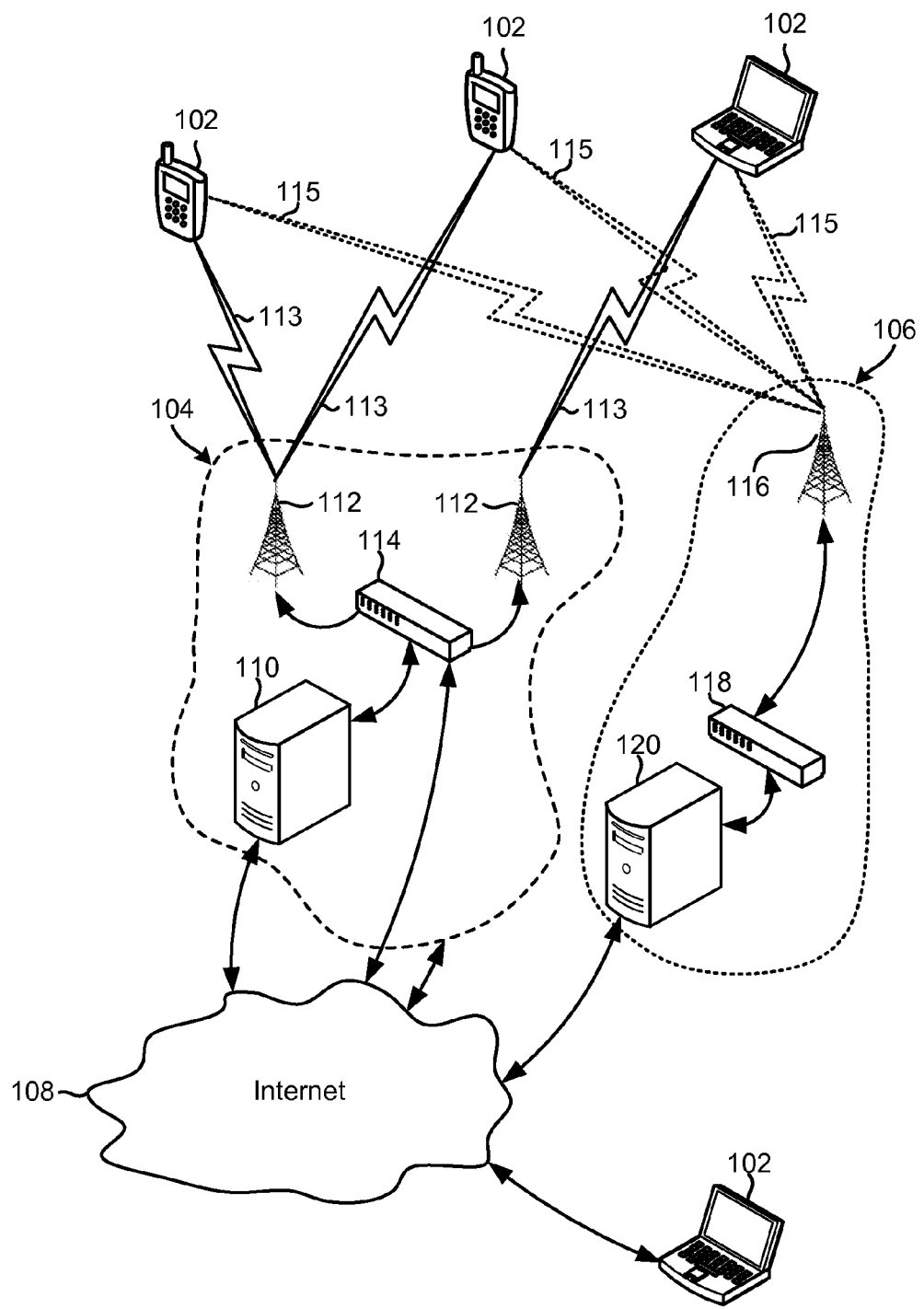
FIG. 1 is a block diagram illustrating a mobile multimedia communication system suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments may provide systems, devices, methods and non-transitory computer-readable media storing software for efficiently delivering content (e.g., multimedia streams, audio-video streams, video files, text, etc.) to receiver devices over a broadcast channel and/or via a broadcast network. The various embodiments may provide a number of features, enhancements, improvements, and benefits over existing broadcast solutions.

For example, embodiments may include components (e.g., servers, receiver devices, software applications, modules, processes, etc.) configured to communicate content to receiver devices in a manner that reduces the amount of information communicated over the broadcast network, reduces the amount network bandwidth consumed by the communication, meets precise timing requirements for the individual objects that are communicated, and enables each receiver device to receive, decode, and render the content without consuming an excess amount of that receiver device's battery or processing resources.

Embodiments may also include components configured to transmit a flow of related objects (or a collection or a group of related objects) via FLUTE and/or over a broadcast network in a single flow, stream, or communication channel so that they may be received, decoded, and processed by a receiver device based on their relationship to each other.

Embodiments may include components configured to send signaling information (e.g., information pertaining to channel setup, security, content delivery, etc.) to coordinate how the content is to be delivered over a broadcast system so as to reduce the amount of information that is communicated over the network and the amount of information that is received, decoded, and error corrected by the receiver device when rendering content.

Embodiments may include components configured to send object information to receiver devices (e.g., FLUTE receivers) in advance of when the source objects are sent to the receiver devices and/or in advance of when the source objects are received by the receiver devices.

Embodiments may include components configured to broadcast samples or objects as the information becomes available to them, and achieve very precise timing for each sample/object while remaining compatible with existing FLUTE-based solutions and systems, thereby achieving a hybrid/combination of the functionality provided by existing packet-based streaming systems and those provided by existing broadcast object-based streaming systems.

Embodiments may include components configured to accomplish FLUTE-based communications without using a file delivery table (FDT). In an embodiment, the components may be configured to communicate objects via FLUTE and/or over a broadcast network without broadcasting an FDT object, and without requiring a receiver device to receive two objects for every real object (e.g., source object) that is requested or rendered.

Embodiments may include components configured to deliver objects via FLUTE and/or over a broadcast network so that the object delivery is well aligned with the functions, operations, or requirements of existing DASH systems. In an embodiment, the components may be configured to deliver DASH content via flow object delivery mechanisms over a broadcast delivery network by broadcasting source objects so that they are compatible with, or so that they may be interpreted as, DASH segments of a DASH representation. In an embodiment, the components may be configured to signal that the FLUTE-based objects are DASH segments, and package FLUTE-based objects so that a receiver device may receive and process the FLUTE-based objects as if they were DASH segments.

Embodiments may include components configured to generate, broadcast, or receive signaling information in an object or format that includes a combination of the features/characteristics provided by existing FLUTE-based objects and DASH-based segments.

Embodiments may include components configured to perform chunk delivery operations and/or chunk reception operations.

Embodiments may include components configured to communicate variable sized source packets where the size is arbitrarily determined by the sender.

Embodiments may include components configured to perform forward error correction (FEC) object bundling operations.

Embodiments may include components configured to deliver source objects independent of their corresponding repair objects (e.g., FEC object). The components may distinguish source flows from repair flows via information carried in-band within data packets and/or via their Session Description Protocol (SDP) information.

Embodiments may include components configured to communicate source content that does not include FEC semantics (e.g., FEC Encoding ID, "no-code FEC" semantic, etc.), deliver the source content without FEC semantics, and/or deliver the source content without signaling the FEC (i.e., sending FEC signaling information). This allows receiver devices that are not equipped with FEC capabilities to receive, decode, and recover the source objects via FLUTE and/or over a broadcast network.

Embodiments may include components configured to perform FEC operations to protect portions of an individual source object or DASH segment to enable a source object to be delivered with multiple FEC encodings, and enable an object to be rendered before the entire object has been received in the receiver device.

Embodiments may include components configured to package and communicate the signaling and object information for source objects so that portions of the object may be associated with different labels. The components may be configured to use a Layered Coding Transport (LCT) codepoint field to identify a "type" of content that is carried in that packet (i.e., packets containing the original source objects).

Embodiments may include components configured to signal or identify the portions of a source object that are FEC protected using byte ranges.

Embodiments may include components configured to deliver and protect a source object based on a subset of a full source file/object, uniform resource locator (URL), or uniform resource identifier (URI).

Embodiments may include components configured to add transmission object identifier (TOI)/object sequence number (OSN) values for a protected portion of a source object in a repair packet header (e.g., in a header extension) and a byte range of the protected portion of the source block at the end of the transport source block. The components may also be configured to add or start source symbols at the beginning of a portion of the source object to be protected (instead of at the very beginning of the source object), and provide an actual byte range of the protected portion of the file, delivery, or source object within the repair packet header directly. The components may also be configured to add a starting position of the byte range and a number of symbols that are covered by the byte range within the repair packet header directly, and add a size of the portion of the protected source object in bytes (or, equivalently in this disclosure, octets) at the end of the transport source block (e.g., FEC Encoding Object). The components may also be configured to generate repair packets having a repair packet header for each protected portion of a source object that includes a source object transmission object identifier (TOI) or object sequence number (OSN), a start byte position within source object, and an end byte position within source object.

Embodiments may include components configured to perform object delivery operations so as to enable a source object to include a complete HTTP response. The components may also be configured to send an HTTP entity body and header (e.g., as a delivery object) so as to allow to the data associated with an object (or a byte range of an object) to be distributed dynamically.

Embodiments may include components configured to begin sending data ahead of time, before the entire file or object is received or generated in the server or sending device.

Embodiments may include components configured to send portions of a file/object out of order, before all the portions are received or generated, and/or independent of an FEC scheme. In an embodiment, this may be accomplished via LCT mechanisms by utilizing the extension capabilities of LCT.

Embodiments may include components configured to use templates and templating techniques to signal relationships between the locations, names, availability times, and other metadata associated with a collection or sequence of objects to be delivered. In an embodiment, the components may be configured to use a source flow declaration to identify URIs for an object, and determine when the object will be transmitted and/or received over a broadcast/multicast channel. In an embodiment, the components may be configured to send a one-time static File Delivery Descriptor to the receiver devices, and use header fields in a dynamic delivery protocol to create dynamic information, such information identifying a valid uniform resource identifier (URI).

Embodiments may include components configured to perform any or all of the above-mentioned operations while complying with the requirements of the current FLUTE standards and/or while maintaining backwards compatibility with other components that implement the current FLUTE standards.

The word "exemplary" is used herein to mean "serving as an example, instance, or illustration." Any implementation described herein as "exemplary" is not necessarily to be construed as preferred or advantageous over other implementations.

The term "receiver device" is used herein refer to any one or all of cellular telephones, smartphones, multi-media players, personal data assistants (PDA's), computing devices, server computers, personal computers, laptop computers, smartbooks, ultrabooks, tablet computers, palm-top computers, wireless electronic mail receivers, multimedia Internet enabled cellular telephones, wireless gaming controllers, and similar electronic devices that include communications circuitry for sending and receiving information, a memory, and a programmable processor.

The term "broadcast" is used herein to mean the transmission of data (multimedia streams, files, information packets, etc.) so that it can be received by a large number of receiving devices simultaneously, and encompasses unicast, multicast and other transmission technologies suitable for sending information to one or many receiver devices in a single transmission. Since broadcast networks can only transmit and have no direct return communication link, such networks are also referred to herein as "forward link only" (FLO) broadcast networks to distinguish such communication networks from two-way wireless communication networks, such as cellular telephone systems and wireless wide-area networks (e.g., WiFi, WiMAX, etc.).

The terms "delivery object" and "source object" may be used interchangeably herein to describe any self-contained unit that includes or is expressed as metadata or data, and which may be communicated using wireless or broadcast communication technologies. Examples of source objects include a file, an HTTP entity, a byte range, an entity header and entity body containing the full file indicated by the entity header, an entity header indicating a byte range of a file, and entity body containing the portion of the file indicated by the entity header, etc.

As used in this application, the terms "component," "module," "system," "service," "encoder," "sender," "receiver," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or distributed between two or more processors. In addition, these components may execute from various non-transitory computer-readable media having various instructions and/or data structures stored thereon. Components may communicate by way of local and/or remote processes, function or procedure calls, electronic signals, communication messages, data packets, memory read/writes, and other known network, computer, processor, and/or process related communication methodologies.

A number of different broadcast services, standards, and technologies are available or contemplated in the future, all of which may implement and benefit from the various embodiments. Such services, standards and technologies include, e.g., multimedia broadcast/multicast service (MBMS), enhanced multimedia broadcast/multicast service (eMBMS), enhanced multi-broadcast service (EMBS), global broadcast service (GBS), open mobile alliance mobile broadcast services enabler suite (OMA BCAST), MediaFLO®, digital video broadcast Internet protocol datacasting (DVB-IPDC), digital video broadcasting-handheld (DVB-H), digital video broadcasting-satellite services to handhelds (DVB-SH), digital video broadcasting-handheld 2 (DVB-H2), advanced television systems committee-mobile/handheld (ATSC-M/H), China multimedia mobile broadcasting (CMMB), advanced television systems committee terrestrial (ATSC-T) and MPEG Media Transport (MMT). Each of these broadcast standards, services, and technologies include, for example, broadcast communication channels suitable for communicating data, signaling, and/or content messages.

In addition to the broadcast services mentioned above, multimedia and other services may be delivered directly to individual mobile receiver devices via various cellular and wireless communication services and standards, any or all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages.

It should be understood that any references to terminology and/or technical details related to an individual standard or technology are for illustrative purposes only, and are not intended to limit the scope of the claims to a particular communication system or technology unless specifically recited in the claim language.

Generally, the operations of receiving, decoding and displaying content on a receiver device consumes a significant amount of the receiver device's available resources (CPU operations, battery power, memory, etc.). This is due, in part, to the large amount of digital information that must be received, decoded, and error corrected by the receiver device. The various embodiments may reduce the amount of information that must be received, decoded, and error corrected by the receiver device when receiving or rendering content.

There are currently a number of readily available compression techniques (e.g., moving picture experts group "MPEG" compression) that reduce the amount of information that must be communicated over the network when delivering multimedia content. However, regardless of the efficiency of the compression method used by such techniques, a large volume of information must be communicated over the network to provide users with a satisfying user experience. Thus, existing compression techniques alone do not adequately reduce the amount of information communicated over the network or considerably improve the performance or power consumption characteristics of receiver devices.

Often, there are network fluctuations (e.g., changes in the availability of resources) that cause the status of a delivery network to change over time. These fluctuations may cause the receiver device to drop packets, under-run buffers, or otherwise negatively impact the user experience. Various technologies, such as DASH, allow a client application (e.g., media player, etc.) of a receiver device to respond to such changes in network conditions by adjusting the bitrate or quality of the streams that are transmitted to or received by the receiver device. These technologies typically include a content generation server that reads in a raw video file and generates multiple versions of the file (called "representations") for delivery over a generative Internet Protocol (IP) network.

DASH is a web-compatible international standard for describing multi-rate encoded multimedia that allows client applications (e.g., media players, etc.) to dynamically choose which portions of a media presentation to receive based on network dynamics, resource availability and/or other suitable factors. DASH supports partitioning each representation into segments that encode the data that is to be delivered to the receiver device. DASH typically utilizes a Media Presentation Description (MPD), which is a segment availability timeline that announces the segments, the times that the segments are available, and indications of the playback rate of the media comprising the segments. In current systems, the MPDs are provided to receiver devices via Over-the-Air (OTA) delivery technologies.

FLUTE is a transport layer technology/protocol for the unidirectional delivery of files that is particularly well suited for use with broadcast/multicast delivery networks. A FLUTE solution or system may include servers and receiver devices that implement the communication mechanisms defined in Internet Engineering Task Force (IETF) Request for Comments (RFC) 3926 and RFC 6726.

Existing FLUTE solutions deliver source objects (e.g., files, segments, etc.) independent of each other, and generally do not support establishing a relationship between related source objects that are included in the same flow. As a result, using existing solutions, a server in the broadcast network must independently signal (i.e., transmit a communication message that includes signaling or control information) each object's parameters, the location at which the object should be stored, when the object is going to be delivered, and other similar information to the receiver device in advance of or during the source object's delivery. According to the FLUTE standards (RFC 3926 and RFC 6726), a server must send such signaling information for each source object that is to be delivered to that receiver device. Yet, communicating such signaling information for each object consumes an excessive amount of the network's available bandwidth and requires that the receiver device perform additional processing, synchronization, or memory access operations, any of which may reduce the performance and/or power consumption characteristics of the receiver device or degrade the user experience. In addition, if any of the signaling information is lost then the object generally cannot be recovered.

The various embodiments may include methods, and devices and systems configured to implement the methods, for managing communications in a broadcast network so as to reduce the amount of information that is communicated when delivering a flow of content or source objects.

The various embodiments may provide a delivery framework suitable for transmitting a flow of related objects (or a collection of related groups of objects) via FLUTE and/or over a broadcast network in a single flow, stream, or communication channel such that they may be received, decoded, and processed based on their relationship to each other. This is in contrast to existing FLUTE-based solutions that do not identify relationships between FLUTE objects in a flow, package unrelated objects into the same flow, and require that the receiving device receive independent signaling information and data to decode each FLUTE object.

The various embodiments may also include network broadcast servers configured to send signaling information (e.g., information pertaining to channel setup, security, content delivery, etc.) to coordinate how content is to be delivered over a broadcast system in a manner that reduces the amount of information that is communicated over the network.

Existing solutions for accomplishing object delivery via a broadcast system generally require that a server in the broadcast network send signaling information independently for each object that is to be communicated over the broadcast network. This is due, in part, to the inability of existing solutions to adequately establish or identify a relationship between two or more objects communicated over the broadcast network and/or within a flow or communication channel. For these and other reasons, existing solutions typically send the signaling information in a separate file/object than the file/object that includes content information. In FLUTE-based systems, such signaling information is typically included in a file delivery table (FDT), which describes various attributes associated with files that are to be delivered within a file delivery session.

Existing FLUTE solutions send file delivery tables (FDTs) to receiver devices in objects that are separate from the objects that include the contents they describe. Thus, using existing FLUTE solutions, a receiver device is required to receive two objects (e.g., a segment of video and an FDT that describes that segment of video) for every source object (e.g., segment of video) that is requested or rendered. Further, because the receiver device will not be able to recover or decode the information included in the source object (e.g., segment of video) if the packet/object that includes the FDT is lost or dropped, existing FLUTE solutions typically broadcast each FDT object multiple times to increase the probability of its reception. Such redundant broadcasting of the FDT object is an inefficient use of broadcast resources that may consume an excessive amount of the network's available bandwidth, and has other disadvantages, such as longer start-up delays when tuning into a service.

The various embodiments may include components configured to communicate objects (e.g., segments of video, etc.) via FLUTE and/or over a broadcast network without broadcasting an FDT object and without requiring a receiver device to receive two objects for every real object (i.e., source object) that is requested or rendered. In an embodiment, at least a portion of the signaling information and object information may be communicated together in-band and/or in a single stream or channel. Communicating such information in-band may reduce the amount of information that is communicated over the network and is a more efficient use of network resources.

Various embodiments may include a network server configured to send object information to receiver devices (e.g., FLUTE receivers) in advance of when the source objects are sent to the receiver devices and/or in advance of when the source objects are received by the receiver devices. Such object information may include timing information, URIs specifying the name and location of files (e.g., where they are going to be referenced or accessed by an application), which keys to use to decrypt objects in case the objects are delivered encrypted, and other identifying information relating to the source objects that are to be delivered. Such object information for a related sequence of objects (or collection of objects) may be provided in compressed form. In an embodiment, portions of the object information may be sent out-of-band to receiver devices in advance of the source objects, and portions of the object information may be sent in-band with the source objects, without broadcasting any FDTs. In this manner, the various embodiments may completely eliminate the need to use FDTs in FLUTE-based communications.

Various embodiments may include network servers configured to package and communicate the signaling and object information for source objects so as to allow a receiver device to make more intelligent decisions and better plan for the reception of the source objects. This may be accomplished by a server sending a receiver device information pertaining to the objects that are going to be sent to the receiver device, before those objects are transmitted and/or before those objects are received in the receiver device. Having access to such information in advance facilitates better decision making and planning by the receiver device.

Various embodiments may include components configured to link the objects being delivered via FLUTE over a broadcast network to one or more client applications of the receiver device.

Various embodiments may include components configured to deliver objects via FLUTE and/or over a broadcast network so that the object delivery is well aligned with the functions, operations, or requirements of existing DASH systems.

Various embodiments may include components (e.g., servers in a broadcast network, etc.) configured to deliver DASH content via flow object delivery mechanisms over a broadcast delivery network. In an embodiment, this may be accomplished by broadcasting source objects so that they are compatible with, or may be interpreted as, DASH segments of a DASH representation.

Various embodiments may include network servers configured to signal that the FLUTE-based objects are DASH segments, and package FLUTE-based objects so that a receiver device may receive and process the FLUTE-based objects as if they were DASH segments.

Various embodiments may include components configured to generate, broadcast, or receive signaling information in an object or format that includes a combination of the features/characteristics provided by existing FLUTE-based objects and DASH-based segments.

Various embodiments may include components configured to perform chunk delivery operations and/or chunk reception operations. Such chunk delivery operations may allow a server in the broadcast network to start sending an object before it is fully generated by a source encoder and/or an encapsulation unit or module. For example, a server in the broadcast network may send an object that is to include 10 seconds of video without waiting the full 10 seconds for the content to become available. That is, rather than waiting the full 10 seconds for the content to become available, the server may perform chunk delivery operations to start sending the first part of the video before the other parts are received by the server. In an embodiment, the server may send the encapsulated version of an access unit or a network abstraction layer unit or a sample as a separate source packet in order to minimize the sending delay. Similarly, a receiver device may perform chunk reception operations to begin receiving, decoding, and using objects before the entire source object is received in the receiver device. For example, a receiver device may be configured to perform chunk reception operations to start playing portions of a video content before the entire object that contains the video is received in the receiver device.

Various embodiments may include components configured to support variable sized source packets. That is, existing FLUTE standards and solutions require that each source package and each repair package be the same size (or at least a multiple of a predetermined symbol size). In contrast to the existing FLUTE standards and solutions, the various embodiments may include components configured to generate, send, receive, decode, or use variable size source packets. The boundaries of the content carried in such variable size packets may be set completely arbitrarily and/or may be aligned with the underlying structure of the content, e.g., with an access unit/module or network abstraction layer unit/module structure of video content. The use of such variable size packets is particularly advantageous when the source packet boundaries may be aligned with the symbol structure (e.g., when using FEC, etc.). Also the loss of such a packet may only affect a single access unit/module instead of multiple units/modules, and suitably configured receiver devices may generate a partially received object that can be processed by the receiver device (or software applications of the receiver device) to render the received content and provide a gracefully degraded quality.

Various embodiments may include components configured to perform operations suitable for communicating source content that does not include FEC semantics. That is, existing FLUTE standards and solutions generally require that source delivery operations be signaled and performed such that they are intimately tied to an FEC code and FEC scheme used for recovery operations. This includes but is not limited to the use of source symbols of a fixed size, requiring that all source packets except for the last packet be a multiple of the source symbol size, the use of source symbols as an elementary unit for applying FEC, etc. For these and other reasons, existing solutions require the use of a "no-code FEC" semantic even in circumstances in which no FEC code is supported, required or used. However, receiver devices that are not equipped with FEC capabilities may not be able to receive, decode, or recover objects that include FEC semantics.

Various embodiments may include servers configured to deliver source content without FEC semantics (and/or without signaling the FEC) so that receiver devices that are not equipped with FEC capabilities may receive, decode, and recover the source objects. In an embodiment, the server may be configured to deliver content information in a first object and the FEC signaling information in a second object. In an embodiment, the first and second object may be delivered together, in-band.

Various embodiments may include components configured to perform forward error correction (FEC) object bundling operations. Various embodiments may include components configured to provide FEC protection over multiple objects. In an embodiment, this may be accomplished (or made possible) via a combination of the FEC object bundling operations and the operations that separate the delivery of the FEC semantics from the source content.

Various embodiments may include components configured to perform forward error correction (FEC) operations to protect portions of an individual source object or DASH segment, enabling a source object to be delivered with multiple FEC encodings, providing greater flexibility and enabling an object to be rendered or "play-out" before the entire object has been received. In such embodiments, FEC protection may be provided over a partial object, over a byte range of an independent source object, and/or over combinations of byte ranges from different source objects in different streams. For example, a component may be configured to provide independent FEC protection over the first three (3) frames of a source object, independent FEC protection over the next five (5) frames of the source object, another independent FEC protection over the next six (6) frames of the source object, and yet another independent FEC protection over the last ten frames of the source object. This manner of FEC protection may allow the system to better support the transmission of variable sized source packets or objects, allow a receiver device to begin decoding objects incrementally before the entire object is received, allow for the transmission of larger objects, reduce the number or frequency of independent refresh frames included in the object/stream, improve the latencies associated with streaming content (especially content comprised of large objects), reduce the amount of bandwidth consumed by the stream, and provide more flexibility and control over the granularity over which the system is able to provide FEC protection.

Various embodiments may include components configured to package and communicate the signaling and object information for source objects so that portions of the object may be associated with different labels. For example, a beginning portion of an object may be labeled as "Type A," followed by a portion labeled as "Type B," follow by another portion labeled as "Type A." This may allow a video layer component (e.g., a video layer decoder, etc.) to identify, categorize, or classify various parts or portions of an object that are the same type, related, independently playable, etc. The object labels may also enable other applications of information that may be useful to the video layer component. In an embodiment, the labeling information for the various parts/portions of a source object may be communicated or signaled to a receiver device via a code point that defines, includes, or specifies various properties.

Various embodiments may include components configured to signal or identify the portions of a source object that are FEC protected using byte ranges. These components may also be configured to label the packets that contain the byte ranges of FEC protected portions with a type identifier or data-field. The type identification of portions of a source object (which is typically of value to higher level applications consuming the source objects once they are recovered at the receiver) can be used in conjunction with the system to provide FEC protection over various byte ranges to be able to provide FEC protection of portions of source objects of different types. This allows each portion of a source object that corresponds to a type of data within a source object to be independently recovered using FEC, which may be of value to the consuming application when different portions of a source object corresponding to a type are of use to that application even when other portions of the source object are not yet available due to not yet arriving at the receiver, or will never be available due to insufficient FEC protection. However, the FEC protection of portions of source objects and the identification of different portions of the source objects as being of different types can be used independently of one another. For example, FEC protection may be provided over two consecutive portions of a source object of different types, or FEC protection may be provided over portions of a source object that is not aligned with the different portions of different types, or FEC protection may be provided over different portions of a source object that is not classified into types.

In various embodiments, the delivery and protection of a source object may be based on a subset of a full source file. For example, in an embodiment, a component may be configured to treat a certain byte range as a separate delivery object (or source object). The signaling information associated with this byte range may be communicated, transmitted, or signaled via metadata, such as dynamic metadata (DMD). For example, an object in dynamic metadata may be assigned a Content-Range header that allows the system to associate an object with a Content-Range of a URL that is defined in a Content-Location field of the metadata. In this case as an extension to FLUTE there may not be a one-to-one mapping between a transmission object identifier (TOI) and a URL, but the TOI may be mapped to a combination of a URL and a byte range. In an embodiment, the source object may be divided into multiple protection objects or FEC protected portions.

Various embodiments may include components configured to add transmission object identifier (TOI)/object sequence number (OSN) values for a protected portion of a source object in a repair packet header (e.g., in a header extension) and a byte range of the protected portion of the source block at the end of the transport source block. Other embodiments may include components configured to add or start the source symbols at the beginning of a portion of the source object to be protected (instead of at the very beginning of the source object), and provide an actual byte range of the protected portion of the file, delivery, or source object within the repair packet header directly. In a further embodiment, a component may be configured to add the starting position of the byte range and a number of symbols that are covered by the byte range within the repair packet header directly, and add the size of the portion of the protected source object in bytes (or octets) at the end of the transport source block (e.g., FEC Encoding Object). This preferred embodiment requires fewer repair packet header bytes than the embodiment discussed above, does not waste repair symbols, and does not have padding bytes in the first symbol of the transport source block.

Various embodiments may include components configured to generate repair packets having a repair packet header for each protected portion of a source object that includes the following: source object TOI (or OSN), a start byte position within source object, and an end byte position within source object. In an embodiment, the repair packet header may be 10 bytes (e.g., two bytes for TOI, four bytes for a start byte position, and four bytes for an end byte position) for each protected portion of a source object. In an embodiment, these and other mappings may be included in a metadata file that is delivered to a receiver device in a separate file or object. In a preferred embodiment, a component may be configured to signal the start byte position and the size of the object in symbols. In an embodiment, the TOI may be mapped via the metadata. In an embodiment, the protected object size in bytes may be included in a source block (e.g., FEC Encoding Object) at a position that is known or signaled by the receiver. In an embodiment, a component may be configured to apply FEC protection to a portion of a source object, starting at its start byte position. Various embodiments may define multiple extension headers that enable the system to signal different types of sizes, such as the size in symbols, the start address (e.g., 16 bits, 32 bits) of the delivery/source object and the size in symbols, etc.

Various embodiments may include components configured to use a Layered Coding Transport (LCT) codepoint field to identify a "type" of content that is carried in that packet (i.e., packets containing the original source objects). In an embodiment, this information may be included in the code point. In an embodiment, a component may be configured to identify a relationship between the byte ranges of transport source objects that are FEC protected and "types" of portions of the transport source objects. For example, byte ranges of the transport source object might be labeled with one of several types (e.g., generically type X, type Y, type Z), and each source packet may be generated to include only data of one type. As a further example, a byte range 12,000 through 19,999 of type X might be included in seven (7) source packets (each labeled as type X in a codepoint field), the first six (6) source packets may include 1200 bytes and the seventh (7th) source packet may include 800 bytes. All such information may be included in codepoint fields of the associated packets. A codepoint field (or code point) may be assigned a specific value if it is the start of a specific type. Furthermore, FEC protection may be provided over portions of source objects that are consecutive within the source object of the same type. For example, there might an FEC repair object that protects the byte range 12,000 through 19,999 of a source object that corresponds to data of type X within a source object as indicated in the code point.

Various embodiments may include components configured to use the source FEC Payload ID of an existing FEC scheme (i.e., instead of a byte range as proposed in the source protocol). This embodiment may enable supporting backward compatibility with existing FEC schemes, for example, on the source delivery level. This embodiment may also support object bundling. The Source FEC Payload ID could be converted to a byte range prior to applying the FEC framework. This embodiment may allow applying the advanced FEC framework with arbitrary FEC schemes in the source protocol.

In an embodiment, source objects may be (or include) byte ranges of existing files (e.g., with a URL that identifies them as for example defined in ISO/IEC 23009-1, Annex E), as opposed to the complete existing files.

Generally, a web cache is a mechanism for the temporary storage of web documents (e.g., HTML pages, images, etc.)

to reduce bandwidth usage, server load, and network latency. Typically, a web cache stores copies of documents passing through it so that subsequent web-based requests may be satisfied directly from the web cache. An HTTP cache is a web cache that implements the basic freshness, validation, and invalidation requirements specified in the HTTP standards.

Various embodiments may include components configured to perform object delivery operations so as to enable a source object to include a complete HTTP response. This may allow a receiver device to operate as an HTTP cache so that if another computing device issues an HTTP request, or an application running on the same device issues an HTTP request, the receiver device may provide it with a complete HTTP response as if it were being entirely delivered over HTTP.

Various embodiments may include components configured to perform any or all of the above-mentioned operations while complying with the requirements of the current FLUTE standards and/or while maintaining backwards compatibility with other components that implement the current FLUTE standards.

The various embodiments may be implemented within a variety of communication systems, networks and/or mobile multi-media broadcast systems, an example of which is illustrated in FIG. 1. Specifically, FIG. 1 illustrates a communication system in which mobile receiver devices 102 may receive content from multimedia broadcast network 104, unicast network 106, or via the Internet 108. A typical multimedia broadcast network 104 includes a plurality of broadcast transmitters 112 controlled by a mobile broadcast network control center/broadcast operation center (BOC) 114. The multimedia broadcast network 104 broadcasts content from the broadcast transmitters 112 as mobile broadcast transmissions 113 for reception by the mobile receiver devices 102. Within the BOC 114, there may be one or more servers 110 for managing content broadcasts, and which provide a connection to the Internet 108.

In addition to the multimedia broadcast network 104, mobile receiver devices 102 may communicate via a unicast network 106, such as a cellular telephone network, WiFi network (not shown), WiMAX, etc. A typical cellular telephone network includes a plurality of cellular base stations 116 coupled to a network operations center 118. The network operations center 118 operates to connect voice and data calls between mobile receiver devices 102 and other network destinations, such as via telephone land lines (e.g., a POTS network, not shown) and the Internet 108.

Communications between mobile receiver devices 102 and the unicast network 106 may be accomplished via two-way wireless communication links 115 such as LTE, 4G, 3G, CDMA, TDMA, and other cellular telephone communication technologies. Such two-way wireless communication links 115 may enable users to stream multimedia content to receiver devices (e.g., mobile devices).

To facilitate Internet data communications (e.g., streaming video feeds), the unicast network 106 will typically include one or more servers 120 coupled to, or within, the network operations center 118 that provide a connection to the Internet 108. Mobile receiver devices 102 may further connect to the Internet 108 via a wired connection when available, in which case the Internet 108 may serve as the unicast network. Mobile receiver devices 102 may also receive non-broadcast content over the Internet 108 using well known conventional web-based access protocols.

Generally, the operations for receiving and rendering content by a receiver device (e.g., the mobile receiver devices 102 discussed above) may be divided into separate and independent groups or categories of operations, and each group or category of operations may be assigned to a layer (e.g., physical layer, data link layer, etc.). In each of these layers, various hardware and/or software components may implement functionality that is commensurate with responsibilities assigned to that layer. For example, media streams (e.g., broadcast, point-to-point, etc.) are typically received in the physical layer, which may include a radio receiver, buffers, and processing components that perform the operations of demodulating, recognizing symbols within the radio frequency (RF) signal, and performing other operations for extracting raw data from the received RF signal.

Figure 2:
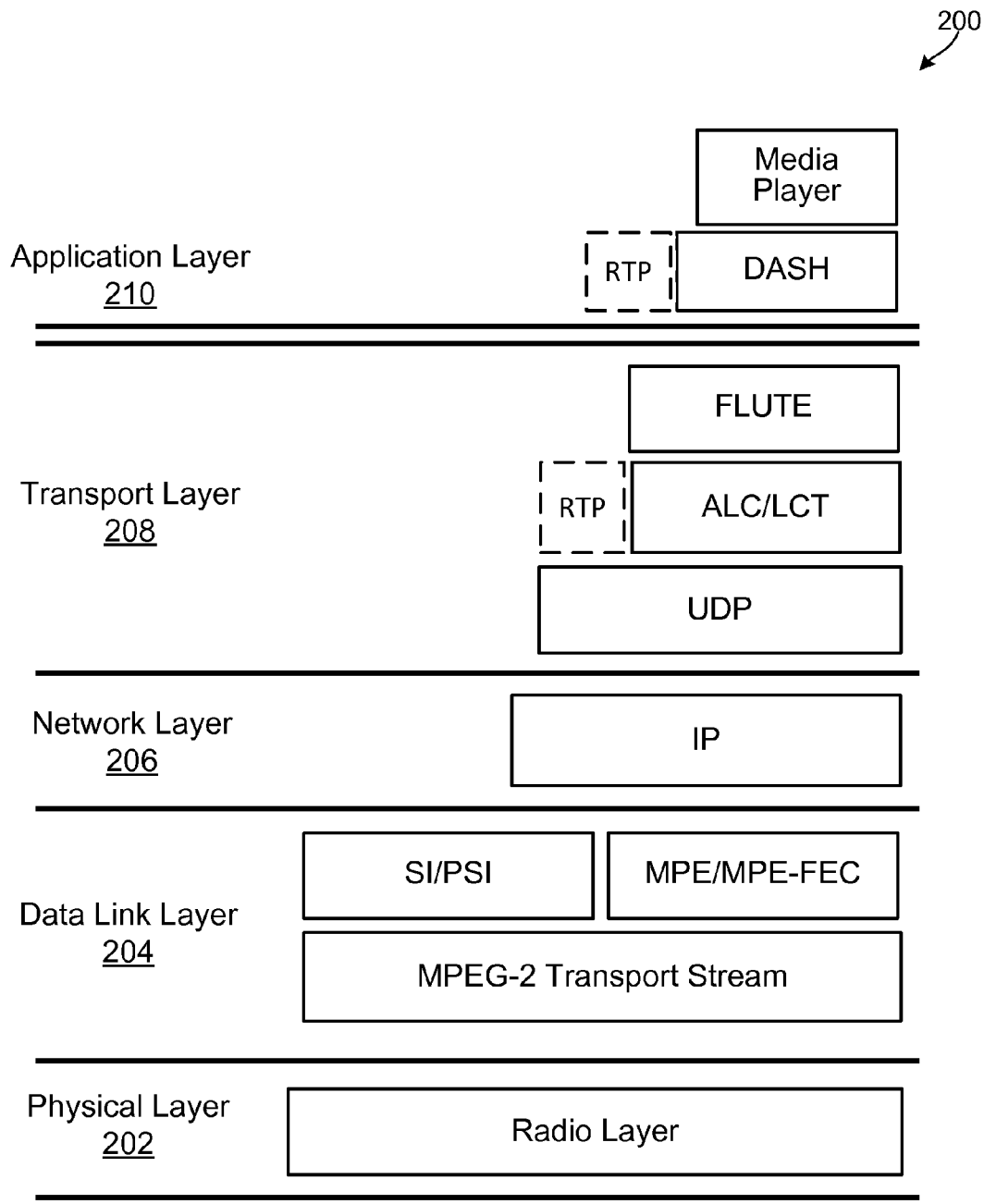
FIG. 2 is a stack diagram illustrating information flows through the various hardware and software protocol layers and modules that may be used by the various embodiments.

FIG. 2 illustrates an example protocol stack 200 of a mobile receiver device suitable for receiving and displaying content in accordance an embodiment. In the illustrated example of FIG. 2, the protocol stack 200 includes a physical layer 202 module, a data link layer 204 module, a network layer 206 module, a transport layer 208 module, and an application layer 210 module, each of which may be implemented in hardware, in software, or in a combination of hardware and software. Further, each of the modules 202-210 may include sub-layers, which may also be implemented in hardware, in software, or in a combination of hardware and software.

The physical layer 202 module may include radio components configured to receive the basic communication signal, extract data from the communication signal, and provide the data to a media transport stream (e.g., MPEG-2 Transport Stream) or a media access control module in the data link layer 204 module. The data link layer 204 module may provide addressing and channel access control mechanisms that make it possible for various components of the mobile receiver device to receive the different streams of data. The data link layer 204 module may also include various sub-modules or sub-layers for carrying a packet protocol (e.g., Internet Protocol) on top of a Moving Picture Experts Group (MPEG) transport stream (TS), such as the illustrated multiprotocol encapsulation forward error correction (MPE-FEC) module/layer and the program and system information (SI/PSI) module/layer.

Portions of the stream/signal carrying the content and information flows may be passed by the data link layer 204 module to the network layer 206 module, which may include an IP module/interface for communicating/relaying streams, datagrams and/or packets to the transport layer 208 module. Streams and data received in the transport layer 208 module may be delivered to the appropriate transport layer sub-modules or sub-layers, which process and package the data for transport. Such transport layer sub-modules/sub-layers may include a user datagram protocol (UDP) module/layer, an asynchronous layered coding/layered coding transport (ALC/LCT) module/layer, a real-time transport protocol (RTP) module/layer, and a file delivery over unidirectional transport (FLUTE) module/layer. In an embodiment, the RTP module/layer may be included in or as part of the application layer 210, similar to DASH formats.

The application layer 210 module may include protocols and methods required establish host-to-host, end-to-end connections and to conduct process-to-process communications. The application layer 210 module may also include end-user applications (e.g., media player, etc.) for processing, rendering and/or displaying the received content on the mobile receiver device. The application layer may also include media formats, such as DASH formats, encoded media streams and other media related metadata. In the example illustrated in FIG. 2, the application layer 210 module includes a DASH module, an RTP module, and a media player module.

Figure 3:
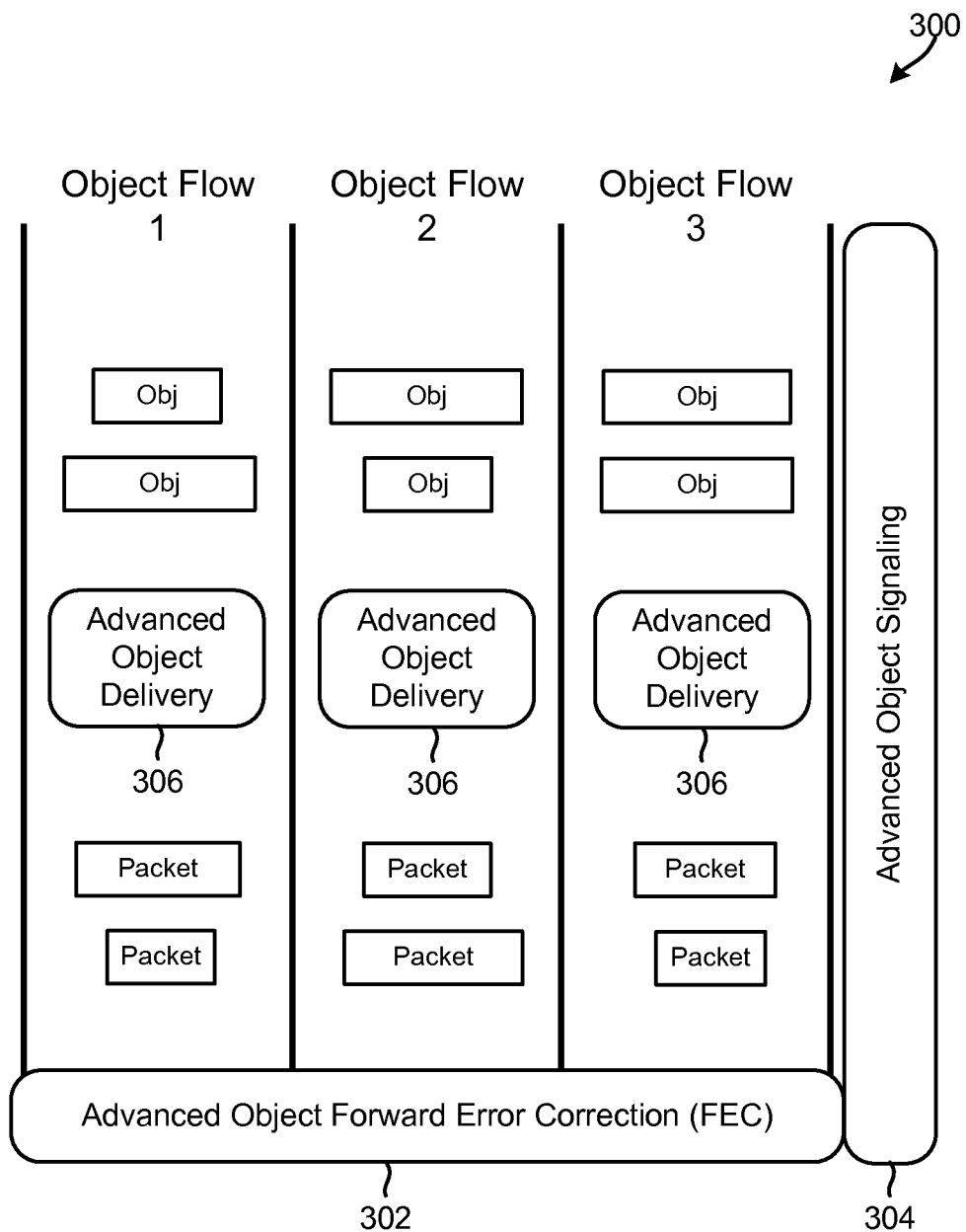
FIG. 3 is a block diagram illustrating various logical and functional components of an example broadcast communication system suitable for delivering multimedia content to mobile receiver devices so that each object is associated with a flow in accordance with various embodiments.

FIG. 3A illustrates various logical and functional components of an embodiment broadcast communication system 300 suitable for delivering multimedia content to mobile receiver devices. In the example illustrated in FIG. 3A, the broadcast communication system 300 includes an advanced object forward error correction component 302, an advanced object signaling component 304, and an advanced object delivery component 306. Multimedia content is encoded in variable-size objects (Obj), which are broadcast via three different object flows (Object Flow 1, 2 and 3). Each object flow (Object Flow 1, 2 and 3) includes or is associated with an advanced object delivery component 306. Each of the variable-size objects (Obj) may be a full object or a portion of an object (e.g., a byte range, etc.).

In various embodiments, any or all of the advanced object forward error correction component 302, advanced object signaling component 304, and advanced object delivery component 306 may be implemented in hardware, software, or a combination of hardware and software.

The advanced object delivery component 306 may be configured to perform various object delivery operations, including establishing or identifying a flow-association between the objects (Obj) on a delivery level, adding timestamps to the objects or data on a packet level, performing chunked delivery operations, packetizing or fragmenting the objects (Obj) into source packets, and performing various other similar operations.

The advanced object signaling component 304 may be configured to perform various signaling operations, such as packaging and sending signaling information in object flows (Object Flow 1, 2 and 3), accomplishing HTTP server/proxy/cache replication, and delivering "availability timing" information for HTTP objects. For example, the advanced object signaling component 304 may be configured to signal the availability timing information of an HTTP object when the corresponding object is delivered. This allows the broadcast communication system 300 to perform time-out operations when delivering objects over broadcast. The delivery of such availability timing information may also allow the broadcast communication system 300 to implement features similar to a cache time-out policy in which the items that are stored in the cache are only made available to a computing system for a limited duration and/or are timed-out after a certain duration or period of time. In this manner, the broadcast communication system 300 may ensure that the data, objects (Obj), and/or source packets are always current or include up-to-date information.

The advanced object signaling component 304 may also be configured to provide a receiver device with signaling information, which may include various information fields that identify when and how one or more objects (Obj) will be delivered to the receiver device. In various embodiments, such information may be delivered to the receiver device over the broadcast session before the corresponding object or packets are received by the receiver device or transmitted by the server.

The advanced object forward error correction component 302 may be configured to perform various error correction operations, including operations for: providing FEC protection for source flows of objects; providing FEC protection for bundles of objects; providing FEC protection for portions of individual objects; and allowing delivery of source objects independent of FEC semantics, codes, logic, support or operations. In an embodiment, the advanced object forward error correction component 302 may be configured to provide FEC protection for bundles of source objects while at the same time deliver the individual source objects of the bundles independent of the FEC semantics.

In an embodiment, the advanced object forward error correction component 302 may be configured to provide FEC protection for byte ranges (and combinations of byte ranges) of transport source objects to protect portions of objects in the same or different flows or streams. This allows a receiver device to perform FEC decoding operations to render an object incrementally as the object is received. This is in contrast to existing solutions in which FEC encoding is performed over an entire object and which generally require that a receiver device wait until an entire object is received before performing FEC decoding operations to render that object.

In an embodiment, the advanced object forward error correction component 302 may be configured to provide FEC protection for flows of source objects. The advanced object forward error correction component 302 may provide FEC protection over a flow of source objects in any object based delivery system, including FLUTE-based delivery systems. In addition, the advanced object forward error correction component 302, advanced object signaling component 304, and/or advanced object delivery component 306 may implement, or may be a subset of, existing FLUTE standards and solutions. Further, any or all of these components 302, 304, 306 may extend FLUTE functionality (e.g., functionality provided by the FLUTE sub-layer discussed above with reference to FIG. 2, etc.) to allow streams or flows of objects to be delivered within the FLUTE context more efficiently and in compliance with the existing FLUTE standards.

Existing broadcast object-based streaming delivery solutions, such as that provided by current FLUTE solutions (specified in 3GPP MBMS for delivery of DASH sequences of segments) lack many of the features and functionality provided by packet-based streaming solutions. As such, many existing streaming solutions are not object-based, but instead, packet-based solutions that deliver packet streams via RTP/IP, MPEG2 transport stream (TS), or other similar technologies. When FEC is used in such packet-based streaming solutions, the packets are typically partitioned into source blocks, and FEC repair protection is provided individually for each of these source blocks. For this and other reasons, existing packet-based streaming solutions lack the ability to name and identify (e.g., with a uniform resource identifier (URI)) portions of the stream, and in general lack many of the advantageous features that are provided by object-based streaming solutions, such as DASH.

In an embodiment, the broadcast communication system 300 may be configured to provide functionality that is a combination of the functionality provided by existing packet-based streaming systems and those provided by existing broadcast object-based streaming systems. That is, in contrast to existing streaming solutions, the broadcast communication system 300 may achieve functionality that combines the features of (and provides additional features beyond) existing packet-based streaming solutions and broadcast object-based streaming solutions, while remaining compatible with existing FLUTE-based solutions and systems, and while accomplishing such communications via broadcast.

Generally, packet-based streaming systems can generate individual packets to match the characteristics of the source content they carry, package, or encode. For example, when the source content is a video stream, a packet-based streaming system may generate each source packet to include one frame of video data or a slice or a network abstraction layer unit. This allows the packet-based streaming system to send each video frame or each slice or access unit or network abstraction layer unit immediately as it becomes available to the system, which may reduce network latency in some environments or networks. In addition, packet-based streaming systems typically achieve very precise timing for each sample, which is also beneficial in some environments or networks.

Existing broadcast object-based streaming systems are better suited than packet-based streaming systems to deliver large samples or objects, but require that all of the information that is to be included in a segment or object be made available for communication over an IP network before the segment/object is sent. That is, existing broadcast object-based streaming systems do not allow a server to begin sending content for a source object as it becomes available to that server. Rather, existing broadcast object-based streaming systems require that the server wait until all of the information for a DASH segment, or source object in general, is received or available to the server before it can begin sending packets for that DASH segment (or source object) to receiver devices. In addition, existing broadcast object-based streaming systems are not well suited to meet precise timing requirements for individual samples/segments/objects, and thus are susceptible to network latency and jitter in some environments or networks.

The various embodiments may include a broadcast communication server configured to efficiently broadcast samples or objects as information becomes available to the server and achieve very precise timing for each sample/object while remaining compatible with existing FLUTE-based solutions and systems, thereby achieving a hybrid/combination of the functionality provided by existing packet-based streaming systems and those provided by existing broadcast object-based streaming systems. For example, the broadcast communication server may be configured to include data in a file as such data becomes available to the server, and begin broadcasting the file immediately so that the data is made available to the network as it becomes available to the server (i.e., before the server receives all the data that is to be included in the file). In addition, the broadcast communication server may add timing information to each file/packet at the FLUTE level. Such timing information may be used to measure jitter in the network and perform other similar operations. Jitter measurement and jitter compensation may be used to dimension buffers and to ensure low-latency operations.

Existing FLUTE systems use file delivery tables (FDTs) to communicate signaling information. An FDT may include forward error correction object transmission information (FEC OTI), a uniform resource identifier (URI), a transmission object identifier (TOI) that identifies the object information included in the packet, and a transmission session/stream identifier (TSI) for the object.

A forward error correction object transmission information (FEC OTI) may include a "FEC Encoding ID" that identifies a particular FEC coding methodology. In addition, FEC OTI may include various parameters, such as a byte range or object/file size (F), an alignment factor (AI) that identifies a byte offset, a symbol size (T), the number of source blocks (Z) in the object, and the number of sub-blocks (N) that each source block is partitioned into for that object.

In the various embodiments, each object may include different forward error correction object transmission information (FEC OTI) and/or a different uniform resource identifiers (URIs). The file delivery table (FDT) may link the transmission object identifier (TOI) to other information included in the FDT, such as the URI, FEC OTI, and other object transmission parameters. The transmission session/stream identifier (TSI) may scope (i.e., identify and provide context for) the TOI, which allows multiple objects to be delivered in the same session and with different TOIs. The combination of the TSI and TOI may uniquely identify an object. An object sequence number (OSN) may be mapped to the TOI, and vice versa. The TSI may be mapped to the FLID.

A file delivery table (FDT) may include both static and dynamic information. For example, the transmission object identifiers (TOIs), URIs, content type and the byte range or object/file size (F) values may include dynamic information that varies from object to object. The values for the FEC Encoding ID, transmission session/stream identifier (TSI), alignment factor (AI), symbol size (T), number of source blocks (Z), and number of sub-blocks (N) may all include static information that is fixed across multiple objects or across a sequence of objects. Such values may be provided once for an entire sequence of related objects (or a collection of objects), for example, by using the values Z=1, N=1, and fixed AI and FEC Encoding ID values for all the objects. However, using existing solutions, signaling information must be transmitted (via broadcasting an FDT) for each object that is to be broadcast, irrespective of the number of static fields that are shared across multiple objects in the stream.

When delivering a stream of objects, the TOI and URI values may be predicted across a stream of related objects, whereas the object/file size (F) is typically not as predictable. The URI information may be conveyed via templating by using the TOI and a template to generate a URI.

In addition to the value fields discussed above, in the existing FLUTE-based solutions, each packet includes an FEC Payload ID. The FEC Payload ID provides information about the packet payload, and may include a source block number (SBN) and an encoding symbol identifier (ESI). The FEC Payload ID may include information that is specific to a particular FEC methodology or system, irrespective of whether the packet includes source data or repair data. For this reasons, the FEC Encoding ID is required by existing systems when delivering source data for an object via FLUTE.

The various embodiments may include broadcast servers configured to deliver source data for an object via FLUTE without including FEC semantics, such as an FEC Encoding ID data-field or value. The various embodiments also may include receiver devices configured to receive, decode, and use objects that do not include the FEC semantics.

Existing FLUTE solutions do not support establishing a relationship between multiple objects that are included in a single object flow or commutation channel. Using existing solutions, all of the static and dynamic information that may be included in an FDT for an object must be delivered to the receiver device individually for each object. In addition, at least one FDT generally must be delivered for each object in a stream, as some of the information delivered within an FDT for an object is typically only available when the object itself is delivered. This information must be delivered within an FDT for each object, irrespective of whether there are actual or potential changes to the information, and irrespective of whether the same information may be used for multiple objects or across all objects in a stream. In addition, the FEC Payload ID, which is an FEC semantic and provides information about the contents of each packet delivered with the object, is typically FEC specific and not required in all instances. Repeatedly broadcasting the same information, information that is not required or used by the receiver device, or information that could be shared across multiple objects, as is done in existing systems, is an inefficient use of network resources.

The various embodiments may include a broadcast communication server configured to broadcast related objects in a single flow, stream, or communication channel so that signaling information (e.g., FDT parameters) may be shared across multiple objects in the flow. This reduces the amount of information that is communicated over the network, is a more efficient use of network resources (e.g., bandwidth, etc.), and is more reliable than existing solutions for delivering information to receiver devices.

The various embodiments may also include a broadcast communication server configured to broadcast a sequence of related objects. In an embodiment, the relationships between the objects may be identified via the TOI field, which may be achieved by splitting the TOI field into two sub-fields: a Flow ID (FLID) sub-field that identifies a flow of related objects; and an object sequence number (OSN) sub-field that identifies each source object within the flow of related source objects. In an embodiment, the OSN may be mapped to a TOI field. The TOI may be split in this manner because the FLUTE standards do not define a rigid structure for the TOI field, and thus each number contained therein may be used for a different object or field. Further, since existing TOI fields typically store four (4) bytes of information, the TOI fields may be split into a one (1) byte FLID parameter sub-field and a three (3) byte OSN parameter sub-field without impacting their backward compatibility with existing systems.

In an embodiment, the FLID may be a one (1) byte parameter, which allows the system to support 256 different FLIDs for each session. In an embodiment, the zero (0) value may be excluded as an acceptable or supported value for the FLID sub-field so as to avoid confusion with a TOI value of zero (0), which may be reserved for FDT object delivery in some systems.

In an embodiment, the TOI may be a 4-byte value, and a value range (e.g., 128-255, etc.) may be reserved for use for the FLID sub-field of the TOI to allow delivery of objects using existing FLUTE solutions and within the same session. For example, solutions that do not split the TOI into sub-fields and use an FDT may restrict the used TOI values to the range 0 through 128*256*256*256−1=2147483647 (first use case). On the other hand, solutions that split the 4-byte TOI into a 1-byte FLID and a 3-byte OSN may restrict the used FLID values to the range 128 to 255 (second use case) without any further restriction on the range of 3-byte OSN values. When concatenated, the 1-byte FLID and the 3-byte OSN form a 4-byte TOI integer value that ranges from 128*256*256*256 to 256*256*256*256−1 (or equivalently the TOI integer value ranges from 2147483648 through 4294967295). This ensures that the overall range of the 4-byte TOI values used for the two use cases discussed above is disjoint. This allows the FLUTE broadcast delivery system to deliver, in the same session, objects that do not split the TOI and use FDTs (first use case described above, existing FLUTE solution) and objects that split the TOI and do not use FDTs (second use case described above). As described, this may be achieved by partitioning the range of overall TOI values into non-intersecting ranges for the two different use cases, which eliminates the possibility of conflicting TOIs for the two use cases in the same session.

In an embodiment, the transmission session/stream identifier (TSI) may be used as the Flow ID (FLID).

A flow of related objects, such as that identified by the FLID sub-field of the various embodiments, may correspond to a stream of video segments in a DASH representation. For example, each object delivered in such a representation would have the same FLID (e.g., FLID=1), and thus packets that have the same FLID may be treated by the various embodiment servers and receiver devices as objects belonging to the same flow of objects. Another flow may for example be the audio data of a DASH Media Presentation.

Objects that belong to the same flow of objects, and thus have the same FLID value, may be identified via the OSN sub-field. The OSN sub-field may store a simple integer, starting at a value of zero (0) for the first object and incremented by one (1) for each subsequent source object in the flow. In an embodiment, the OSN may be a three (3) byte parameter, which at an object delivery rate of one object per second, allows for roughly 200 days of distinct OSN values.

The TSI may scope the FLID sub-field, which may scope the OSN sub-field. That is, the TSI value may provide sufficient context for differentiating between two objects having the same the FLID value, and the FLID value may provide sufficient context for differentiating between two objects having the same OSN value.

In an embodiment, the system may be configured to use the TSI as the FLID value. In various embodiments, the TSI field may be mapped to a DASH representation and vice versa.

By splitting the TOI field into two sub-fields (i.e., FLID and OSN) in accordance with the various embodiments, the broadcast network does not need to broadcast FDTs for the source flows. Instead, the broadcast network may broadcast a single source flow declaration (which may be included in the FLUTE metadata) for each receiver and for each flow (i.e., not for each object in the flow).

A source flow declaration may be a succinct representation of various information fields and values relating to an object flow and/or the objects of packets included in the object flow. The source flow declaration may identify the relationships between the object sequence numbers and objects. The source flow declaration may declare a flow at the metadata level. This may be achieved by including the various information fields and value in FLUTE metadata. The source flow declaration may include a unique flow identifier (FLID) that identifies the source packets in the flow and other static information for that flow. The source flow declaration may also include information related to the type of flow (e.g., video object flow, audio object flow, etc.). The source flow declaration may identify the Multipurpose Internet Mail Extensions (MIME) type of the objects in the flow and include other similar information. In an embodiment, the source flow declaration may include an indication of a decryption key and/or a sequence of decryption keys suitable for use in decrypting objects in the flow (i.e., if they are encrypted).

The source flow declaration may be carried in the user service description (USD) in the case of MBMS delivery using FLUTE. The source flow declaration may communicate the signaling information that is most relevant to a FLUTE receiver or receiver device. The source flow declaration may provide receiver devices with out-of-band in-advance information relevant to flows of objects delivery.

In an embodiment, a source flow declaration may be declared or represented in a server or receiver device as follows:

```
flow_declaration{
    flow_type = source
    FLID = 5
    source_type = video
}
```

In the above example of a flow declaration, the type of flow is indicated by the value of the flow_type data-field, in this case "source", the flow identifier for this flow is indicated by the value of the FLID data-field, in this case "5", and the type of content carried in the objects of the flow is indicated by the value of the source_type data-field, in this case "video". In general, the flow_type and the FLID are required to be declared within a flow_declaration, whereas other information may or may not be included in the flow_declaration.

As an alternative, existing fields may be used to signal and support using a Flow Identifier (FLID), in which case the Transport Object Identifier (TOI) signaling and usage can be used to identify the transport object, instead of a separately defined OSN, without other modifications to the signaling or protocols. For example, the existing codepoint field in the LCT header can be used to signal the FLID (in addition to the other usages of the codepoint field), and the existing TOI field can be left unmodified to signal the transport object identifier, instead of using a newly defined OSN.

The various embodiments may include a broadcast server configured to package source objects into source packets such that the source packets: do not include any dependencies on FECs or FEC semantics, do enable chunk delivery, do enable sending objects before they are fully available, and do support packaging the source objects into variable size packets (e.g., delivery of each access unit of the underlying media).

In an embodiment, the source_type data-field or value may be replaced by the MIME type of the corresponding object flow.

In an embodiment, the source packets may be generated to include a Source Payload ID data-field and value that includes a byte offset of the first source object byte carried in the packet. The source packets may also be generated such that the bytes of a source object are stored sequentially within packet, and so that an ending byte position may be inferred by size of packet payload. In an embodiment, the Source Payload ID may be a four (4) byte parameter. In an embodiment, to improve FEC recovery efficiency, the broadcast system may align the number of bytes in each source packet with size of FEC symbols. In an embodiment, the source packet may be generated to also include a code point, which may include labeling information and/or FEC coding information for byte ranges or portions of a source object.

By packaging the source objects into source packets in this manner, the various embodiments may allow for the delivery of the source objects independent of the FEC operations or semantics. Further, by packaging the source objects so that they are independent of the FEC operations, the sender may apply different FEC methodologies to the same source object when needed.

In addition, by packaging the source objects so that they are independent of the FEC operations, the various embodiments may allow the sender (i.e., a server) to apply FEC protection methodologies to produce a repair flow that protects a source flow or combinations of flows to create a first version of the FEC protection, wherein each FEC encoding is applied over multiple objects of the flow or combinations of flows suitable for delivery to receivers in bad receiving conditions or for receivers that only record the broadcast session and thus want the highest fidelity recovery possible, and another repair flow that protects the same flow or combinations of flows to create a second version of FEC protection, wherein each FEC encoding is applied over fewer objects of the flow or combinations of flows that the first version, which can provide shorter end-to-end latency suitable for delivery to all other receivers and/or which allow for faster access to the media stream when joining the session. For example, the first version of FEC protection may be a first repair flow where each FEC encoding is applied to a pair of consecutive source objects from a source flow, and the second version of the FEC protection may be a second repair flow where each FEC encoding is applied to a single source object from the same source flow.

The various embodiment broadcast systems may be configured to provide a number of source object signaling enhancements. Existing systems use FEC semantics to determine if/when all the packets of a source object have been received and/or the length/size of the source object. The various embodiments may allow a receiver device to determine if or when all the packets of the source object have been received, the length/size of the source object, and if the source object is a incomplete object (e.g., not all the packets have been received), all without using or requiring the packets to include FEC semantics. In an embodiment, this may be achieved by signaling to indicate the end of a source object by setting a "close object flag" (e.g., B-flag) in the last source packet of a source object, wherein the B-flag is an existing field in the existing FLUTE standard.

For example, the value of the B-flag field may be set to zero (0) in all but the last source packet, in which the B-flag may be set to one (1). This is possible because the FLUTE standards do not set definitive or precise requirements for the use of the B-flag field, and in any case, do not specify that it is to be set to one (1) in only the last source packet of a source object.

The last source packet (P) of a source object contains the last portion of the source object. Thus, by setting the B-flag in only the last source packet (i.e., setting the B-flag of P=1), the various embodiments may enable a receiver device to determine if the last portion of a source object has been received. Further, the receiver device may determine the size/length of the source object by setting the length/size value to be equal to a byte offset in the source Payload ID of the last source packet (P) plus the payload size of the last source packet (P). Further, the receiver device may determine if any other portions of the object have not been received using the byte offset and payload size of other source packets received for the object, i.e., the receiver may determine if there are any sequences of bytes of the object that have not been received within source packets. In this manner, the broadcast systems may determine if or when all the packets of the source object have been received, determine the length/size of the source object, and/or determine if the source object is a incomplete object, all without requiring an FDT or other signaling information to be sent for each object and without including FEC semantics in the source packets or objects.

Figure 4:
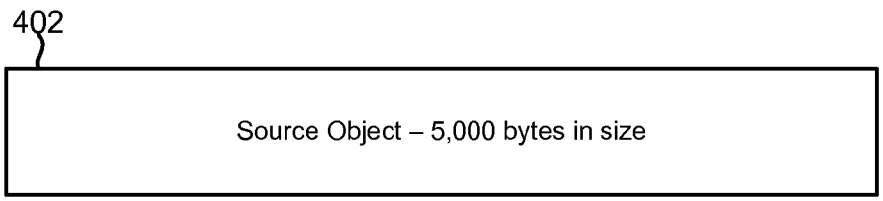
FIG. 4 is a block diagram illustrating a source object that is packaged into a plurality of source packets in accordance with an embodiment.
Figure 4:
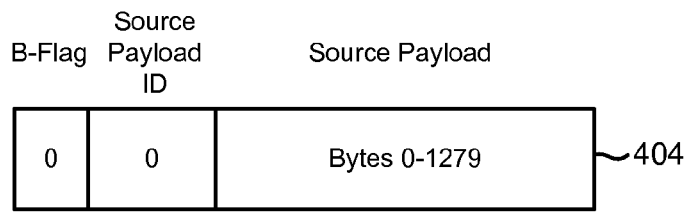
Figure 4:
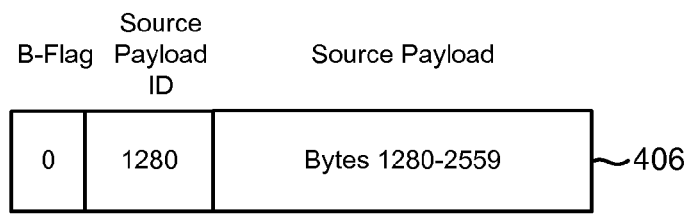
Figure 4:
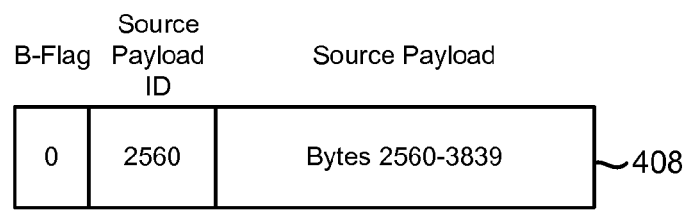
Figure 4:
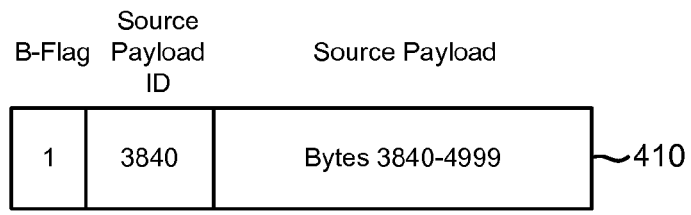

FIG. 4 illustrates that an embodiment source object 402 packaged into a plurality of source packets 404-410 such that the broadcast systems may determine if or when all the packets of the source object have been received without an FDT or FEC semantics. Each source packet 404-410 includes a B-Flag field, a Source Payload ID field, and a Source Payload field. In the example illustrated in FIG. 4, the source object 402 is 5,000 bytes in size/length and each of the first three source packets 404-408 includes a Source Payload data-field that is 1280 bytes in size/length. Since the size of source object (i.e., 5,000 bytes) is not a multiple of 1280, the Source Payload data-field of the last packet 410 includes only 1160 bytes. The B-flag field of each of the first three source packets 404-408 is set to zero(0), whereas the B-flag field of each of the last packet 410 is set to 1.

In overview, a receiver device or receiver may determine if the entire source object has been received, or if at least some portion of the object is missing, from the received source packets. For example, if the receiver doesn't receive the last packet of the object having a B-flag field set to one (1), then the receiver may determine that at least some suffix of the object has not yet been received. On the other hand, if a source packet having a B-flag field set to one (1) has been received for the object, then the receiver may determine that it has received the suffix of the object, and can determine the size of the object by computing the sum of the byte offset in the packet with the B-flag set to one (1) and the packet payload size of that packet. In addition, when a source packet having a B-flag field set to one (1) has been received for the object, the receiver may determine whether there are internal portions of the source object missing from the byte offsets and packet payload sizes of the received source packets.

With respect to the example illustrated in FIG. 4, a receiver device may receive source packets 404, 408 and 410 (and not source packet 406) and determine, from reception of source packet 410 with the B-flag set to one, that the suffix of the object has been received and that its size is 3840 (byte offset)+1160 (payload size)=5000 bytes in size. The receiver device may also determine from the received source packets, and the byte offsets and payload sizes of those packets, that bytes 1280-2559 of the object are missing (the bytes carried in the source packet 406 that was not received). If instead of source packet 406, the receiver did not receive source packet 410, then the receiver may determine that it has not yet received a source packet having a B-flag field set to one (1) for this object, and thus that a suffix of the object is not yet been received. In an embodiment, the receiver device may be configured to wait for a duration of time before determining that there is a high probability that no further packets not yet received for a source object were or will be transmitted or will be received, and perform recovery operations as needed. The amount of time that a receiver may wait to make this determination may be at least partially based on delivery time information, if any, in the source declaration.

In an embodiment, the broadcast system may be configured to generate the source packets 404-410 to include timing information. This timing information may be the timing of the sending of the source packets. Thus the timing of the source packets may be placed in the packets themselves. The inclusion of timing information in the source packets allows the system to replicate RTP operations, measure network jitter, associate delivery timing, associate media time relationships, specify a mask over a NTP timestamp, etc. For example, the system may generate a 64 bit NTP timestamp and use a 4 byte mask of the 64 bit NTP timestamp to include in the packets to determine the precision of the timing. The timestamp may present the time the packet is sent (or some other reference) and may be associated with a presentation time (similar to RTP, but not used for media synchronization). The mask may be specified in the signaling information and may have any arbitrary range between bit 1 and 64. The mask sizes may be a multiple of 8 bits to enable byte based time stamps. The mask size may also be signaled as zero (0) in order to indicate the non-presence of timing information.

In an embodiment, the system may be configured to use the congestion control information in the FLUTE/LCT header to carry timing information. Alternatively, the congestion control information in the FLUTE/LCT header may be used to carry a flow sequence number to enable packet loss measurements per flow by the receiver device.

Figure 5:
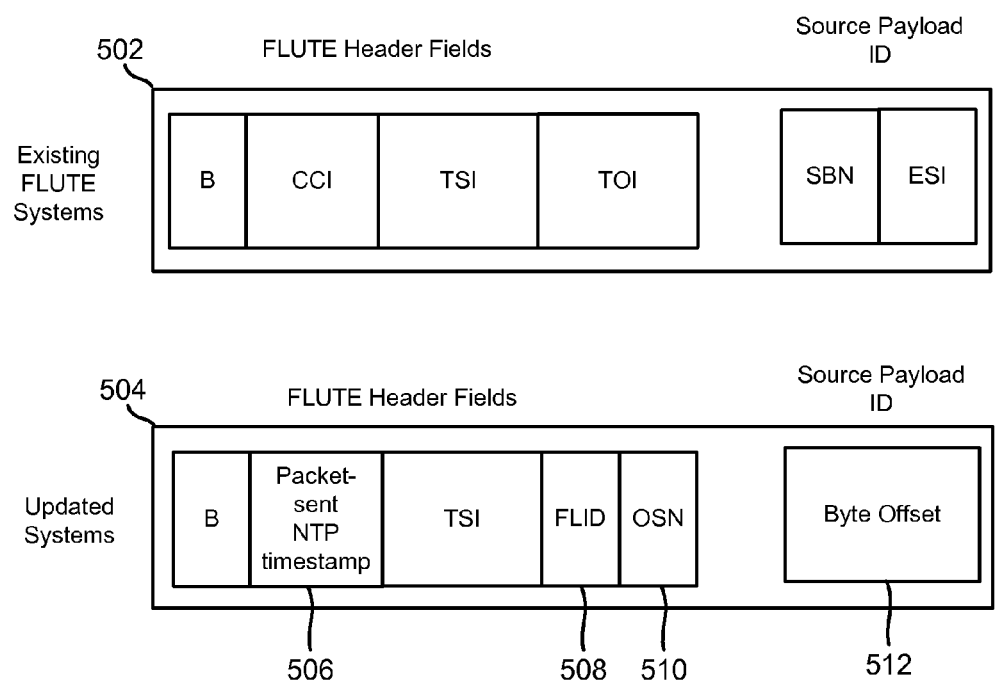
FIG. 5 is a block diagram illustrating differences between a current FLUTE object and an embodiment FLUTE object.

FIG. 5 illustrates some of the differences between a prior art FLUTE object packet header 502 and an embodiment FLUTE object packet header 504. Specifically, FIG. 5 illustrates that the embodiment FLUTE object packet header 504 may include a timestamp 506 field, a FLID 508 field, a OSN 510 field, and a byte offset 512.

The various embodiments may include components configured to accomplish chunk delivery and reception of source flows so that the end-to-end latency of the data deliver is minimal. On the broadcast side, an embodiment broadcast server may send source objects in chunks as they become available because it only needs to put a byte offset into each source packet as it is sent. The broadcast server may also set a "close object flag" (B-flag) in the last source packet of a source object so that the source object size is not needed to send source packets. Similarly, the server may set "close type" flag, field or value to identify the last packet of each portion or different type of portion in the source object. For example, if the source object is partitioned into four different portions, and the first and third portions are labeled as "Type A," the second and forth portions are labeled as "Type B," the system may include or set a "close type" flag/field in the last packet of each of these four portions to identify that packet as being the last packet in that portion and/or of that type.

On the receiver side, a receiver device may be configured to recover a source object as it arrives in chunks. The receiver device may use the source packet byte offset to determine the position of data within source object immediately send sequentially received source packet data to an application or client (e.g., media player). The receiver device may detect missing data within a source object via the source Payload ID byte offset and "close object flag" (B-flag) field values. The receiver device may determine if there are missing data gaps via the byte offset value and the size of the received source packet payloads. The receiver device may detect a missing suffix of data by determining that it has not yet received a source packet with B-flag set to one (1).

Figure 6:
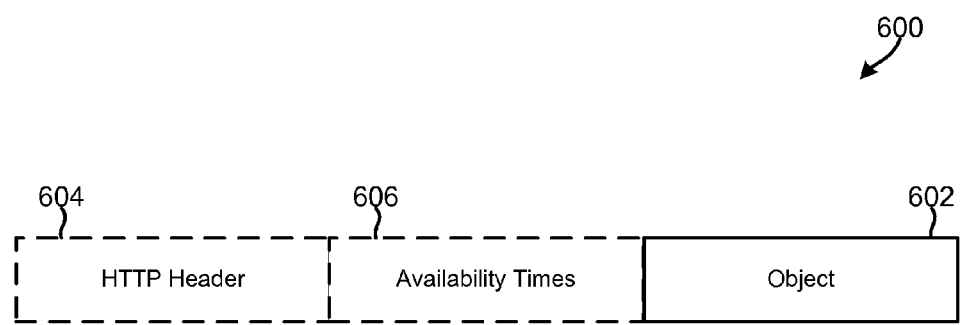
FIG. 6 is an illustration of an embodiment FLUTE object that includes an HTTP header field and an availability time field.

FIG. 6 is an illustration an embodiment FLUTE object 602 that includes (or is bundled with) an HTTP header 604 field and an availability times 606 field. The HTTP header 604 field may include an HTTP response header that includes information suitable for use by an HTTP proxy to replicate the caching behavior.

The availability times 606 field may include signaling or control information pertaining to the availability timing of the FLUTE object 602 at the receiving device, which may allow the system to determine if the FLUTE object 602 has been activated, is valid, or has expired. In an embodiment, the availability times 606 field may include Network Time Protocol (NTP) time stamps for the start and/or end availability times of object for use by a consuming application. The inclusion of such timing information in the FLUTE object 602 may allow the broadcast system to implement features similar to a cache time-out policy in which the items that are stored in the cache are only made available for a limited duration and/or are timed out after a certain period of time. In this manner, the broadcast system may ensure that the FLUTE object 602 includes current or up-to-date information.

In existing FLUTE solutions, FDT objects that carry metadata information for the delivery of source objects do not include timing information or the timestamps of their corresponding source objects. The FDT object may include one or two fields typically included in an HTTP response header, but existing FDT objects do not allow for the inclusion of a complete HTTP header as is accomplished in the various embodiments. Further, since broadcasting an FDT object consumes additional bandwidth, and since each FDT is typically broadcast repeatedly for each source object in the flow, it is advantageous to minimize the size of the individual FDT objects. The various embodiments may accomplish object delivery without FDT objects, and deliver the HTTP response header and timestamp information along with the source object, which is a more efficient use of network resources that reduces the amount of bandwidth consumed by each object flow.

The various embodiments may include components configured to communicate source flow declaration information that includes template information. As discussed above, a source flow declaration may be a succinct representation of information fields relating to an object flow (e.g., FLIDs, flow types, MIME types, decryption key information, etc.) and which may be used to identify the relationships between the objects in a flow of objects. By using templates and templating techniques, the various embodiments may use the source flow declaration to identify URIs for object and when the objects are going to be transmitted and/or received over a broadcast/multicast channel. For example, a source flow declaration that includes template information may be represented in a server or receiver device as follows:

```
flow_declararation{
    flow_type = source
    FLID = 5
    source_type = video
    URI = http://localhost.seq1/object%OSN%
    Timescale = 10
    START_TRANSMISSION = %OSN*20%
    END_TRANSMISSION = %OSN*20 + 20%
}
```

In the forgoing example, the URI field of the source flow declaration includes the string "% OSN %." Using templating techniques, this string may be converted into a different value for each object in the flow of object to provide an implicit mapping between the URIs and sequence numbers of the objects. For example, the object with OSN=25 within this flow is associated with the URI http://localhost.seq1/object25. Similar techniques may be used for the transmission information, such as for the "START_TRANSMISSION" field and the "END_TRANSMISSION" field. In an embodiment, the "START_TRANSMISSION" and "END_TRANSMISSION" fields may be computed based on the value of the "Timescale" field to indicate the timing of delivery. For example, Timescale=10 indicates that the time measurement is in units of 10 ticks per second, and thus the object with OSN=25 within this flow has a start transmission time of 50 seconds and an end transmission time of 52 seconds.

Thus, templates and templating techniques may be used to provide mechanism to derive URI for object, delivery time for object, relationship between FLID, OSN and URI, etc. As such, templates may be used in the various embodiments as compact and succinct means of signaling the relationships between the locations, names, availability times, and other metadata associated with a sequence of objects to be delivered.

The various embodiments may include components configured to communicate source flow declaration information that includes template information and a link to an application. Such a source flow declaration may be represented in a server or receiver device as follows:

```
flow_declararation{
    flow_type = source
    FLID = 5
    source_type = video
    MPD_URL = http://news.video_content/sept25.2012.mpd
    MPD_REP_ID = http://newsfeed.example.com/video500
    URI = http://localhost.seq1/object%OSN%
    Timescale = 10
    START_TRANSMISSION = %OSN*20%
    END_TRANSMISSION = %OSN*20 + 20%
}
```

In the forgoing example, the source flow declaration includes a MPD_URL field and a MPD_REP_ID field. In an embodiment, these fields may be used by an embodiment server or receiver device for correspondence between objects and DASH segments of a representation described in an MPD.

Various embodiments may include components configured to provide the broadcast communication system with advanced FEC capabilities that allow the source objects to be delivered independently, independent of the FEC semantics or information, without the use of FDTs, and while minimizing packet header overheads, supporting chunk delivery of the objects, and allowing for the use of variable size source packets.

Various embodiments may include components configured to use static File Delivery Information for signaling flow declarations.

The various embodiments may include components configured to provide support for the bundled FEC protection of flows in an object context.

The various embodiments may communicate source objects and provide FEC information only where needed, and not in source flow declarations or source objects, and while enabling receiver devices that do not have FEC capabilities to ignore FEC repair flows.

The FEC may be symbol based with fixed symbol size per repair flow.

FEC repair flow may provide protection of objects in one or more source flows (e.g., via bundling).

The various embodiments may include various FEC specific components, elements, communication messages, and data structures, such as a FEC repair flow declaration, FEC repair packets, and a FEC transport object (which may include a source block or bundle of source objects). The FEC repair flow declaration may include FEC signaling information and other FEC specific information. The FEC transport object may include a source object and related information. Various embodiments may be configured to apply FEC encoding to one, or a concatenation of multiple, FEC transport objects.

In an embodiment, a receiver device may be configured to recover bundled objects from repair packets based on available FEC information.

The various embodiments may include a separate and unique FLID for each repair flow that is distinct from other source FLIDs and repair FLIDs. This FLID may be scoped by the TSI and may scope the information included in the FLID.

Various embodiments may provide FEC repair for synchronized source flows, which may provide protection for source flows. The protected source flows may be listed in repair flow declaration. Various embodiments may time align objects in the protected source flows, protect source objects with the same OSN from different source flows. The various embodiments may include one OSN in each repair flow packet so that the OSN for the repair matches the OSN of source objects for protected source flows.

Various embodiments may also provide FEC repair for unsynchronized source flows to provide protection for source flows that include objects that are not completely time aligned. Various embodiments may protect source objects with differing OSNs from different flows, protect more than one source object of a single source flow, which may be accomplished by listing these source flows as many times as source objects to be protected.

The various embodiments may set the number of OSNs in repair flow packets equal to number of objects protected. The OSNs may be listed in order matching the source flow list in the repair flow declaration.

The various embodiments may include a FEC transport object for a source object, which may be used for FEC encoding operations. The FEC transport object may include a source object, padding bytes, and a size/length (F) field, where F is the size of the source object in bytes. In an embodiment, size/length (F) field may be a 4 byte field.

The various embodiments may include an FEC transport object for a portion of a source object, which may be used for FEC encoding operations. The FEC transport object may include a byte range for the source object and padding bytes. In an embodiment, the FEC transport object may also include a size/length (F) field. In various embodiments, the size/length (F) field may provide a byte range of the source object or the difference in bytes between the end of the byte range and start of the byte range of the portion of source object.

The FEC transport object size may be a multiple of the symbol size T. The size/length (F) field value may be carried in the last 4 bytes of the FEC transport object. In this case, the number of symbols in the FEC transport object may be calculated as ceil((F+4)/T), where ceil(x) is the function that returns the smallest integer that is at least as large as x. For example, if T=1280 and F=5000 then the number of symbols in the FEC transport object is calculated as ceil(5004/1280)=4. The FEC transport object may be generated to include a minimal number of padding bytes. Padding bytes and F may not be sent within the source packets of source object, and may be part of FEC transport object that FEC decoding recovers.

The various embodiments may include FEC repair flows for providing FEC protection to source flows, which may be used to protect a portion of a source object of a source flow, to protect individual objects of a source flow, to protect multiple objects from one or more source flows, or to protect multiple portions of objects from one or more source flows. When used for protecting individual objects in a source flow, each FEC encoding may be generated from the FEC transport object for a source object. When used for protecting multiple objects from one or more source flows, each FEC encoding may be generated from a concatenation of FEC transport objects for source objects. The concatenation may be in order of source flows indicated by a repair flow declaration and OSNs received in repair packets.

In various embodiments, the FEC transport object length may be determined at the receiver from a TOL carried in repair packets, which indicates the number of symbols in the FEC transport object corresponding to the OSN carried in the repair packets and the FLID declared in the repair flow declaration. The TOL may be a 2 byte value that is included in the repair FEC Payload ID for each FEC transport object of a source object that is FEC protected.

Generally, the FEC decoder only needs to know the symbols for the portion of the object that it is to recover. As such, various embodiments may set the FEC transport object length based on the symbol range covered by a portion of the object that is FEC protected. That is, the FEC transport object length may be set based on the range of source symbols that a portion of source object covers. For example, if the symbol length is a 1000 bytes (i.e., a new symbol starts at every thousand bytes and the symbol zero covers bytes 0-999 of the source object), and the portion of the source object that is to be FEC protected starts at byte 1500 and ends at byte 4500, then the system may set the FEC transport object length to indicate the symbol range 1-4 to cover the byte range 1500-4500. The system may then pad the ranges 1000-1499 and 4501-4999 in the FEC transport object with zeros. In an embodiment, the receiver device may automatically add this padding of zeros when it decodes the object, and the receiver may add these symbols when it encodes the object. This eliminates the need to transmit the padding information. This also reduces the number of bytes that are encompassed within the FEC encoding by removing padding bytes from the FEC protected portions.

To reduce the performance impact of partial symbols, in an embodiment, the system may be configured to select a symbol size that is small enough so that the padding included in an FEC transport object is small or not significant. In an embodiment, the system may be configured to generate the packet structure to line up with the symbol boundaries.

Figure 7A:
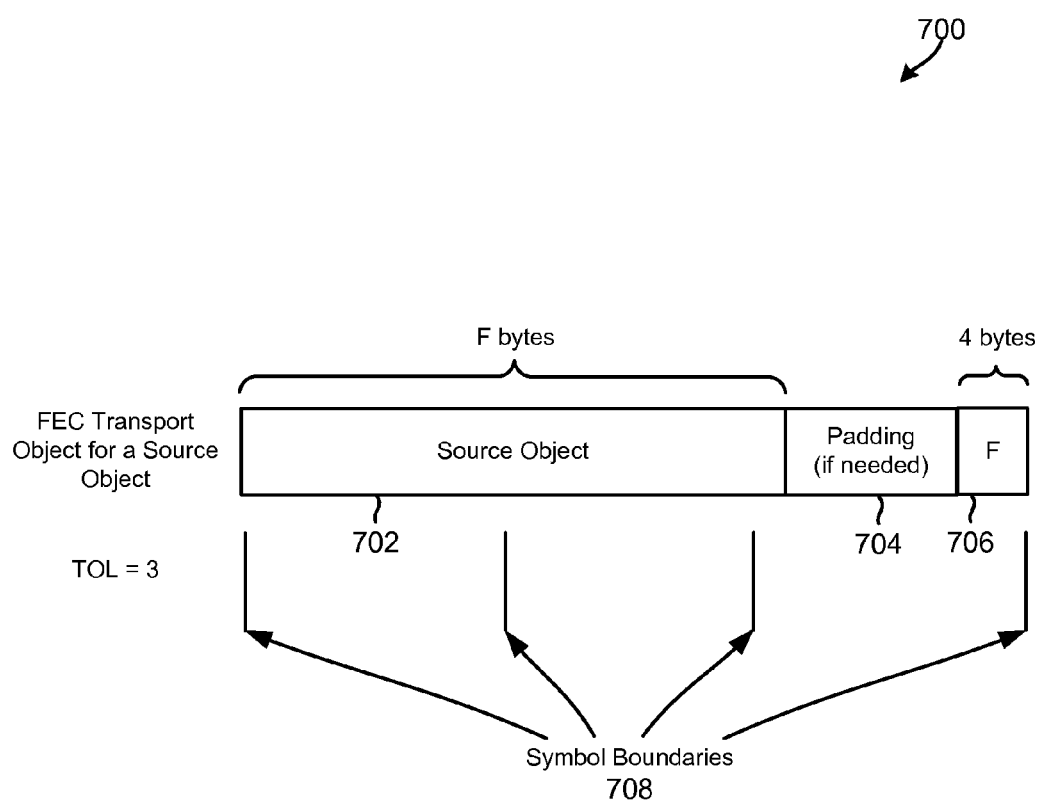
FIG. 7A is an illustration of embodiment transport objects that include a source object field, a padding field, and a size/length (F) field.

FIG. 7A is an illustration of an embodiment transport object 700 for a source object. The illustrated transport object 700 includes a source object 702 field, a padding 704 field, and a byte range or size/length (F) 706 field. The transport object 700 can be associated with a plurality of symbol boundaries 708, which may be determined based on symbol size T. The number of the symbols into which the FEC transport object may be partitioned may be calculated as the ceiling of the sum of the size/length of the source object 702 and the size of the byte range or size/length (F) 706 field divided by the symbol size (T). The transport object 700 may be created by populating the size/length (F) 706 field and the source object 702 field. The padding 704 field may be populated to fill any gaps between the source object 702 field and the size/length (F) 706 field.

In the example illustrated in FIG. 7A, the FEC transport object 700 is partitioned into three symbols, and the source object 702 does not end at a symbol boundary 708. The transmission object length (TOL) is 3 in this example, indicating that the FEC transport object is 3 symbols in size.

The repair FEC Payload ID may include an encoding symbol identifier (ESI) field and a transmission object length (TOL) field and symbols for each protected object. In an embodiment, ESI and TOL fields may each be two (2) bytes in size.

Figure 7B:
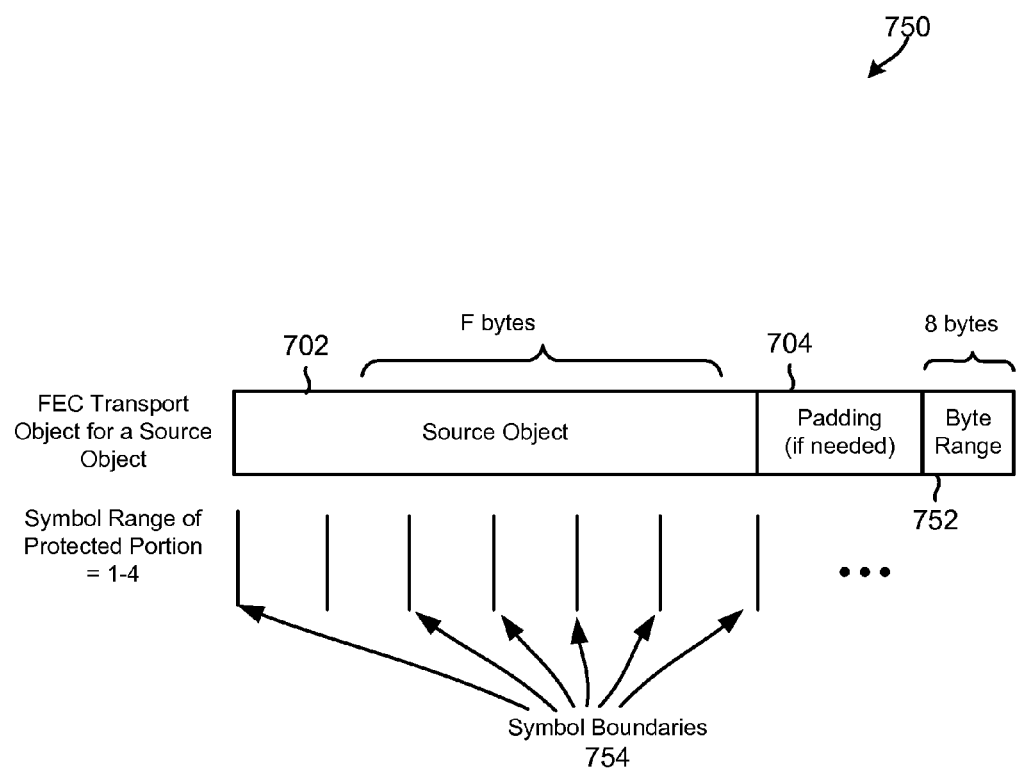
FIG. 7B is an illustration of embodiment transport objects that include a source object field, a padding field, and a byte range field.

FIG. 7B is an illustration of an embodiment transport object 750 for a portion of source object. The illustrated transport object 750 includes a source object 702 field, a padding 704 field, and a byte range 752 field. The transport object 750 may be associated with a plurality of symbol boundaries 754, which may be determined based on symbol size T (e.g., 1000) or based on the source object. The byte range 752 covered by the FEC protected portion may be equal to 1500-4500, and thus the symbol range of the protect portion may be equal to symbols 1-4 (i.e., to cover the byte range 1500-4500), if the symbol size is set to 1000 bytes as described in the example above.

The repair FEC Payload ID may include an ESI field and a symbol range field that covers the starting and ending boundaries 754 of the portion that is FEC protected. In an embodiment, ESI and symbol range fields may each be two (2) bytes in size.

In an embodiment, the FEC Payload ID may include the source symbol start position and source symbol end position. In a further embodiment, the FEC Payload ID may include a TOI of the source from the protected flow of the object identifier. The TOI may be two (2) bytes in size.

In a preferred embodiment, the FEC Payload ID includes the byte start position within the source object of the portion to be protected, together with the size in symbols (rounded up to the nearest symbol boundary) of the FEC Encoding Object that includes the portion of the source object that is to be protected, and the size in bytes (or octets) of the protected portion of the source object is carried at the end of this transport source block. This preferred embodiment is relatively efficient in terms of repair header overheads, minimizes wasted protection of padding bytes within the transport source object, and allows the receiver to FEC decode to recover the FEC Encoding Object and extract the portion of the source object from the information within the repair header and within the FEC Encoding Object.

Figure 8A:
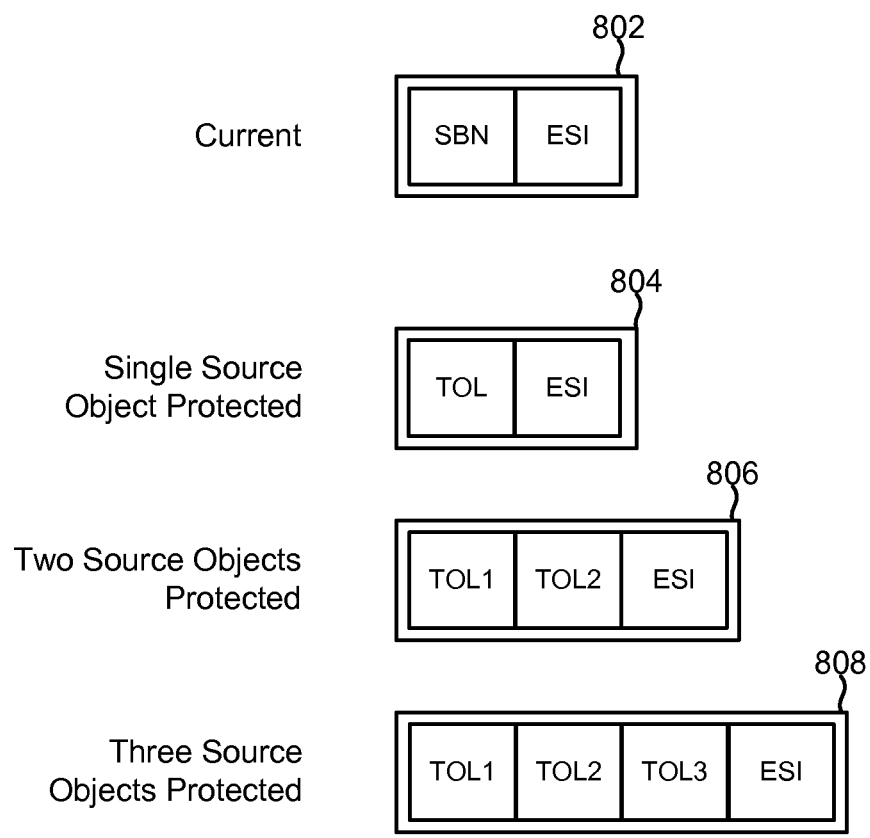
FIGS. 8A and 8B are block diagrams illustrating differences between current FLUTE repair forward error correction (FEC) Payload IDs and various embodiment repair FEC Payload IDs.

FIG. 8A illustrates differences between a current FLUTE repair FEC Payload ID 802 and various embodiment repair FEC Payload IDs 804, 806, 808. The current FLUTE repair FEC Payload ID 802 includes an SBN field and an ESI field. Each of the embodiment repair FEC Payload IDs 804, 806, 808 include an ESI field and one transmission object length field (TOL1, TOL2, TOL3, etc.) for each object that is protected by the FEC encoding. Thus, the format of the embodiment repair FEC Payload IDs 804, 806, 808 depends on the number of objects protected.

The current FLUTE repair FEC Payload ID 802 does not include information identifying the number of symbols in the source object or corresponding FEC transport object (FEC Encoding Object), nor any information identifying the length of the source object or corresponding FEC transport object. Instead, in the current FLUTE solutions, information about the source object and/or corresponding transport object is carried in a separate FDT associated with that source object. The SBN (source block number) field of the current FLUTE repair FEC Payload ID 802 identifies the source block from which the symbols carried in the repair packet are generated, which is useful when the object is partitioned into multiple source blocks.

In an embodiment, the ESI field of the embodiment repair FEC Payload IDs 804, 806, 808 may be replaced with a universal object symbol identifier (UOSI) field, which uniquely identifies how the repair symbols carried in the repair packet payload are generated from the object. When the number of source blocks in the FEC Encoding Object is one, then the UOSI and the ESI are equivalent. However, when the number of source blocks Z of the FEC Encoding Object is more than one, then the UOSI value A for a symbol with ESI value B from the source block with SBN value C is calculated as A=B*Z+C. Using a UOSI instead of an ESI is especially useful if objects are at least sometimes partitioned and FEC encoded as multiple source blocks.

Figure 8B:
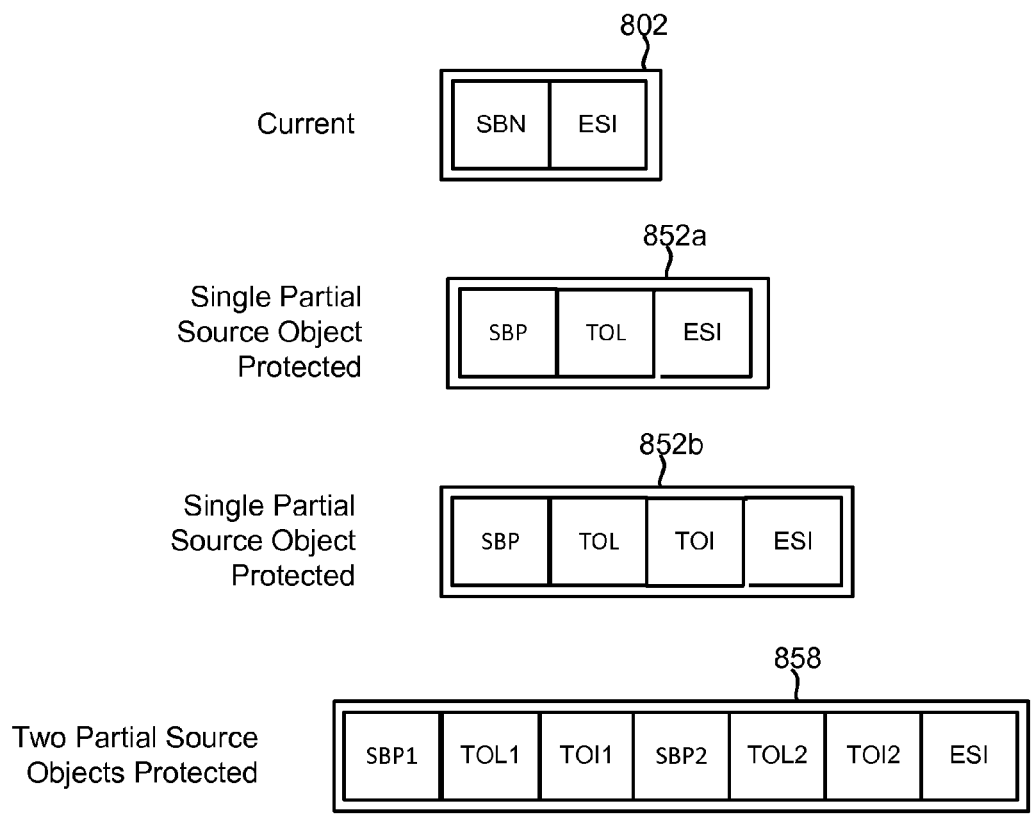

FIG. 8B illustrates differences between a current FLUTE repair FEC Payload ID 802 and various addition embodiment repair FEC Payload IDs 852a and 852b. The FEC Payload IDs 852a for a single (possibly partial) source object includes a source object start byte position (SBP), a transmission object length (TOL), which is the size in symbols of the transmission object, and an ESI field. FEC Payload IDs 852b also includes a TOI field. Similarly, the FEC Payload IDs 858 may include a SBP and a TOL for each TOI field corresponding to a portion of a source object to be protected, followed by an ESI field.

In other embodiments, the FEC Payload ID includes a source object start byte position (SBP) and a end byte position (EBP) for each (possibly partial) source object protected by the repair flow, and an ESI field. The FEC Payload ID may also carry a TOI for each (possibly partial) source object protected by the repair flow.

When the number of source blocks Z in the FEC encoding object is greater than one (1), or when the number of sub-blocks per source block N is greater than one (1), it is often important that the system maintain or achieve various properties, characteristics or objectives. For example, it may be important that system ensure that the source objects can be sent independent of the FEC protection (as described in this application). It may also be important that the system ensure that the FEC protection operations are effective and efficient (e.g., in terms of the recovery overhead) when recovering protected objects when there are different amounts of loss of source packets from the different source objects. In addition, it may also be important to for the system to ensure that FEC decoding operations may be performed in the receiver device so that the FEC transport objects are recovered efficiently, with as little reordering of data as possible, and using as little memory as possible. Yet, conventional and straightforward methods for forming the FEC Encoding Object are often inefficient or not adequate because they do not allow the system to maintain or achieve these properties, characteristics or objectives.

The various embodiments may include methods, and components configured to implement the methods, of forming the FEC Encoding Object so as to allow the system to maintain or achieve the properties, characteristics or objectives discussed above when the number of source blocks Z is greater than one (1) and/or when the number of sub-blocks per source block N is greater than one (1). For example, a component may be configured to map portions of the FEC transport objects evenly (or as evenly as possible) amongst the source blocks. Then, within a source block, the component may map the portions of the FEC transport objects to the sub-blocks of that source block. For each such FEC transport object, the component may fill the same number of sub-symbols of each sub-block so that each FEC transport object fills a consecutive set of sub-symbols within each sub-block.

As an example, suppose the number of FEC transport objects is 0, and that the number of symbols in FEC transport object i is $K_i$. Let Kt be the sum from i=0 to O−1 of $K_i$, i.e., Kt is the total number of symbols in all the FEC transport objects. For each j=0 to Z−1, let $N_j$ be the number of source symbols assigned to source block j. In this example, the component may calculate the number of symbols per source block and the sub-symbol size per sub-block using standard methods (e.g., those described in IETF RFC 6330). Then, for each object i=0 to O−1, the component may partition the value of $K_i$ amongst the Z source blocks so that $K_{i,j}$ is the number of symbols of FEC transport object i to be assigned to source block j. This may be accomplished by going through the source blocks in a round robin fashion and assigning one symbol of the first object to each of the source blocks until all symbols of the first object have been assigned, and then continuing from that point in the round robin and assigning one symbol of the second object to each of the source blocks until all symbols of the second object have been assigned, etc. These operations (i.e., going through the source blocks in a round robin fashion, etc.) may be performed repeatedly until all Kt of the symbols of the objects have been assigned to the source blocks. The component may then assign portions of the FEC transport objects to each of the source blocks of the FEC encoding object. This may be accomplished by starting from the beginning of each FEC transport object, where T is the symbol size: for i=0 to O−1, for j=0 to Z−1, the next $K_{i,j}*T$ bytes of object i are assigned to source block j. The component may then assign portions of the FEC transport objects assigned to each source block to the sub-blocks of the source block. For k=0 to N−1, let $SS_k$ be the sub-symbol size in bytes for sub-block k. Then, the portion of FEC transport object i may assigned to sub-block k of source block j is $SS_k*K_{i,j}$ bytes. By forming the FEC encoding object in this manner, the component may allow the system to achieve or maintain all the desirable properties, characteristics or objectives discussed above.

Various embodiments may include components configured to generate or use a repair flow declaration. The repair flow declaration may include information suitable for determining a protection type (synchronized or unsynchronized), for determining how to perform signaling operations for the source flows, for determining the source objects to protect in the source flows, and for determining the source flows that are to be protected by the repair flow. The type of protection may be useful in determining the header format of the packets. The repair flow declaration may also list the source flows that are protected by the repair flow such that they may be identified by their FLID. The repair flow declaration may also list the source flows so that the order of listing corresponds to an order of concatenation of FEC transport objects. In an embodiment the repair flow declaration may include FEC OTI fields or values.

A repair flow declaration that protects a single synchronized source flow may be represented in a server or receiver device as follows:

```
flow_declaration{
    flow_type = repair
    FLID = 20
    repair_type = synchronized, source_FLIDs = 5
    FEC Encoding ID = 6, Al = 8, T = 1280, Z = 1, N = 1
}
```

In the above example of a flow declaration, the type of flow is indicated by the flow_type value, in this case "repair", the flow identifier for this flow is indicated by the FLID value, in this case "20", the repair type is indicated by the repair_type value, in this case "synchronized", and the source flows protected by this repair flow are indicated by the source_FLIDs values, in this case the source flow with FLID "5."

In an embodiment, the FEC OTI may include the FEC Encoding ID=6, which corresponds to the RaptorQ code specified in IETF RFC 6330, Al=8, which indicates that 8-byte alignment is used, T=1280, which indicates symbols are 1280 bytes in size, Z=1 and N=1, which indicates that the FEC transport object includes one source block and one sub-block per source block (i.e., sub-blocking is not used). For repair flow declarations, the repair_type and the source_FLIDs values may be provided, as well as the FEC OTI.

Figure 9A:
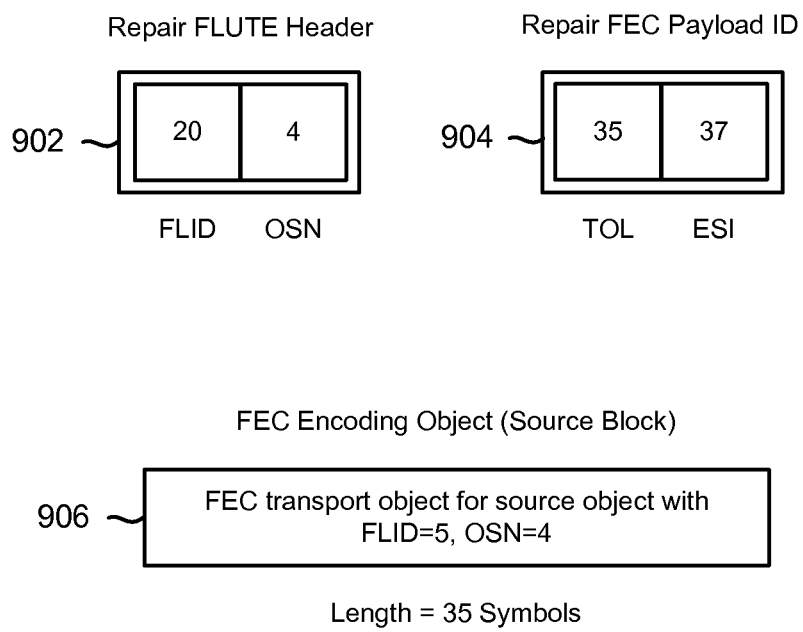
FIGS. 9A and 9B are block diagrams illustrating datafields in communication packets suitable for use in performing forward error correction (FEC) for a synchronized source flows in accordance with an embodiment.
Figure 9B:
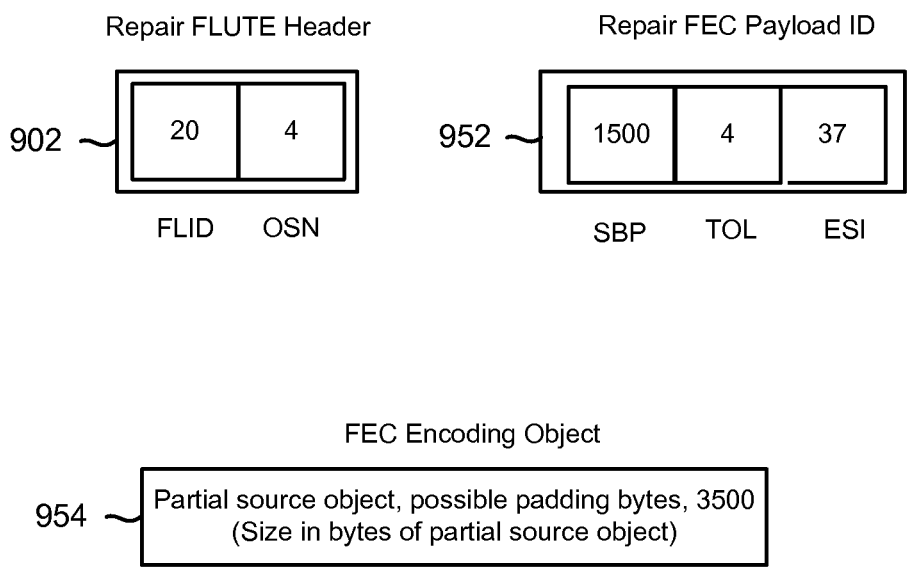

FIGS. 9A and 9B illustrate FEC encoding objects and repair packets that correspond to the example repair flow declaration discussed above.

The top portion of FIG. 9A illustrates various data-fields that may be included in repair packets suitable for use in performing FEC that corresponds to the example repair flow declaration discussed above. Specifically, FIG. 9A illustrates that a Repair FLUTE Header 902 may include an FLID field and an OSN field, that a Repair FEC Payload ID 904 may include a TOL field and an ESI field, and that an FEC Encoding Object 906 may include an FEC transport object.

The repair packet header shown in 902 and 904 and the corresponding flow declaration shown above indicates that the repair packet carries repair symbols generated from the FEC Encoding Object 906. In this example, since one source object is FEC protected by each FEC encoding, the FEC Encoding Object 906 coincides with the FEC transport object corresponding to that source object when the number of source blocks Z and the number of sub-blocks N of the FEC Encoding Object 906 are both one. The length of the FEC Encoding Object 906 is thirty-five (35) symbols, which corresponds to the value of the TOL field of the Repair FEC Payload ID 904. In this example, the repair symbol carried in this repair packet has ESI=37.

An example repair flow declaration that protects two synchronized source flows may be represented in a server or receiver device as follows:

```
flow_declararation{
    flow_type = repair
    FLID = 21
    repair_type = synchronized, source_FLIDs = 6, 7
    FEC Encoding ID = 6, Al = 8, T = 1280, Z = 1, N = 1
}
```

In the above example of a flow declaration, the type of flow is indicated by the flow_type value, in this case "repair", the flow identifier for this flow is indicated by the FLID value, in this case "21", the repair type is indicated by the repair_type value, in this case "synchronized", and the source flows protected by this repair flow are indicated by the source_FLIDs values, in this case the source flow with FLIDs "6" and "7". The FEC OTI is the same as in the previous example.

In various embodiments, to protect portions of a source object with an FEC repair, a templated TOI range may be provided as part of the FEC repair flow declaration. For example, this TOI range might identify that repair TOIs ten through nineteen protect source object 1 from the source flow, repair TOIs twenty through twenty-nine would protect source object 2, etc. Below is an example of such an FEC repair flow declaration.

```
flow_declararation{
    flow_type = repair
    FLID = 21
    repair_type = synchronized, source_FLIDs = 6, 7
    number_of_repair_TOIs_per_source_TOI = 10
    FEC Encoding ID = 6, Al = 8, T = 1280, Z = 1, N = 1
}
```

In the above example, there are ten (10) repair TOIs declared per source TOI. Repair TOIs 1-10 are reserved for protecting portions of the source objects with TOI=1 from source flows with FLID=6 and FLID=7. Repair TOIs 11-20 are reserved for protecting portions of the source objects with TOI=2 from source flows with FLID=6 and FLID=7. As such, in this example, up to ten (10) repair TOIs can be used to protect each pair of source objects from the two source flows with FLIDs 6 and 7. Note that for different pairs of source objects from the two source flows there may be a different number of repair TOIs used up to the maximum allocated (10 in this example). That is, there may be only one (1) repair TOI used, e.g., repair TOI 30, for the pair of source objects with source TOI=3. On the other hand, there may be ten (10) repair TOIs used, e.g., repair TOIs 40, 41, . . . , 49, for the pair of source objects with source TOI=4. There may be zero (0) repair TOIs used for the pair of source object with source TOI=5.

Thus, differing numbers of FEC protections of portions of the source objects may be provided for different pairs of source objects. Further, two different FEC protections provided for the same pair of source objects may protect non-overlapping portions of the source objects, or overlapping portions of the source objects.

For example, the FEC protection associated with repair TOI 40 may provide bundled protection of the first half of the source object with TOI=4 and FLID=6, and the first half of the source object with TOI=4 and FLID=7. The FEC protection associated with repair TOI 41 may provide bundled protection of the second half of the source object with TOI=4 and FLID=6, and the second half of the source object with TOI=4 and FLID=7. The FEC protection associated with repair TOI 42 may provide bundled protection of the middle half of the source object with TOI=4 and FLID=6, and the middle half of the source object with TOI=4 and FLID=7.

In the above example, the TOI for each source object is not carried (or is not required to be carried) in the Repair FEC Payload ID 952 of each repair packet of the repair flow. This is because the source object TOI may be determined based on the templated TOI range carried in the FEC repair flow declaration, and the repair flow TOI carried in the Repair FEC Payload ID 952 of each repair packet.

The top portion of FIG. 9B illustrates various data-fields that may be included in repair packets suitable for use in performing FEC over portions of a source object. Specifically, FIG. 9B illustrates that a Repair FLUTE Header 902 may include an FLID field and an OSN field. Repair FEC Payload ID 952 may include a Start Byte Position (SBP) field, a transmission object length (TOL) field, and an ESI field. The TOL may be the size (in symbols) of the transmission object of source symbols.

FIG. 9B also illustrates that an FEC Encoding Object 954 may include the portion of the source object that is to be protected, and the size in bytes of the portion of the source object that is to be protected (with possibly some padding bytes between the portion of the source object and the size). In the example shown, SBP=1500 and TOL=4 indicates that the partial source object to be protected starts at byte position 1500 within the source object. If the symbol size is 1000 bytes, then since the TOL=4 then the FEC protected portion of the source object is between 3001 bytes and 3996 bytes in size. In this example, the partial source object size is at most 3996 bytes, because there is a 4 byte field at the end of the FEC Encoding Object to carry the partial source object size that is to be FEC protected, and thus the size of the partial source object can be at most 1000*4−4=3996 bytes in size when the TOL=4 and the symbol size is 1000 bytes. As such, the end byte position (which is not explicitly signaled in this embodiment) is between 4500 (1500+3001−1) and 5495 (1500+3996−1). Since the size (in bytes) of the protected portion of the FEC Encoding Object 954 is carried at the end of the FEC Encoding Object 954, the actual end byte position may be determined after FEC decoding of the FEC Encoding Object 954. In the illustrated example, the size in bytes of the FEC Encoding Object 954 is shown as 3500, and the end byte position is 4999 (1500+3500−1) within the source object.

In another embodiment, the Repair FEC Payload ID 952 may include a Start Byte Position (SBP) field and an End Byte Position (EBP) field for each full or partial source object protected, and an ESI field. For each source object that is to be protected, the FEC Encoding Object 954 may include the portion of the source object that is to be protected.

Figure 10:
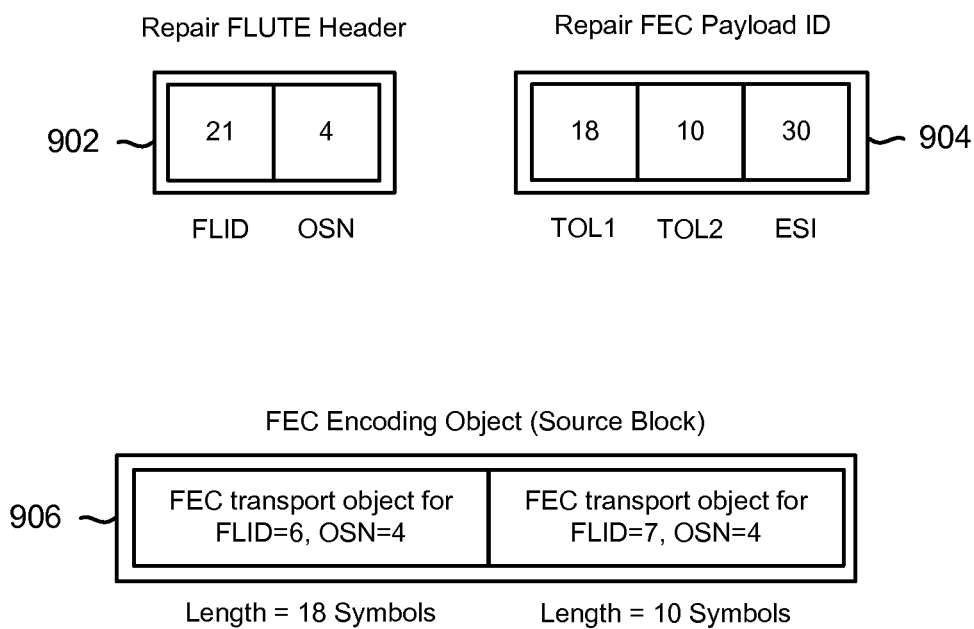
FIG. 10 is a block diagram illustrating data-fields of a communication packet suitable for use in performing forward error correction (FEC) operations for two synchronized source flows in accordance with an embodiment.

The top portion of FIG. 10 illustrates various data-fields that may be included in repair packets suitable for use in performing FEC for two synchronized source flows. The example illustrated in FIG. 10 corresponds to the example repair flow declaration discussed above.

In the example illustrated in FIG. 10, the OSN field of the repair FLUTE Header 902 is for two protected source flows, and the FEC Encoding Object 906 includes a concatenation of the FEC transport object having FLID=6 and the FEC transport object having FLID=7 for an object having OSN 4. The lengths of the FEC transport objects that are protected may be identified by listing the TOLs of the two FEC transport objects in the Repair FEC Payload ID 904 in the appropriate order (i.e., 18, 10), such as the order the objects are listed in the declaration.

An example repair flow declaration that protects two unsynchronized source flows may be represented in a server or receiver device as follows:

```
flow_declararation{
    flow_type = repair
    FLID = 22
    repair_type = unsynchronized, source_FLIDs = 8, 9
    FEC Encoding ID = 6, Al = 8, T = 1280, Z = 1, N = 1
}
```

In the above example of a flow declaration, the type of flow is indicated by the flow_type value, in this case "repair." The flow identifier for this flow is indicated by the FLID value, in this case "22." The repair type is indicated by the repair_type value, in this case "unsynchronized." The source flows protected by this repair flow are indicated by the source_FLIDs values, in this case the source flow with FLIDs "8" and "9". The FEC OTI is the same as in previous examples.

Different data-fields may be included in repair packets so that they are suitable for use in performing FEC over portions of a source object. For example, the Repair FEC Payload ID 904 may include a start position (Start Pos) field and an end position (End Pos) field for each protected portion that are suitable for use in identifying the symbol or byte ranges for the protected portions of an object.

Figure 11:
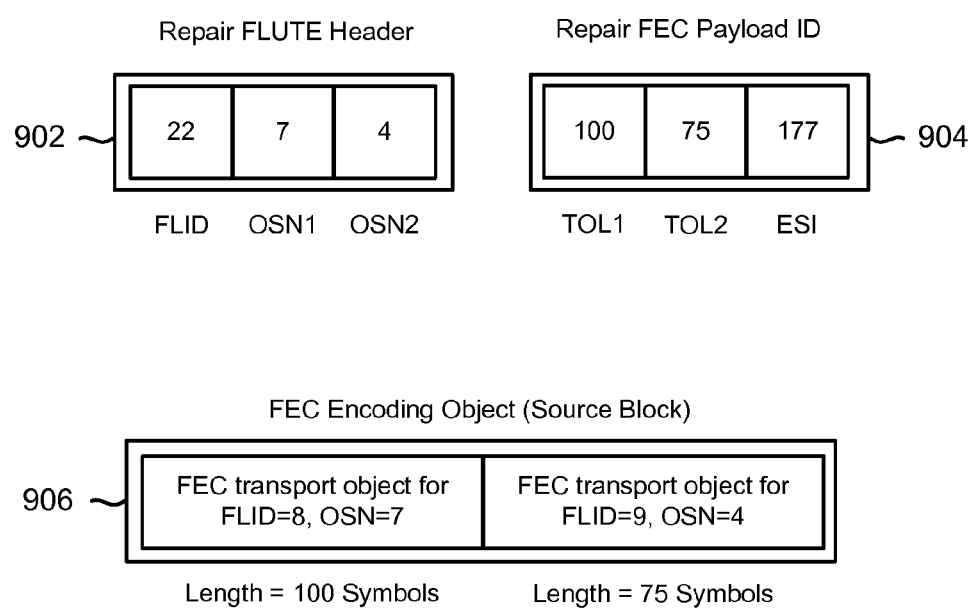
FIG. 11 is a block diagram illustrating data-fields of a communication packet suitable for use in performing forward error correction (FEC) operations for two unsynchronized source flows in accordance with an embodiment.

The top portion of FIG. 11 illustrates various data-fields that may be included in repair packets suitable for use in performing FEC for two unsynchronized source flows, and which corresponds to the example repair flow declaration that protects two unsynchronized source flows discussed above. In the example illustrated in FIG. 11, the Repair FLUTE Header 902 includes an OSN field (OSN1, OSN2) for each of the objects, namely the objects identified in the repair flow declaration via the "source_FLIDs" field (i.e., objects having a FLID of 8 and 9).

Various embodiments may represent the object sequence number (OSN) in an object sequence number indicator (OSNI) field or value, for either source flows or repair flows. The OSNI may be a short form for signaling the OSN for synchronized or unsynchronized repair flow protection. The OSNI may also be used to indicate whether or not an object is to be FEC protected in the current bundle of protected objects. That is, a zero OSNI value may indicate that no source object is to be protected, whereas a non-zero OSNI value may indicate that a source object is to be protected within the bundle.

Various embodiments may set the OSNI value to ((OSN modulo 255)+1) when there is a source object to protect. The mapping from an OSNI value to an OSN may be done based on a combination of the OSNI value and the start and end transmission time information in the source flow declaration for the protected source flow.

As an example, suppose that the duration of transmission for each source object of a source flow is two (2) seconds and the transmissions for the source objects are consecutive in time. Further suppose that the total duration of the transmission is 1401 seconds when a source packet with OSNI=191 is received. In this case, the possible OSN values that map to OSNI=191 include OSN=190, 445, 700, 955, 1210, etc. Yet, the source object with OSN=190 is transmitted during the interval of time 380 to 382 seconds, the source object with OSN=445 is transmitted during the interval of time 890 to 892 seconds, the source object with OSN=700 is transmitted during the interval of time 1400 to 1402 seconds, the source object with OSN=955 is transmitted during the interval of time 1910 to 1912 seconds, and the source object with OSN=1210 is transmitted during the interval of time 2420 to 2422 seconds. As such, an embodiment receiver device may determine, with a high degree of confidence, that a source packet with OSNI=191 received at 1401 seconds into the transmission corresponds to OSN=700.

Note that in the above example, the receiver device may be incorrect in its assumption/determination when packets with other OSN values that map to OSNI=191 are received at time 1401 seconds. However, this typically only happens when packets are transmitted or received at least 500 seconds earlier or later than advertised in the transmission time information in the source flow declaration. For example, when packets from the source object with OSN=445, which are meant to be transmitted between 890 and 892 seconds, are received at 1401 seconds, an embodiment receiver device may determine that the packets arrived over 500 seconds later than their scheduled transmission time, and respond accordingly.

In an embodiment, the OSNI may be one (1) byte in length. This may mean that the system may only use one byte of the FLUTE header per flow, as opposed to the three (3) bytes that may be required when using OSN, for either source or repair flows. For repair flows, the OSNI may also allow the system to signal that "no object" is to be protected, which may be accomplished by setting the value of OSNI equal to zero (0). In this manner, they system may support a variable number of protected source objects. That is, the number of protected source objects may be variable.

An example repair flow declaration that protects three unsynchronized source flows using OSNI instead of OSN (short form) may be represented in a server or receiver device as follows:

```
flow_declararation{
    flow_type = repair
    FLID = 23
    repair_type = unsynchronized short, source_FLIDs = 8, 8, 9
    FEC Encoding ID = 6, A1 = 8, T = 1280, Z = 1, N = 1
}
```

In the above example of a flow declaration, the type of flow is indicated by the flow_type value, in this case "repair." The flow identifier for this flow is indicated by the FLID value, in this case "23." The repair type is indicated by the repair_type value, in this case "unsynchronized short," which indicates that unsynchronized protection using short OSNI fields (instead of the longer OSN fields in repair packet headers). The source flows protected by this repair flow are indicated by the source_FLIDs values, in this case the source flow with FLIDs "8", "8" and "9". The FEC OTI is the same as in previous examples.

Figure 12:
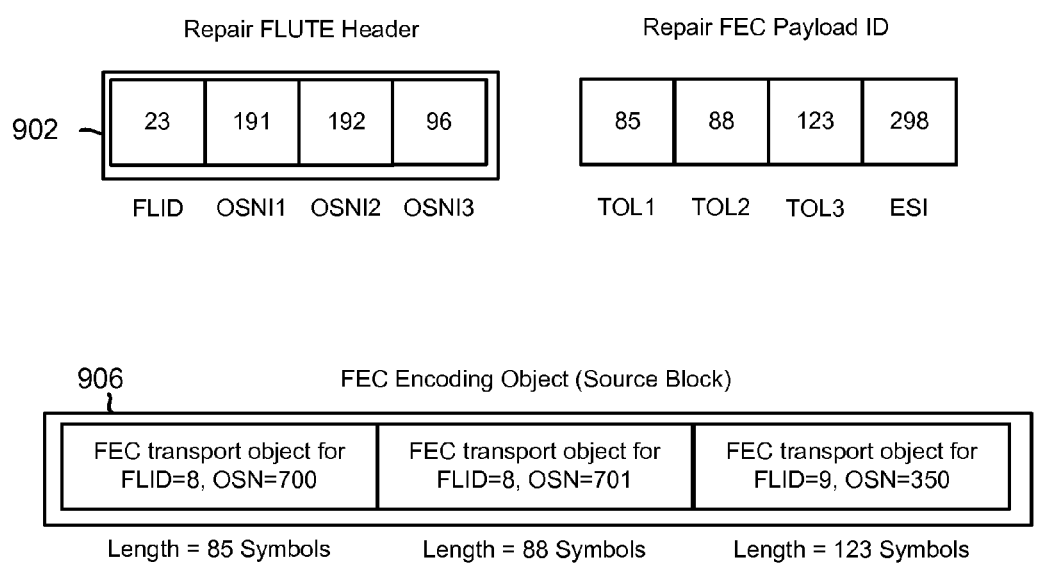
FIG. 12 is a block diagram illustrating data-fields of a communication packet suitable for use in performing forward error correction (FEC) for three unsynchronized short source flows in accordance with an embodiment.

The top portion of FIG. 12 illustrates various data-fields that may be included in repair packets suitable for use in performing FEC for three unsynchronized source flows, and which corresponds to the example repair flow declaration discussed immediately above. In the example illustrated in FIG. 12, the Repair FLUTE Header 902 includes an OSNI field (OSNI 1-3) for each of the objects. The values of the OSNI fields (OSNI 1-3) may be equal to ((OSN modulo 255)+1) of their corresponding three FEC transport objects. The FEC Encoding Object 906 protects two FEC transport objects with FLID=8 and one FEC transport object with FLID=9.

Suppose in this example that for the source flow with FLID=8 the source packets for each subsequent source object are transmitted for two (2) non-overlapping seconds, that for the source flow with FLID=9 the source packets for each subsequent source object are transmitted for 4 non-overlapping seconds, and that the repair packets for the repair flow with FLID=23 are transmitted over a similar interval of time during which the source packets for the source objects that they protect are transmitted. Further suppose that the repair packet with the header shown in the top portion of FIG. 12 is received at time 1401 seconds. In this case, an embodiment component may determine, with a high degree of confidence, that the source object of the source flow with FLID=8 that corresponds to OSNI=191 is the source object with OSN=700, that the source object of the source flow with FLID=8 that corresponds to OSNI=192 is the source object with OSN=701, and that the source object of the source flow with FLID=9 that corresponds to OSNI=96 is the source object with OSN=350.

Various embodiments may include components configured to perform FEC recovery of source objects and/or portions of source objects. A receiver device may be configured to determine the source objects or portions that are protected by a received repair packet from the FLIDs (e.g., TSI field value) of source flows listed in repair flow declaration for that repair packet, the OSNs in repair packet header of the repair packet, and/or from the range of source symbols from the protected source object.

The receiver device may be configured to determine the range of symbols for the portions of protected objects from start and end position value fields in the repair FEC payload ID 904 of the repair packet. The receiver device may determine the FEC transport object size (in symbols) for each of the protected source objects from the TOLs in the repair FEC payload ID 904 of the repair packet. In an embodiment, the receiver device may be configured to determine the size of the FEC Encoding Object 906 by summing the FEC transport object sizes. The receiver device may use the ESI carried in the repair FEC payload ID 904 of the repair packet to determine how the symbol (or symbols or portions of symbols) is generated from the FEC Encoding Object 906.

The receiver device may be configured to determine identity and placement of source data into the FEC Encoding Object 906 from a received source packet for one of the protected source objects. For example, the identity and placement of source data into the FEC Encoding Object 906 from a received source packet for one of the protected source objects may be determined from the FLID and OSN received in the source packet header, from the TOLs of the FEC transport objects, from the symbol range, and from the byte offset in the source Payload ID of the source packet. The FEC decoder of the receiver device may recover all or portions of an FEC Encoding Object 906 based on receiving in combination enough source data of the FEC Encoding Object 906 (or portions of the object) from source packets, byte or symbol range information, repair symbols for the FEC Encoding Object 906 from repair packets, and properly placed source packet data.

The receiver device may be configured to extract FEC transport objects (or portions thereof) from the FEC Encoding Object 906. The receiver device may extract the source objects (or portions) from the FEC transport objects based on the source object size field at the end of each FEC transport object and/or from the byte range information.

In an alternative embodiment, as opposed to using a byte range, the components may be configured to use the source FEC Payload ID of an existing FEC scheme. This embodiment may better support backward compatibility with existing FEC schemes, at least on the source delivery level. This embodiment may also support object bundling. For example, the Source FEC Payload ID may be converted to a byte range prior to performing the FEC operations or applying the advanced FEC framework discussed in this application. This embodiment may further allow applying the advanced FEC framework with arbitrary FEC schemes in a source protocol component, which is discussed in detail further below.

As another alternative, a component may be configured to signal the transport source objects protected by a repair flow so as to avoid in-band signaling within repair packet headers. In particular, instead of carrying a list of OSNs (or OSNIs) explicitly in repair packet headers, the source object TOIs that are to be protected by a repair flow may be signaled using templating within the repair flow declaration.

The various embodiments may include components configured to perform chunk delivery/reception with repair flows. On the broadcast side, a server may send source objects in chunks as they become available, repair protected source objects that are sent after the source packets for those objects, and minimize its contribution to end-to-end delay. On the receiver side, a receiver device may recover source object as it arrives in chunks. The source object data may be made available to a client application as it is received. The receiver device may playback the first source object playback only when repair is received for object, even if no FEC decoding is needed. This prevents stalls in the future when FEC decoding is needed for subsequent source objects. Alternatively, FEC encoding may be applied to portions of source objects, allowing FEC decoding of portions of source objects as they arrive at the receiver device, and thus allowing more immediate playback at the receiver device.

In an embodiment, the receiver device may be configured to begin playback/rendering of the first source object immediately after a source object is received. Subsequent packet loss that requires FEC decoding may trigger a stall while waiting for the arrival of FEC repair. Advanced media playout systems may combine such FEC technologies by adjusting the playout rate of the media, for example by playing at a lower video frame rate than the nominal or by using audio processing to extend the playout time.

In a further embodiment, the methods of packaging information into objects can be extended to provide transport of generic files and assets within MPEG Media Transport (MMT) for enhancing MMT to provide similar capabilities and benefits and functionalities to those described above that enhance FLUTE/3GPP MBMS. This embodiment solves the problem of delivering a sequence of related files (e.g., a video or audio stream that is partitioned into a sequence of files) that are to be delivered over a network, typically in broadcast or multicast mode. A motivating example is delivering DASH segments, where each segment is a file of an audio or video or multiplexed audio/video DASH representation.

There are existing solutions for delivering DASH segments via MBMS, but these existing solutions lack the ability to indicate or signal that a sequence of files are logically related and/or lack the ability to specify a relationships between segments, files, objects, entities, streams, etc. As described above, we describe herein methods that enhance MBMS with these abilities and signaling. The embodiments described herein can also provide new signaling, protocols, procedures and methods that enhance the MPEG MMT suite of protocols towards the same overall system architecture and methods that are described above for the FLUTE/3GPP MBMS suite of protocols, and also enhance the overall methods and signaling operations described above.

In overview, this embodiment provides a solution for the delivery of generic assets over MMT protocols. A generic asset may be one or more files that are logically grouped and share some commonality for an application, such as segments of a DASH Representation, a sequence of MPUs, etc. The components may be configured to use a General File Delivery Session (GFDS) to deliver a generic asset via the General File Delivery (GFD) protocol.

A new data type for a generic asset or object may be defined for a payload that contains a generic object to be transported. Packets carrying generic objects may have a generic payload header. Each file delivered within a GFD session may be associated with transport delivery information. This may include, but is not limited to, information such as the transfer length and transfer coding. For transfer coding, different types may be defined that enable the delivery of files without in-band meta-information, files with in-band meta-information, and which enable the progressive delivery of files with in-band meta-information.

Generally, the MMT protocol relies on existence and availability of session information at the receiver in order to interpret the protocol packets. The session information may describe a flow and how objects delivered via the flow are to be interpreted and/or accessed by the receiver device. In an embodiment, such session information may be defined, included in, and/or delivered in one or more code points. For example, a code point may be used to signal that a packet or a sequence of related objects conform to specific set of restrictions that are defined in the code point. In these embodiments, a packet_id attribute and value may be used to accomplish the operations discussed above with reference to Flow ID (FLID). Thus, in the context of transporting generic files and assets within MMT, the packet_id may be the same as, or correspond to, the FLID attribute discussed above.

Embodiments may include components configured to assign to an object or a sequence of related objects information that is typically only available when delivering content via HTTP. The embodiments may include components configured to assign the information to the object or sequence of objects, and deliver and use such information in an efficient manner. This may be accomplished by adding information that is static and the same for multiple objects into a code point that defines the session information.

Briefly, a code point may define, include, or specify various properties, such as a file delivery mode and the maximum transfer length of any object delivered with this code point signaling. In addition, a code point may include any of the following information: the actual transfer length of the objects; any information that may be present in the entity-header; a Content-Location-Template using the TOI and packet_id parameters (if present); and specific information on the content (e.g., how the content is packaged, etc).

There may be multiple classes of properties in a single session. In an embodiment, each code point may be generated to define a class of properties, and multiple code points may be used to communicate the multiple classes of properties for the session.

In an embodiment, each code point may be generated so as to be specific to a particular object in a sequence of related objects, or a particular subsequence of the related objects. That is, each object in the sequence of objects may refer to one code point. In an embodiment, the code points may be defined in a template file or similar data structure.

Embodiments may include components configured to signal multiple code points within one session. The components may generate an entity header that includes all the information and properties available in HTTP RFC 2616, and additional or supplementary information, via the code points. The components may generate code points that include non-static information, such as templates that include parameters that may be resolved (e.g., using TOI, etc.).

Embodiments may include components configured to deliver files in the GFD session may have to be provided to an application (e.g., Composition Information document, Media Presentation Description, etc.). The file may be referenced through the URI provided or derived from Content-Location, which may be provided either in-band or as part of the session description. That is, there may be an application that references the files, and including such information in the session description may allow for the establishment of a connection suitable for transporting generic files and assets within MMT.

In an embodiment, a code point may define different ways to deliver a file or object. For example, an object may be a regular file that does not include any additional information (i.e., regular file mode). The object may be an entity that includes an entity header and a file (i.e., regular entity mode). The object may be delivered as an entity header, file, and a trailer (i.e., progressive entity mode).

Figure 13A:
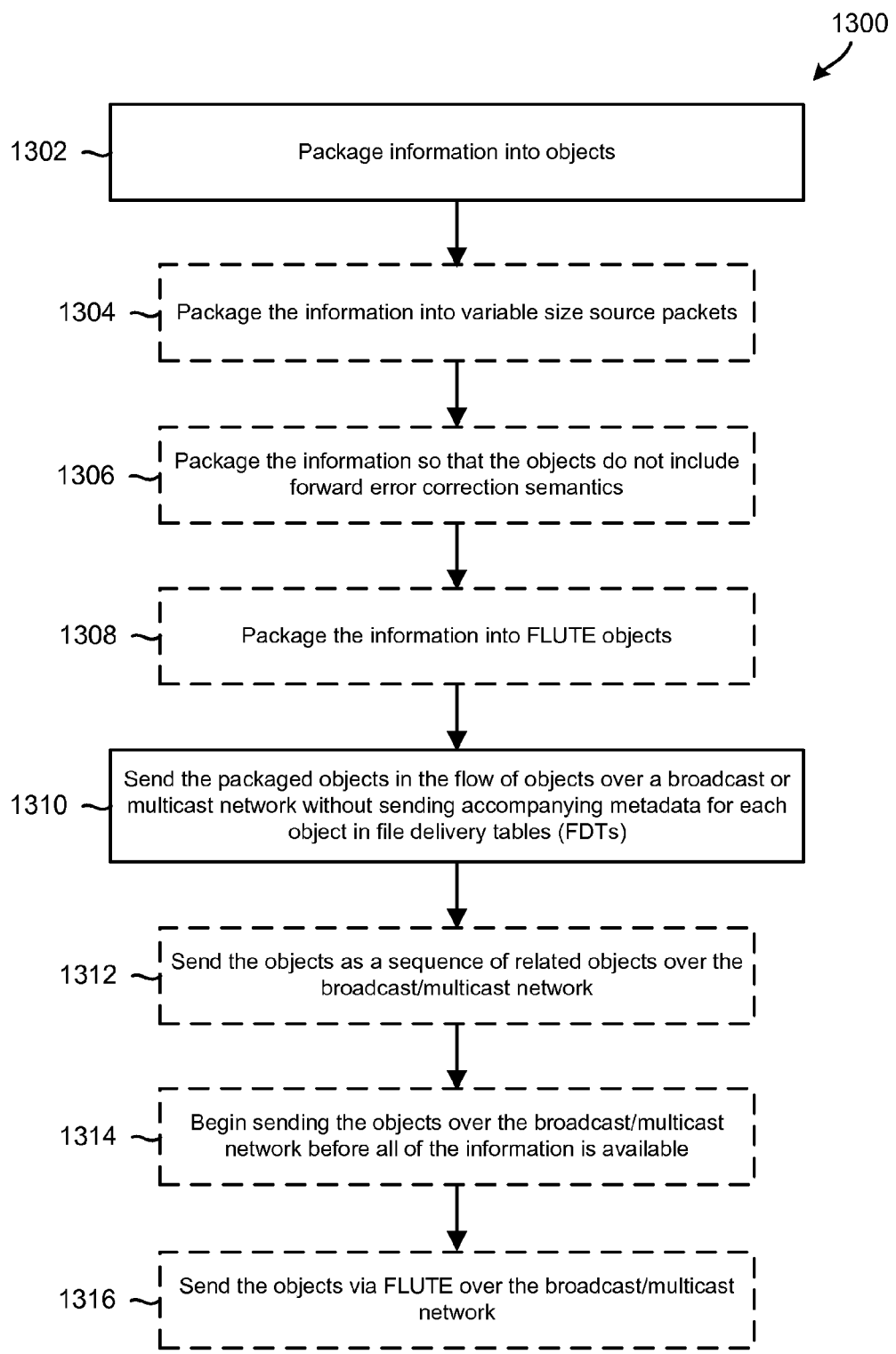
FIG. 13A is a process flow diagram illustrating an embodiment server method of communicating information in a flow of objects over a broadcast or multicast network.

FIG. 13A illustrates an embodiment server method 1300 of communicating information in a flow of objects over a broadcast or multicast network. In block 1302, a server processor of a server in the broadcast network may package the information into objects. In an embodiment, as part of packaging the information into objects in block 1302, the server processor may package the information into variable size source packets in optional block 1304. In an embodiment the server processor may, as part of block 1302, package the information so that the objects do not include forward error correction semantics in optional block 1306. In an embodiment, as part of block 1302, the server processor may package the information into FLUTE objects in optional block 1308.

In block 1310, the server processor may send the objects in the flow of objects over the broadcast network without sending accompanying metadata for each object in file delivery tables (FDTs). In an embodiment, as part of block 1310, the server processor may send the objects as a sequence of related objects in optional block 1312. In an embodiment, as part of block 1310, the server processor may begin object transmissions before all of the information is available in optional block 1314. In an embodiment, as part of block 1310, the server processor may send the objects via FLUTE over the broadcast network in optional block 1316.

Figure 13B:
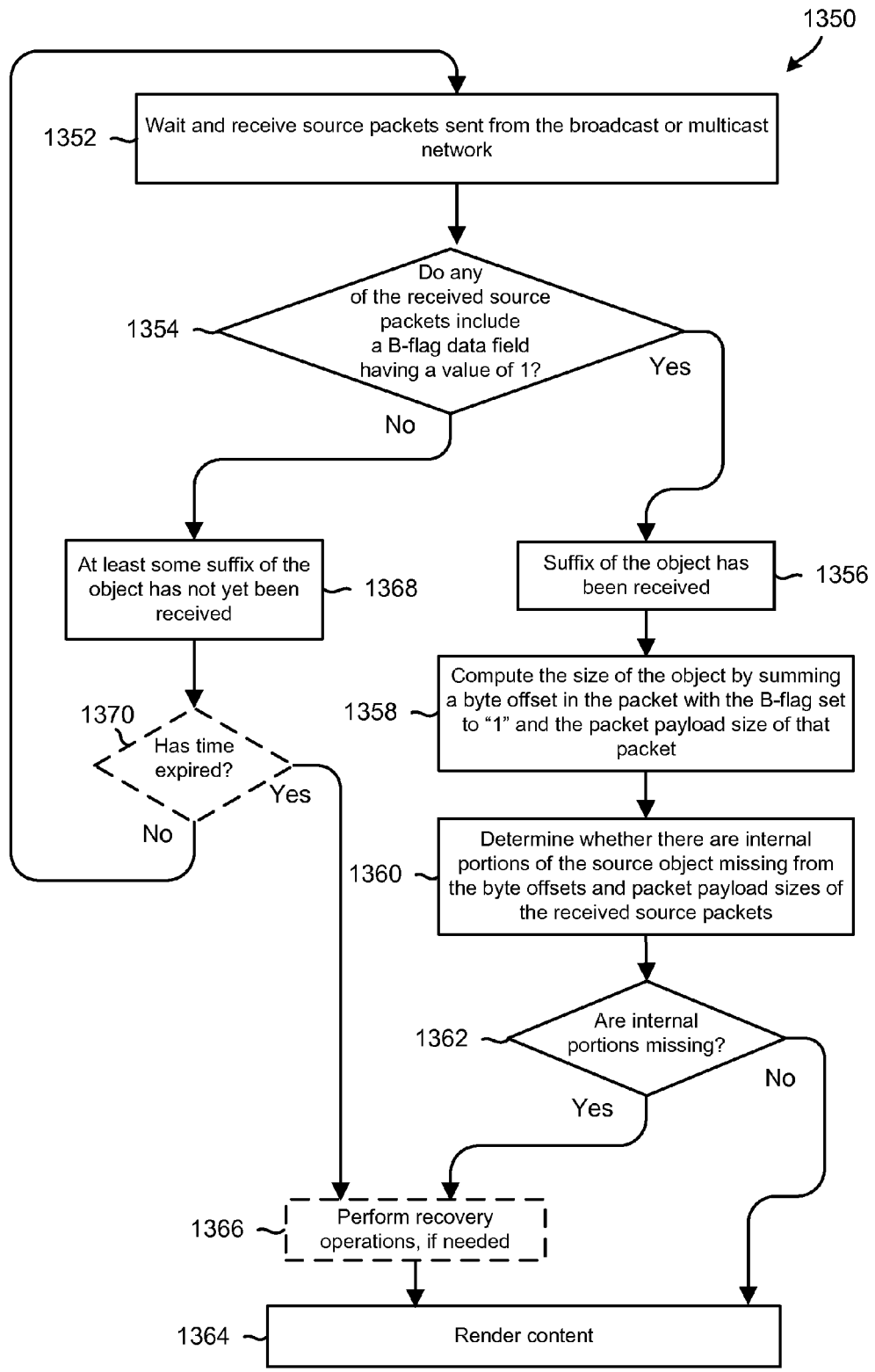
FIG. 13B is a process flow diagram illustrating an embodiment receiver device method of receiving information in a flow of objects over a broadcast or multicast network and determining if the entire source object has been received or if a portion of the object is missing from the received source packets.

FIG. 13B illustrates an embodiment receiver device method 1350 of receiving information in a flow of objects over a broadcast or multicast network and determining if the entire source object has been received or if at least some portion of the object is missing from the received source packets. In block 1352, a device processor of a receiver device may receive source packets sent from the broadcast or multicast network. In determination block 1354, the device processor may determine if any of the received source packets include a B-flag data-field having a value of "1."

When the device processor determines that the received source packets include a B-flag data-field having a value of "1" (i.e., determination block 1354="Yes"), in block 1356, the device processor may determine that it has received the suffix of the object. In block 1358, the device processor may compute the size of the object by summing a byte offset in the packet with the B-flag set to "1" and the packet payload size of that packet. In blocks 1360 and 1362, the device processor may determine whether there are internal portions of the source object missing from the byte offsets and packet payload sizes of the received source packets. When it is determined that there are not internal portion missing from the received source packets (i.e., determination block 1362="No"), in block 1364, the device processor may render the content and/or information included in the received source packets. When it is determined that there are internal portion missing from the received source packets (i.e., determination block 1362="Yes"), in optional block 1366, the device processor may perform recovery operations, such as waiting to receive additional the information, requesting that the information be re-sent, using received repair packets to FEC decode the missing portions of the source object, or processing the received packets so as to present the content with a degraded quality.

When the device processor determines that the received source packets do not include a B-flag data-field having a value of "1" (i.e., determination block 1354="No"), in block 1368, the device processor may determine that at least some suffix of the object has not yet been received. In optional determination block 1370, the device processor may determine if a timer has expired or another test condition has been met to indicate that there is a high probability that the suffix of the object will not be received. If the device processor determines that the timer has not expired or the other test conditions have not been met (optional determination block 1370="No"), in block 1352, the device processor may wait to receive additional source packets.

When the device processor determines that the timer has expired or another test condition has been met (optional determination block 1370="Yes"), in optional block 1366, the device processor may perform any of a number of recovery operations, such as using received repair packets to FEC decode the missing portions of the source object or requesting that the information be re-sent or processing the received packets so as to present the content with a degraded quality.

In various embodiments, the server and receiver components may be configured so that any or all of the above mentioned operations, methods, and solutions may be performed, accomplished, or implemented as extensions of existing technologies and/or structures.

Figure 14A:
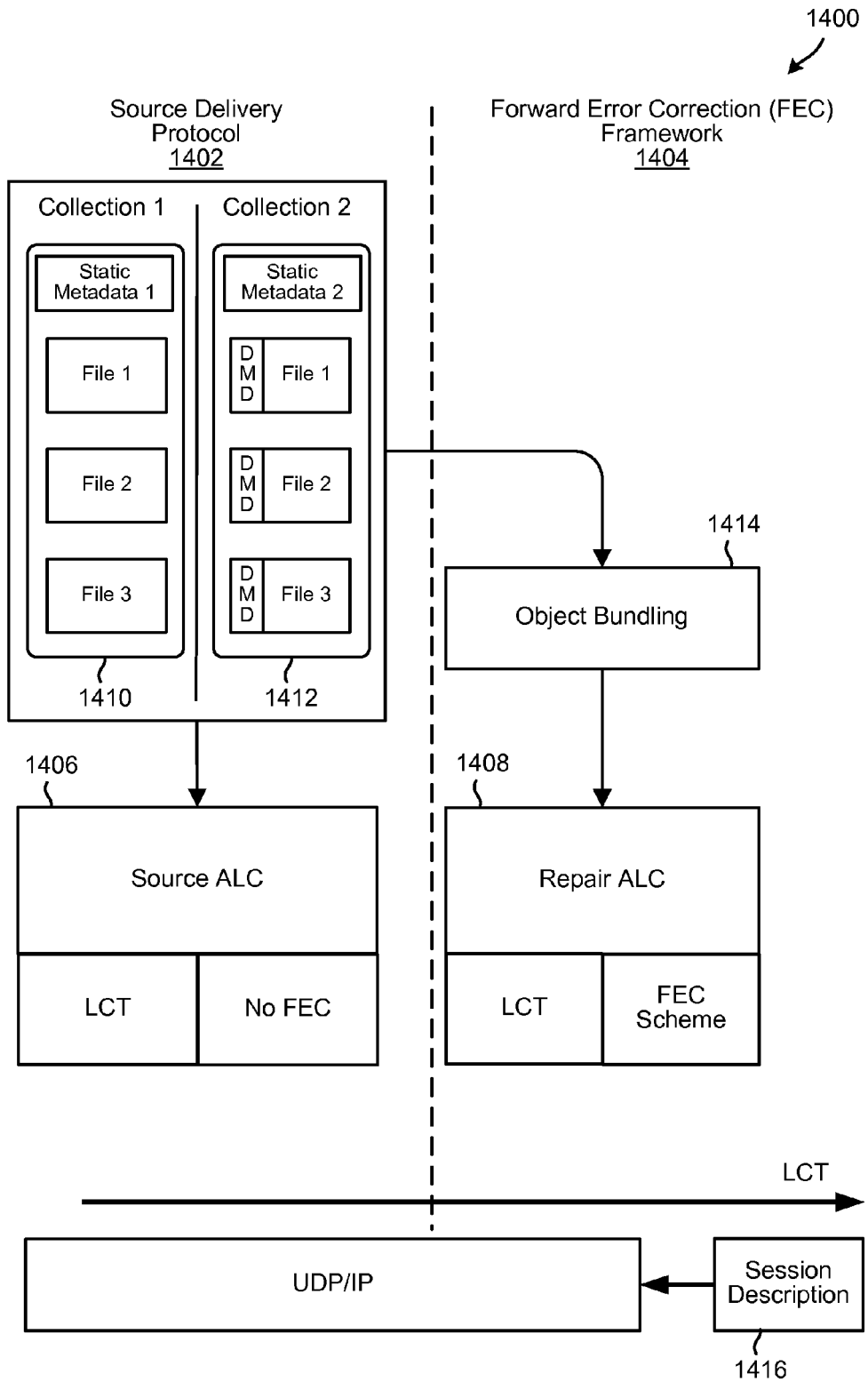
FIGS. 14A and 14B are block diagrams that illustrate various logical and functional components of broadcast communication systems that are suitable for communicating content in accordance with various embodiments.
Figure 14B:
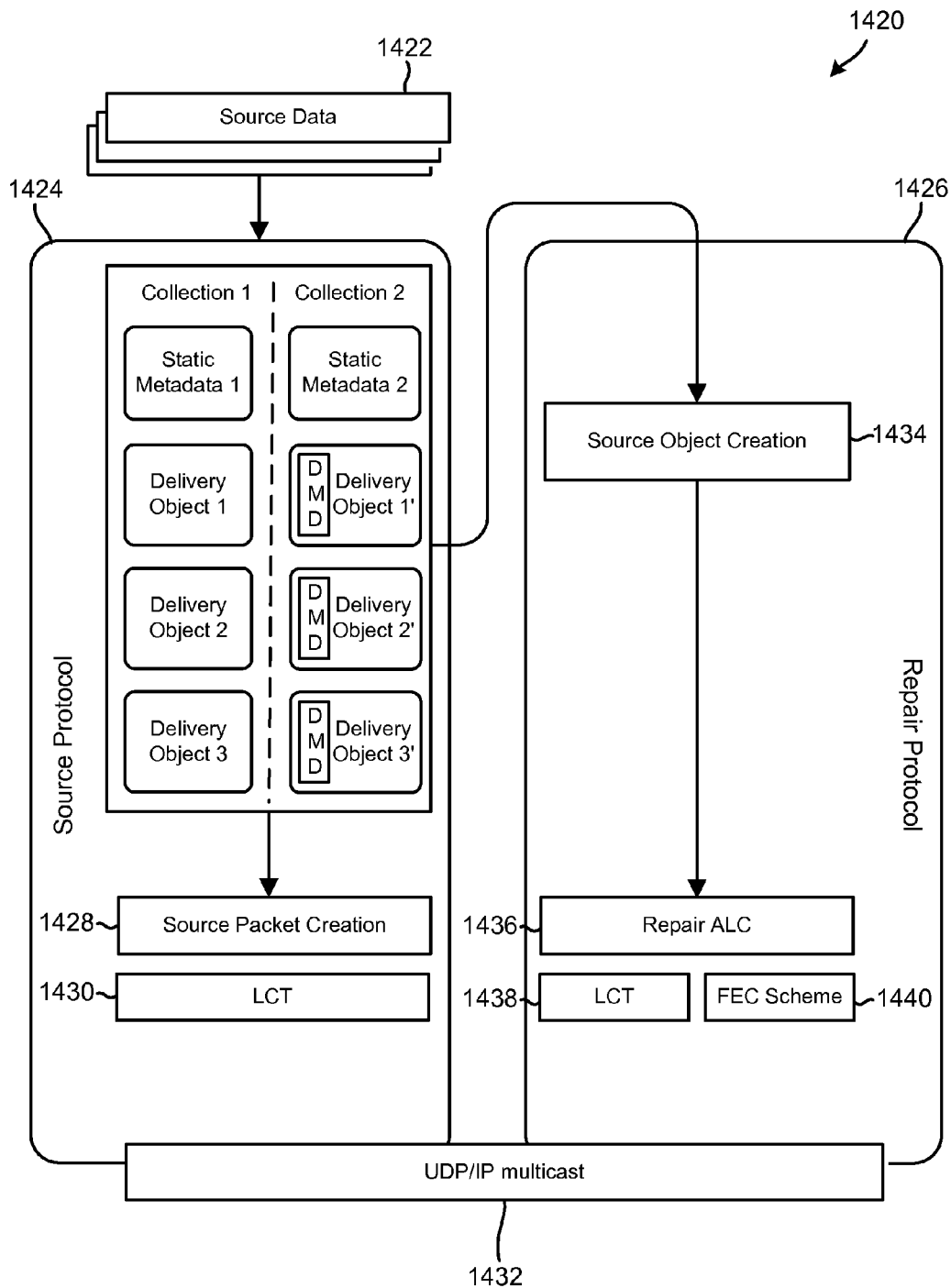

FIGS. 14A-B illustrate logical and functional components in broadcast communication systems 1400, 1420 that are suitable for communicating content in accordance with various embodiments. In each of these broadcast communication systems 1400, 1420, the operations for receiving, packaging, FEC protecting, signaling and communicating information are divided into separate and independent groups or categories of operations, and each group or category of operations may be performed by one or more hardware and/or software components (e.g., server computing devices, etc.). Such grouping/organization may better allow each of broadcast communication systems 1400, 1420 to better support a variety of different protection schemes and delivery technologies, protocols, and standards.

FIG. 14A illustrates that the broadcast communication system 1400 may be split or organized in two major groups: a source delivery protocol 1402 and a forward error correction (FEC) framework 1404. Splitting/organizing the system 1400 in this manner allows for two asynchronous layered coding (ALC) instantiations to be multiplexed or otherwise combined. This allows content to be delivered via a variety of existing technologies and/or structures, including existing FLUTE frameworks. This organization/grouping also allows the broadcast communication system 1400 provide a number of other enhancements and benefits over existing broadcast solutions, including the features discussed herein.

In the example illustrated in FIG. 14A, the source delivery protocol 1402 includes source ALC component 1406. The source ALC component 1406 may be configured to include a source LCT and not require the use of FEC (no FEC). The forward error correction (FEC) framework 1404 may include an object bundling component 1414 and a repair ALC component 1408. The repair ALC component 1408 may include a repair LCT and an FEC scheme.

The source delivery protocol 1402 encodes multimedia content in two collections of files 1410 and 1412. Each collection 1410, 1412 may include a group of related files. As an example, the first collection 1410 may include video data files, and the second collection 1412 may include audio data files. Each collection 1410, 1412 may or may not be a flow. Each collection 1410, 1412 may be assigned static metadata (Static Metadata 1, Static Metadata 2). In the example illustrated in FIG. 14A, each file in the second collection is associated with dynamic metadata (DMD).

The system 1400 may be configured to treat each file in the system as an individual object, and each file/object may be delivered through an ALC instantiation.

The source ALC component 1406 may be configured to deliver files, objects, flows, bundles or collections. The repair ALC component 1408 may be configured to flexibly protect the files, objects, flows, bundles, or collections for FEC.

The system 1400 may define a new protocol handler for LCT/UDP that identifies the protocol. In an embodiment, the system 1400 may use a code point to identify different collections of objects and assign parameters.

The system 1400 may be configured to support sending byte ranges of objects out of order and the signaling for the transmission of the objects in the session definition so that a client application (e.g., in a receiver device) may be informed of the objects and/or transmissions in advance, possibly with a maximum interleaving depth. This allows the system 1400 to support formats for which the size of the object needs to be added in the beginning of file. This also allows the content data of the object to be sent first, and the size field/header to be sent later once the header data is available by indicating a byte range number that is smaller than earlier sent data of the same object. This allows a receiver device to reconstruct the object, with the header being added at the specified byte range.

In an embodiment, the system 1400 may be configured to provide a start TOI, an end TOI, or both, which may be used to signal a restricted list. In further embodiments, a code point may refer to the static FDI in use, and an LCT time header may be used to synchronize server time and client as well as for measuring end-to-end latency or jitter. A repair flow may include a reference to the session description 1416 and code point, which may used to obtain detailed protection characteristics.

In an embodiment, the FEC framework component 1404 may be configured to send only the repair packets. In an embodiment, the system 1400 may be configured to define an LCT extension header so as to enable sending the size of the individual objects. In an embodiment, the system 1400 may be configured to define a super-object that is FEC protected.

FIG. 14B illustrates various components and information flows in an example broadcast communication system 1420 configured to generate an FEC repair packet based on two collections (i.e., two related groups of objects), and deliver the objects to a receiver device independent of the FEC repair packet in accordance with various embodiments. In the example illustrated in FIG. 14B, the broadcast communication system 1420 is organized into a source protocol component 1424 and a repair protocol component 1426. The repair protocol component 1406 includes a source object creation component 1434, a repair ALC component 1436, an LCT component 1438, and an FEC scheme component 1440. The source protocol component 1424 includes a source packet creation component 1428 and a LCT component 1430, the combination of which may be configured to deliver objects (e.g., source/delivery objects) or flows/collections of objects. In an embodiment, the source packet creation component 1428 and/or the LCT component 1430 may be an Asynchronous Layered Coding (ALC) instantiation.

The source protocol component 1424 may be configured to receive, use, package, and communicate source data 1442. The source protocol component 1424 may communicate the source data 1442 via delivery objects or flows/collections of objects. Each delivery object may be an object that is self-contained for the application, possibly in combination with information from static metadata, and the LCT header data of transmission session/stream identifier (TSI) and transmission object identifier (TOI).

The source protocol component 1424 may be configured to receive and use source data 1422 that includes a diverse set of information units/entities, each of which may have different characteristics or properties. For example, the source protocol component 1424 may receive and use source data 1402 that includes a combination of non-real-time and real-time data, a single data file (e.g., gzipped file, etc.) that is only accessible as a whole and includes sub-units (e.g., files) of varying sizes (e.g., between several kBytes up to GBytes), and/or a collection of data files that are individually accessible but only useful together (e.g. objects of a web page, etc.). As further examples, the source data 1402 may include a large multimedia file that is available on the Broadcast Multicast Service Center (BMSC) as whole and distributed without real-time constraints, a collection of timed media segments that are referenced by arbitrary URL names (e.g., one representation in an HLS distribution), a collection of timed media segments that are referenced by a common URL pattern (e.g. a representation in a Media Presentation in DASH), a media segment that is part of a media presentation, multiple media components that are distributed jointly and played out jointly, or a media file that is generated gradually in the server and transmitted prior to the server generating the entire file. As another example, the source data 1402 may include a media file that a receiver device may start rendering, playing, or consuming after receiving only a portion of the media file (e.g., an fragmented MP4 file, a DASH On-Demand format representation, etc.), but which is only made available as a whole to the server.

The source protocol component 1424 may be configured to use the source data 1422 to generate collections of related objects (i.e., Collection 1 and Collection 2). In the example illustrated in FIG. 14B, the source protocol component 1424 generates a first collection (Collection 1) that includes three delivery objects (i.e., Delivery Objects 1-3) and static metadata (i.e., Static Metadata 1). The second collection (Collection 2) includes static metadata (i.e., Static Metadata 2) and three delivery objects (i.e., Delivery Objects 1'-3') that are associated with dynamic metadata (DMD).

In an embodiment, the source protocol component 1424 may be configured to deliver session information as a download delivery session. The download delivery session may be included in, or described by, a session description protocol (SDP) unit.

In an embodiment, the source protocol component 1424 may be configured to signal an FEC scheme that describes the usage of the session information or source protocol. In an embodiment, the source protocol component 1424 may be configured to signal the FEC scheme via the session description protocol (SDP) unit.

In various embodiments, the source protocol component 1424 may be configured to generate, use, or communicate static and/or dynamic file delivery descriptors (FDDs). The source protocol component 1424 may generate, use, or communicate one or more static FDD fragments for each download delivery session. The source protocol component 1424 may associate one or more static FDD fragments with a single download delivery session. Each FDD may be identified via a @tsi data-field value that is included the download delivery session of the Session Description Protocol (SDP) unit. In an embodiment, the source protocol component 1424 may generate, use, or communicate the FDD so that it replicates all functionalities of a File Delivery Table (FDT). In an embodiment, the source protocol component 1424 may be configured to generate, use, or communicate the FDD so that it may be used to generate an equivalent of an FDT, such as by using the TOI and templates.

In various embodiments, the source protocol component 1424 may be configured to generate, use, and/or communicate a source flow declaration. The source flow declaration may be included in, and communicated via, the user service description (USD). In an embodiment, the USD may be generated to include metadata fragments. Each metadata fragment may include StaticFDD data-field that specifies the static file delivery descriptor (FDD). Each StaticFDD data-field may also include various other data-fields, such as a @tsi data-field, a @objectDeliveryMode data-field, a @oufOfOrderSending data-field, a @expires data-field, a @complete data-field, a @contentType data-field, a @contentEncoding data-field, a CodePoint data-field, a File data-field, and a FileTemplate data-field. Each of these data-fields may include information that may be used by the various embodiment components to identify or determine various characteristics of the source data, delivery objects or communications.

For example, the @oufOfOrderSending data-field may include information that may be used to determine whether the source data 1422 is sent out of order. The @objectDeliveryMode data-field may include information that may be used to identify an object delivery mode. The @tsi data-field may include a transmission session/stream identifier (TSI), or information that may be used to identify a transport session to which the static file delivery descriptor (FDD) is assigned to in the LCT header. For example, the @tsi data-field may include a TSI that identifies the static FDD instance used to interpret the delivery object or collection of delivery objects. In addition, the @tsi data-field may further include a unique identifier (within the scope of the session) for the delivery object or collection of delivery objects.

The CodePoint data-field of the StaticFDD data-field may include information that identifies the code points that are used in the packet header and/or identifies mappings to specific values. The CodePoint data-field may include various other data-fields, such as a @assignment data-field, a @schemeIDURI data-field, and a @value data-field. The @assignment data-field may include information that identifies the value of the CP field (Code Point field) that is assigned to a code point. The @schemeIDURI data-field may include information that identifies a scheme that defines the code point. The @value data-field may include information that identifies the value of the scheme that defines the code point.

The File data-field of the StaticFDD data-field may include the same or similar information that is typically included in a "File element" when using existing FLUTE solutions. However, unlike the "File element" used in existing solutions, the File data-field is not required to include FEC parameters. In addition, the File data-field may include various other data-fields, such as a @byteRange data-field. The @byteRange data-field may include information that identifies a byte range of the file that constitutes the delivery object. This byte range may be expressed or formatted as a byte-range specific expression, or an expression that identifies a contiguous range of bytes. Embodiment components (e.g., a receiver device) may use this information to determine whether the delivery object includes the entire file or portions of the file. For example, a component may determine that the entire file is the delivery object in response to determining that the @byteRange data-field is null, empty, or does not include a value.

The FileTemplate data-field of the StaticFDD data-field may include information that may be used by embodiment components to identify a file template, which may be included in the body of the delivery object or HTTP entity. The FileTemplate data-field may include various other data-fields, such as a @startTOI data-field and a @endTOI data-field. The @startTOI data-field may include information that may be used to identify the first TOI that is delivered. The @endTOI data-field may include information that identifies the last TOI that is delivered.

In the various embodiments, the source protocol component 1424 may be configured to describe all the files delivered in session. The source protocol component 1424 may describe the files individually or via a list. The source protocol component 1424 may also include static file information in a one-time static description (e.g., File Delivery Descriptor), and use header fields to create dynamic information, such as URL/URI information. The source protocol component 1424 may use this technique to describe an object, set of objects, or collection. Embodiment components may identify collections or groups of objects using any of the various techniques described herein. For example, the TSI value may scope a collection or group of objects, in which case the TOI and/or byte range may be used to identify a group of objects.

In the various embodiments, the source protocol component 1424 may be configured to use templates and templating techniques to signal relationships between the locations, names, availability times, and other metadata associated with an object or collection to be delivered. Such templates and templating techniques may be used to provide mechanism to derive URI for object, delivery time for object, relationship between FLID, OSN and URI, etc.

In an embodiment, the source protocol component 1424 may be configured to include a FileTemplate element or data-field in the static File Delivery Descriptor. The FileTemplate data-field may include identifiers that may be replaced with substitution parameters, such as after the entire delivery object or file is received in the receiver device. For example, the FileTemplate data-field may include a $TSI$ identifier that may be substituted with the TSI of the corresponding LCT packet, and a $TOI$ identifier that may be substituted with the TOI of the corresponding LCT packet.

In an embodiment, the source protocol component 1424 may be configured to deliver objects or entities that include meta information in the form of entity-header fields and content in the form of an entity-body (e.g., the file, object, etc.). The source protocol component 1424 may include file attributes in the same delivery object as the file itself, such as via in-band delivery techniques and/or in a dynamic fashion. For example, the source protocol component 1424 may associate and deliver attributes such as Content-Location, Content-Size, Content-Range, etc. via the same delivery object that includes the corresponding file.

In the various embodiments, the source protocol component 1424 may be configured to operate in various file delivery table (FDT) communication modes, including an extended FDT mode. When operating in the extended FDT mode, the source protocol component 1424 may use FDTs and FDT extensions to provide or communicate the information that is typically included in entity headers. The use of FDT extensions may allow the source protocol component 1424 to signal HTTP extension headers and other HTTP capabilities via FLUTE.

The source protocol component 1424 may be configured to operate in various file delivery modes, such as a File Mode, a Regular Entity Mode, a Progressive Entity Mode, a Redundant FDT mode, a Complementary FDT mode, and a Dynamic FDT mode. In an embodiment, the source protocol component 1424 may be configured to identify file delivery mode via the static File Delivery Descriptor unit.

When operating in File Mode, the source protocol component 1424 may deliver objects as regular files or byte ranges of files. That is, when operating in the regular file mode, each delivery object may represent a file or a byte range of a file (i.e., @byteRange is present). The source protocol component 1424 may include all the information associated with a delivery object in a FDD, and all the attributes of the file or byte range may be delivered via the static FDD or static FDT.

The source protocol component 1424 may also operate in the Regular Entity Mode. In this mode, object delivery via LCT may be closely or completely aligned with existing HTTP delivery techniques that deliver content via HTTP entities. As mentioned above, an HTTP entity includes entity-header and entity-body. As such, when operating in the Regular Entity Mode, the source protocol component 1424 may deliver objects as entities that include an entity-header and entity-body (i.e., the file). The delivery objects may be generated or communicated so that they start with the entity-header. The delivery objects may be generated or communicated so that the message body includes a URL and a content range, which may be used to signal, communicate, or determine that the delivery object is a byte range of an object/file, as opposed to a full object/file.

When operating in Regular Entity Mode, the source protocol component 1424 delivers all the attributes of the file in the static file delivery descriptor (FDD) or static file delivery table (FDT) that is applicable to the delivered file. In addition, the entity-header that is sent with the file or byte range (e.g., in-band) may include additional information for that file/byte range. When certain attributes are present in both the FDD and entity-header, then the values in the entity-header may overwrite the corresponding values in the static FDD. When the header contains a Content-Range in the entity-header, then the delivery object may be determined to include a byte range of an object/file, as opposed to a full object/file.

The source protocol component 1424 may also operate in the Progressive Entity Mode to accomplish the progressive delivery of files, similar to that which may be accomplished via chunked transfer mode in HTTP/1.1. When operating in the Progressive Entity Mode, the source protocol component 1424 may deliver objects as entities that include an entity-header, a file, and a trailer. The trailer that may contain additional header fields that enable the source protocol component 1424 to deliver the object/file in a progressive fashion, i.e. it can be delivered before the entire file is generated.

In various embodiments, the source protocol component 1424 may be configured to include the trailer in the code point or the entity header. All the attributes in the static file delivery table (FDT) may be applied to the delivered object/file. In addition, the source protocol component 1424 may generate the entity-header to include additional information for the file. When certain attributes are present in both locations (i.e., FDD and entity-header), the values in the entity-header may overwrite the corresponding values in the static FDD.

When operating in the Redundant FDT mode, the source protocol component 1424 may generate and send the FDT with the object so that the information included in FDT is redundant to the information included in the FDD. When operating in the Complementary FDT mode, the source protocol component 1424 may generate and send the FDT with the object so that the FDT includes additional information that may be useful for the receiver device. When operating in the Dynamic FDT mode, the source protocol component 1424 may generate and send the FDT with the object so that the FDT includes essential additional information that may be used by the receiver device.

The source protocol component 1424 may be configured to use LCT communication technologies and methodologies in specific ways so as to accomplish object delivery via FLUTE, and support the various features and functions discussed in this application. For example, the source protocol component 1424 may set the value of a congestion control header (defined in LCT/ALC) to zero (0), set the TSI in the LCT header according to the delivery object collection applied by the packet (e.g., via the @tsi data-field), set the code point in the LCT header based on the value of an @codepoint data-field, set the first bit of the PSI to zero (0) to indicate a source packet, etc. The source protocol component 1424 may also use a source FEC payload ID that specifies the starting address (e.g., in octets, bytes, etc.) of the delivery object. Such information may be communicated via direct addressing (e.g., using 32 or 64 bits), or by using the SBN, ESI, and symbol size (T) values.

The source protocol component 1424 may be configured to use a LCT header EXT_TIME extension to communicate or signal various time values and events. For example, the source protocol component 1424 may use the EXT_TIME extension as a "sender current time" field to signal the sender's current time. This information may used to synchronize clocks in the sender and receiver devices. As a further example, the source protocol component 1424 may use the EXT_TIME extension as an "expected residual time" field to signal the expected remaining time for a current object. The source protocol component 1424 may also use the EXT_TIME extension as an SLC flag (Session Last Change flag) to signal the addition or removal of segments.

The source protocol component 1424 may be configured to send byte ranges or portions of a file/object out of order, before all of the file/object is received or generated in the sender device. As such, the byte ranges of an object/file may not be sent sequentially. Rather, a later byte range may be sent before an earlier byte range. In such cases, the source protocol component 1424 may use the @outOfOrderSending data-field to communicate to receiver device that sender device applies such technology and/or that the byte ranges may be transmitted out of order.

Sending byte ranges or portions of a file/object out of order is especially useful for data formats that require that the header data be generated after the media is produced, such as formats that include the file's size information in the header. For such formats, the source protocol component 1424 may send the header to the receiver device after transmitting the data so that receiver device may receive and use such header information to determine the size of the data unit. Since the size of the header field is typically known in advance, this may be accomplished by the receiver device skipping the header portion when the object is received, or by using any of the other techniques discussed in this application. To support formats for which the size of the header field is variable, the source protocol component 1424 may pad the data or communication. The source protocol component 1424 may also set or use a flag to communicate an interleaving depth in time (e.g. milliseconds), maximum data ranges, etc.

In the various embodiments, the system 1140 may be configured to distinguish the source and repair flows by their different UDP flows (i.e., carried on different IP/UDP port combination) and/or via their Session Description Protocol (SDP) files. When the LCT packets are sent in the same UDP flow, the system 1140 may distinguish the source and repair flows based on the transmission session/stream identifier (TSI) in the LCT header fields of the packets. When the LCT packets are sent in the same UDP flow and have the same TSI value, the system 1140 may distinguish the source and repair flows/packets based on the program and system information (PSI) bit in the header of a packet. This may be particularly useful when the system 1420 operates in, or is required to support, a backward-compatibility mode.

The repair protocol component 1426 may be configured to protect pieces of delivery objects, bundles of delivery objects, and/or bundles of pieces of delivery objects for FEC. In addition, the repair protocol component 1426 may be configured to accomplish the delivery of the delivery objects or pieces thereof (i.e., as opposed to protecting packets).

The repair protocol component 1426 may include an FEC scheme component 1434 configured to define an FEC encoding scheme, FEC decoding scheme, and/or various other protocol fields and procedures for identifying packet payload data (i.e., in the context of the FEC scheme). In various embodiments the FEC scheme component 1434, which may be implemented as, or configured to operate as, a functional layer above the transport layer (e.g., UDP/IP multicast) component 1428.

The repair protocol component 1426 may also include a Repair Asynchronous Layered Coding (ALC) component 1438 configured to flexibly protect the delivery objects 1430 or collections of objects (e.g., Collection 1, Collection 2). Further, each of the repair protocol component 1426 and the source protocol component 1424 may include a Layered Coding Transport (LCT) component 1436. The packets may be LCT packets.

The repair protocol component 1426 may be configured to generate one or more FEC objects. Each FEC object may be a complete delivery object or a contiguous byte range of a delivery object. In various embodiments, the repair protocol component 1426 may be configured so that FEC protection may be applied to a single FEC object or a collection of FEC objects. The repair protocol component 1426 may be configured so that the TSI may be used to scope the collection a collection of FEC objects. The repair protocol component 1426 may be configured to instantiate the TOI/TSI independent of the FEC structure and/or using any of the techniques discussed in this application.

In the various embodiments, the repair protocol component 1426 may be configured so that FEC-related information is communicated only when it determined that such information is needed, required, and/or useful. The repair protocol component 1426 may also be configured to communicate FEC-related information so that receiver devices that not capable of performing FEC operations can ignore the FEC-related information and still render its corresponding content. The repair protocol component 1426 may be configured to perform symbol-based FEC operations, with a fixed symbol size for each protected repair flow. The repair protocol component 1426 may also be configured to perform the FEC operations so that each repair flow provides protection for a delivery object from one or more source flows.

The repair protocol component 1426 may be an FEC Framework that includes or is configured to communicate, an FEC repair flow declaration that includes all FEC specific information, an FEC object that is a protected contiguous octet range of a source object or the source object itself, an FEC transport object that is the concatenation of an FEC object, an FEC super object that is the concatenation of one or more FEC transport objects, FEC protocol and packet structure. The FEC transport object may include padding octets and size information, which may be used to form a symbol-aligned chunk of data. The FEC super object may be used to bundle FEC transport objects for FEC protection.

Figure 15:
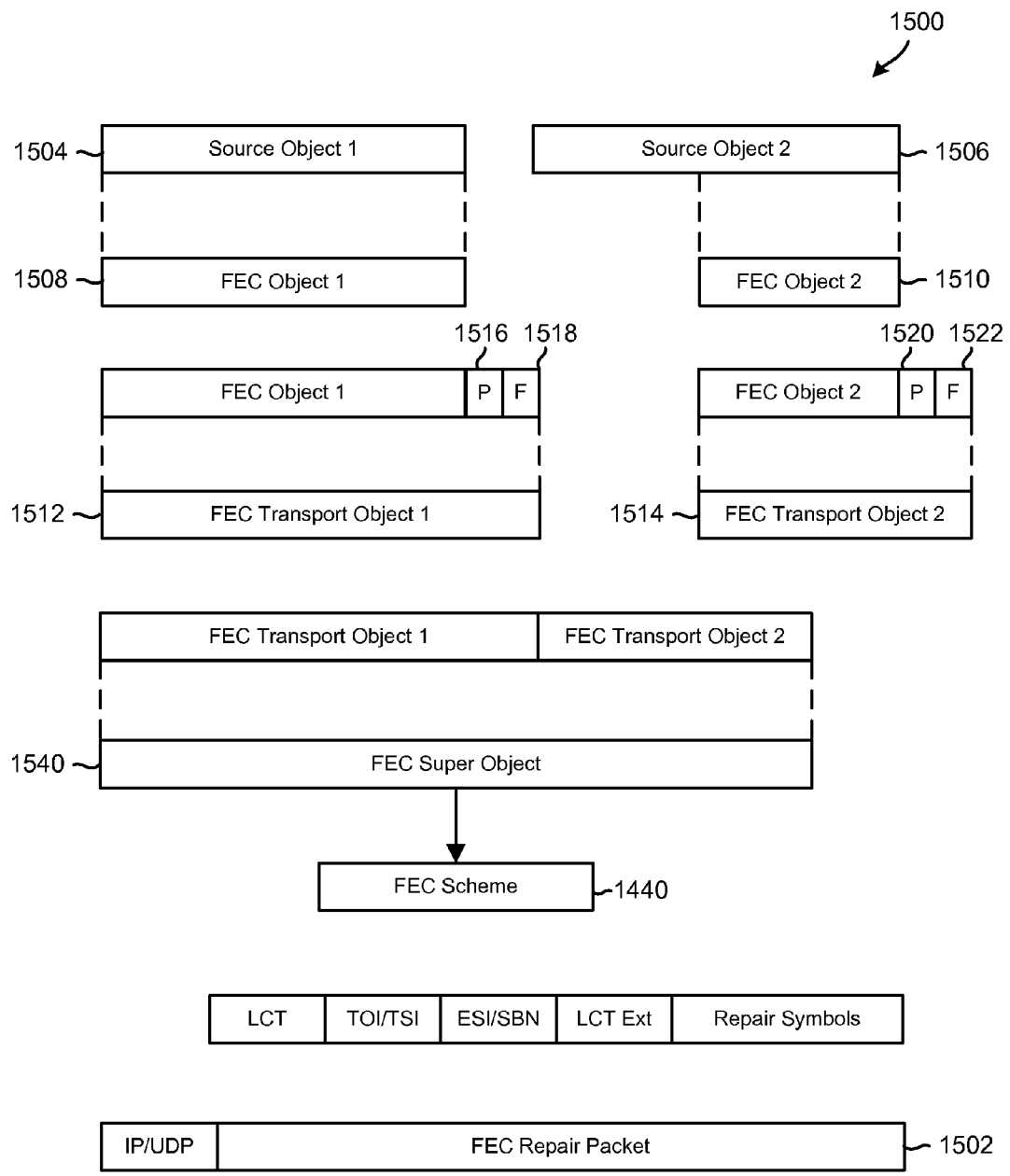
FIG. 15 is a block diagram illustrating various structures, data-fields, communication packets, transformations and information flows in an embodiment FEC Framework configured to generate a forward error correction (FEC) repair packet based on two source objects.

FIG. 15 illustrates various structures, data-fields, communication packets, transformations and information flows in an embodiment FEC Framework 1500 configured to generate a FEC repair packet 1502 based on two source objects 1504, 1506. The FEC Framework 1500 may be included in, or implemented as part of, the repair protocol component 1426 discussed above with reference to FIG. 14B. In an embodiment, the source objects 1504, 1506 may be the same as the delivery objects discussed above with reference to FIG. 14B.

In the example illustrated in FIG. 15, the FEC Framework 1500 generates a first FEC object 1508 for the first source object 1504, and a second FEC object 1510 for the second source object 1506. Each of the FEC objects 1508, 1510 may be a full source object or a consecutive octet range of a source object. The FEC Framework 1500 may be configured to generate the FEC objects 1508, 1510 using TSI and TOI of its corresponding source object 1504, 1506 and/or an octet range of the source object 1504, 1506, i.e. start octet within the source object 1504, 1506 and number of octets of source object 1504, 1506 that constitutes the FEC object 1508, 1510 to be protected.

For each FEC object 1508, 1510, the FEC Framework 1500 may generate an FEC transport object 1512, 1514 that includes a concatenation of an FEC object 1508, 1510, padding octets (P) 1516, 1520, and the FEC object size (F) 1518, 1522. The padding octets (P) 1516, 1520 may be padding data that is included towards the end of the FEC transport object 1512, 1514, between the source object 1504, 1506 and the FEC object size (F) 1518, 1522. The FEC object size (F) 1518, 1522 values may be expressed in octets and/or communicated via a four (4) octet field. That is, the FEC object size (F) 1518, 1522 may be carried in the last four (4) octets of the FEC transport object 1512, 1514.

In various embodiments, the FEC Framework 1500 may be configured to compute an FEC transport object size (S) for each of the FEC transport objects 1512, 1514 based on session information and/or the repair packet headers. The FEC Framework 1500 may compute the FEC transport object size (S) in units of symbols and/or as an integer multiple of the symbol size (T). For example, if the FEC object size (F) 1518, 1522 is the size of the FEC object 1508, 1510 expressed in octets, F is the F octets of data of the source object 1504, 1506, the parameter "1" denotes the four (4) octets of data carrying the value of F in network octet order (high order octet first), the FEC transport object size (S) is the size of the FEC transport object with $S=\text{ceil}((F+4)/T)$, the padding octets (P) 1516, 1520 are $S*T-4-F$ zero octets of data, and O is a concatenation of F, P and f, then O constitutes the FEC transport object of size $S*T$ octets.

It should be understood that the padding octets (P) 1516, 1520 and the FEC object sizes (F) 1518, 1522 are not required to be sent in source packets of the source objects 1504, 1506. Rather, they may be included in FEC transport object 1512, 1514 that FEC decoding recovers to extract the FEC object 1508, 1510, and thus the source object 1504, 1506 or portion of the source object 1504, 1506 that constitutes the FEC object 1508, 1510.

The FEC Framework 1500 may be configured to communicate general information about an FEC transport object 1512, 1514 to the receiver device. The FEC Framework 1500 may be configured so that the general information about an FEC transport object 1512, 1514 that is conveyed to an FEC enabled receiver device is the source TSI, source TOI, and the associated octet range within the source object 1504, 1506 of the associated FEC object 1508, 1510. Since the size in octets of the FEC object 1508, 1510 may provided in an appended field within the FEC transport object 1512, 1514, the remaining information may be conveyed as the TSI and TOI of the source object 1504, 1506 from which the FEC object 1508, 1510 associated with the FEC transport object 1512, 1514 is generated, the start octet within source object 1504, 1506 for the associated FEC object 1508, 1510, and the size in symbols of the FEC transport object 1512, 1514.

The FEC Framework 1500 may be configured to generate an FEC super-object 1540 based on the FEC transport objects 1512, 1514 and/or FEC repair flow declaration. For example, the FEC Framework 1500 may generate the FEC super-object 1540 to include a concatenation of the FEC transport object 1512 and FEC transport object 1514. The FEC Framework 1500 may also generate the FEC super-object 1540 to include all the general information about the FEC transport objects 1512, 1514 described above, as well as information identifying the order of the FEC transport objects 1512, 1514 within the FEC super-object 1540.

In an embodiment, the FEC Framework 1500 may be configured to determine the number of source symbols in the FEC super-object 1540. For example, if N is the total number of FEC transport objects for the FEC super-object construction, S[i] is the size in symbols of FEC transport object i for i=0, . . . , N−1, and B is the FEC super-object 1540 that include a concatenation of the FEC transport object 1512, 1514 objects in order, then the FEC super-object 1540 may be determined to include $K=\text{sum}(i=0)(N-1)\ S[i]$ source symbols.

The FEC Framework 1500 may be configured to generate the FEC super-object 1540 to include additional general information beyond the general information carried in the FEC transport objects 1512, 1514. Such information may include the total number of FEC transport objects N. This information may also include values for each FEC transport object 1512, 1514, such as the TSI and TOI of the source object 1504, 1506 from which the FEC object 1508, 1510 associated with the FEC transport object 1512, 1514 is generated, a start octet within source object 1504, 1506 for the associated FEC object 1508, 1510, and a size in symbols of the FEC transport object 1512, 1514.

In an embodiment, the FEC Framework 1500 may be configured to generate the FEC repair packet 1502 based on the FEC super-object 1540. The FEC repair packet 1502 may be generated based on Asynchronous Layered Coding (ALC), the LCT Layered Coding Transport (LCT) Building Block, and/or to include any of the technologies, features, and modifications discussed in this application. For example, the TSI in the LCT header may be set according to the repair flow to which the FEC repair packet 1502 applies, which may be defined via the RepairFlow.SDPParameter@tsi attribute. The first bit of the SPI (Source Packet Indicator) may be set to 0 to indicate that it is a repair packet. The FEC configuration information may be carried in LCT extension headers.

As further examples, the FEC Framework 1500 may be configured to use an FEC building block to deliver only repair packets. Each repair packet within the scope of the repair flow (as indicated by the TSI field in the LCT header) may be generated to include/carry the appropriate repair TOI, which may be unique for each FEC super-object that is created within the scope of the TSI. The Session description information may be communicated through SDP parameters, such as via the SDPParameter discussed above.

The FEC Framework 1500 may be configured to communicate summary FEC information to the receiver device. In various embodiments, the FEC Framework 1500 may be configured to communicate the summary FEC information statically in the RepairFlow declaration, dynamically in an LCT extension header, or a combination thereof. The FEC Framework 1500 may communicate such information for each super-object (identified by a unique TOI within a Repair Flow and associated to a Repair Flow by the TSI in the LCT header). Such information may include FEC configuration information, an FEC encoding ID, an FEC OTI, and additional FEC information. This information may also include the total number of FEC objects included in the FEC super-object 1540, as well as the TSI and TOI of the source object 1504, 1506 from which the FEC object 1508, 1510 associated with the FEC transport object 1512, 1514 is generated, a start octet within source object 1504, 1506 for the associated FEC object 1508, 1510, and a size in symbols of the FEC transport object 1512, 1514.

The FEC Framework 1500 may be configured to generate, use, and/or communicate a FEC repair flow declaration that includes include FEC signaling information. For example, in MBMS User Services, a repair flow declaration may be included as a fragment of a bundle description or a use service description. As part of this repair flow declaration, the FEC Framework 1500 may provide a repair flow identifier for the repair flow in the @tsi attribute, with all the repair flows declared to be of type RepairFlow. The combination of the IP address, the port and the repair flow identifier may provide a unique identifier amongst all flows within a user service. Note that an IP/port combination may carry different FEC repair data as well as source data. In this case, the data may be differentiated by the different TSI values in the LCT header.

In an embodiment, the FEC Framework 1500 may be configured to generate the repair flow declaration to include information that identifies a pattern of source objects (or octet ranges of source object) from source flows that are to be protected by the repair flow. In further embodiments, the FEC Framework 1500 may generate the repair flow declaration to include metadata fragments that include RepairFlow data-field that defines a repair flow in session. Each RepairFlow data-field may also include various other data-fields, such as a @tsi data-field, a @sessionDescription data-field, and a FECParameters data-field. The @tsi data-field may include information that may be used to identify the TSI to which the repair flow is assigned to in the LCT header in the session. The @sessionDescription data-field may include information that may be used to reference to the session description that contains the Repair Flow.

The FECParameters data-field may include various other data-fields, such as an @fecEncodingId data-field, an @maximumDelay data-field, FECOTI data-field, and ProtectedObject data-field. The @fecEncodingId data-field may include information that may used to identify the applied FEC scheme. The @maximumDelay data-field may include information that may used to identify the maximum delivery delay between any source packet in the source flow and the repair flow. The FECOTI data-field may include FEC Object Transmission Information (FEC OTI) that corresponds to FEC related information associated with an object as well as FEC information associated with the encoding symbols of the object is to be included within this declaration and applies to all repair packets with the repair flow.

The ProtectedObject data-field may include information that may be used to identify the source flows that are protected by the Repair Flow and the details on how the protection is done. Embodiment components may use such information to determine whether the source flow is contained in the same session as the repair flow, the source flow is signaled with the same TSI as the repair flow, the source TOI is the same as the repair TOI, etc. Embodiment components may determine that the packets may be differentiated via the PSI flag in the LCT header in response to determining that the source TOI is the same as the repair TOI. Embodiment components may also use the information in the ProtectedObject data-field to determine whether the size of each FEC transport object may be obtained from the repair packets using the EXT_TOL header.

The ProtectedObject data-field may include information that may be used to identify the source objects in a collection of objects that are included in a repair flow. The ProtectedObject data-field may also include various other data-fields, such as an @sessionDescription data-field, an @tsi data-field, an @sourceTOI data-field, an @fecTransportObjectSize data-field, and an @startOctet data-field.

The @sessionDescription data-field may include information that may be used to identify session description that contains the Source Flow. An embodiment component may be configured to determine that the source flow is contained in the same session as the repair flow in response to determining that the @sessionDescription data-field is empty.

The @tsi data-field may include information that may be used to identify a transport session identifier for the source flow to be protected. An embodiment component may be configured to determine that the source flow is signaled with the same tsi/TSI as the repair flow in response to determining that the @tsi data-field is empty, in which case the packets may be differentiated via the SPI flag (Source Packet Indicator flag) in the LCT header, as defined in ALC IETF RFC 5775.

The @sourceTOI data-field may include information that may be used to identify the TOI of the source object and a mapping of the TOI included in the repair flow. An embodiment component may be configured to determine that the source TOI is the same as the repair TOI in response to determining that @sourceTOI data-field is empty.

The @fecTransportObjectSize data-field may include information that may be used to identify the default size of each FEC transport object, such as in units of symbols. An embodiment component may be configured to determine that the default size values may be provided in the repair packets using the EXT_TOL header in response to determining that @fecTransportObjectSize data-field is empty.

The @startOctet data-field may include information that may be used to identify the start octet in the associated source object. An embodiment component may be configured to determine that the start octet information may be included in the repair packets using the EXT_TOL header in response to determining that @startOctet data-field is empty. The embodiment component may also be configured to determine that EXT_TOL header will not be present in response to determining that the @startOctet data-field includes a value or is not empty.

In an embodiment, a component (e.g., receiver device) may be configured to determine that @sourceTOI attribute specifies a mapping of the repair TOI value contained in a repair packet to a source TOI of a source object that the repair packet protects in response to determining that the repair flow declaration includes a ProtectedObject data-field value. The mapping may be described through an equation, in C format, where the TOI field of the repair flow is specified as the variable TOI. The component may use the result of applying this equation to determine the source TOI. The value of the attribute may be a proper C equation with at most one variable TOI and without the addition of the ";" sign. The component may be further configured to apply a default equation (e.g., sourceTOI="TOI") in response to determining that there is no @sourceTOI data-field value included in the ProtectedObject data-field.

An example repair flow declaration for a repair packet with TSI value 10 and value TOI 20 that protects a source object with a TOI value 20 from the source flow with TSI value 1 may be represented in a server or receiver device as follows:

```
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="10"
    sessionDescription="http://mbmsrocks.com/example-session1.sdp">
    <FECParameters fecEncodingID="6" maximumDelay="5000">
      <FECOTI<XXXYYYZZZZ</FECOTI>
      <ProtectedObject
        tsi="1"
        sessionDescription="http://mbmsrocks.com/example-session1. sdp"
        source TOI="TOI"
        fecTransportObjectSize="892"/>
    </FECParameters>
</RepairFlow>
```

An example repair flow declaration that does not include a @sourceTOI value is as follows:

```
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="11"
    sessionDescription="http://mbmsrocks.com/example-session1.sdp">
    <FECParameters fecEncodingID="6" maximumDelay="5000">
      <FECOTI>XXXYYYZZZZ</FECOTI>
      <ProtectedObject tsi="2" fecTransportObjectSize="892"/>
      <ProtectedObject tsi="3" fecTransportObjectSize="1340"/>
    </FECParameters>
</RepairFlow>
```

In the above, example, since no @sourceTOI attribute is provided in the ProtectedObject, the default equation sourceTOI="TOI" is used to derive the source TOI from the TOI. Thus, the super-object that is protected by a repair packet with TSI 11 and TOI 20 is the concatenation of the FEC transport object for the source object with TSI 2 and TOI 20 and the FEC transport object for the source object with TSI 3 and TOI 20. The FEC transport object size in both cases is defined and the FEC super-object has a total size of 2232 symbols.

An example repair flow declaration for FEC super-object that is protected by a repair packet with TSI 12 and TOI 20 is the concatenation of the FEC transport object for the source object with TSI 4 and TOI 40, the FEC transport object for the source object with TSI 5 and TOI 20 and the FEC transport object for the source object with TSI 4 and TOI 41 may be represented in a server or receiver device as follows:

```
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="12"
    sessionDescription="http://mbmsrocks.com/example-session1.sdp">
    <FECParameters fecEncodingID="6" maximumDelay="5000">
      <FECOTI>XXXYYYZZZZ</FECOTI>
      <ProtectedObject tsi="4" sourceTOI="2*TOI"/>
      <ProtectedObject tsi="5"/>
      <ProtectedObject tsi="4" sourceTOI="2*TOI+1"/>
    </FECParameters>
</RepairFlow>
```

In the above example, the FEC transport object sizes of the source objects are not included in the repair flow declaration. In addition, the sequence of the ProtectedObject declarations within a RepairFlow declaration may be used to determine the order of the FEC transport objects for the source objects in the super-object.

An example repair flow declaration for a repair packet with TSI 13 and TOI 20 protects the source object with TSI 6 and TOI 21 may be represented in a server or receiver device as follows:

```
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="13"
    sessionDescription="http://mbmsrocks.com/example-session1.sdp">
    <FECParameters fecEncodingID="6" maximumDelay="5000">
      <FECOTI>XXXYYYZZZZ</FECOTI>
      <ProtectedObject tsi="6" sourceTOI="TOI+1"/>
    </FECParameters>
</RepairFlow>
```

An example repair flow declaration for a repair packet with TSI 14 and TOI 10 protects the concatenation of the FEC transport objects for two source objects: the source object with TSI 7 and TOI 20 and the source object with TSI 7 and TOI 21 may be represented in a server or receiver device as follows:

```
<RepairFlow xmlns:xsi="http://www.w3.org/2001/XMLSchema-instance"
    xmlns="urn:3gpp:mbms:schema:repairflow:2013"
    xsi:schemaLocation="urn:3gpp:mbms:schema:repairflow:2013 repairflow.xsd"
    tsi="14"
    sessionDescription="http://mbmsrocks.com/example-session1.sdp">
    <FECParameters fecEncodingID="6" maximumDelay="5000">
      <FECOTI>XXXYYYZZZZ</FECOTI>
      <ProtectedObject tsi="7" repairTOI="2*TOI"/>
      <ProtectedObject tsi="7" repairTOI="2*TOI+1"/>
    </FECParameters>
</RepairFlow>
```

In the above example, a repair flow declaration with TSI 14 provides the static FDD. In addition, the ordering of the FEC transport objects in the FEC super-object is the same as the order in which the ProtectedObject declarations are made in the Repairflow declaration. Thus, the FEC super-object corresponding to a repair packet with TSI 14 and TOI 10 is the concatenation of the FEC transport object for the source object with TSI 7 and TOI 20 and the FEC transport object for the source object with TSI 7 and TOI 21

In summary, the foregoing embodiments include methods that may be implemented in broadcasters and receiver devices for communicating information via a broadcast network that includes associating a collection of related source objects with a source flow, and transmitting the collection of related source objects over the broadcast network associated with the source flow so that the source objects may be received and recovered by a receiver device based on their relationship to each other. In an embodiment, a source flow identifier (e.g., FLID) identifying the source flow may be determined, and each packet carrying data for one or more of the source objects of the related source objects associated with the source flow may carry the source flow identifier. In an embodiment, the data of a source object carried in a packet may be identified by a byte range carried in the packet. In an embodiment, the source flow identifier may be carried in the Transmission Session Identifier (TSI) field. In an embodiment, the source flow identifier may be carried in the combination of IP destination address field and the UDP port number field. In an embodiment, the source flow identifier may be carried in the codepoint (CP) field.

In an embodiment, a collection of source object identifiers may be determined, each packet carrying data for one of the related source objects of the source flow may carry a source object identifier, and the combination of the source flow identifier and source object identifier may identify the source object from the collection of related source objects associated with the source flow for which the packet carries data. In an embodiment, the source object identifiers may be Transmission Object Identifiers (TOIs). In an embodiment, the source object identifiers may be Object Sequence Numbers (OSNs).

In an embodiment, more than one collection of related source objects may be transmitted over the broadcast network, each collection of related source objects may be associated with a different source flow, the source flow identifier identifying each of the source flows may be unique, and the source flow of each packet carrying data may be associated with and may be identified by the source flow identifier carried in the packet.

In an embodiment, portions of the source flow identifier may be carried within different fields within a packet. In an embodiment, at least some of the source objects may include a byte range of a file, and at least some of the source objects may include an HTTP header and a byte range of a file. In an embodiment, a URL may be associated with a file, and the source object can be referenced with the URL for the file and a corresponding byte range. In an embodiment, at least some of the source objects may include a file, and a URL may be associated with the file so that the source object can be referenced with the URL for the file.

In an embodiment, at least some of the source objects may include an HTTP header and an associated file. In an embodiment, at least some of the source objects may include an HTTP header, an associated file, and an HTTP trailer.

Further embodiments include methods that may be implemented in broadcasters and receiver devices for transmitting information via a broadcast network that includes receiving portions of an entire file, generating the source objects based on the received portions prior to receiving the entire file, and transmitting the generated source objects to the receiver device prior to receiving the entire file. In an embodiment, transmitting the generated source objects to the receiver device prior to receiving the entire file may include transmitting the data for a source object in a different order than an order than the data order of the file. In an embodiment, the file may include a file size at the beginning of the file, and the data for a source object may be transmitted in an order such that at least some data of the file after the file size may be transmitted before the file size. In an embodiment, a source object may include an HTTP header and an associated file. In an embodiment, a source object may include an HTTP header, an associated file and an HTTP trailer.

In an embodiment, methods may further include determining source flow metadata for a collection of source objects associated with a source flow, in which the source flow metadata signals relationships between the locations, names, availability times, or other metadata for the collection of source objects associated with a source flow. In an embodiment, templates may be used to signal at least some of the relationship information in the source flow metadata. In an embodiment, portions of the source flow metadata for a source flow may be provided to the receiver device in advance of when at least some of the related source objects associated with the source flow are transmitted. In an embodiment, portions of the source flow metadata provided to the receiver device may include timing information, uniform resource identifier (URI), and information identifying decryption keys for the source objects. In an embodiment, providing portions of the source flow metadata to the receiver device may include sending portions of the flow metadata out-of-band to the receiver device in advance of transmitting at least some of the source objects associated with the source flow, and sending other portions of the source flow metadata in-band with the source objects. In an embodiment, the portions of the source flow metadata sent in-band with each source object may include an indication of the last portion of data of the source object. In an embodiment, providing portions of the source flow metadata to the receiver device may include sending portions of the source flow metadata via a unidirectional transport protocol without sending a file delivery table. In an embodiment, transmitting the collection of related source objects may include transmitting the collection of related source objects via multimedia broadcast multicast services (MBMS).

In an embodiment, transmitting the collection of related source objects may include transmitting the collection of related source objects via file delivery over unidirectional transport (FLUTE). In an embodiment, transmitting the collection of related source objects may include transmitting the source objects independent of their corresponding repair objects. In an embodiment, the methods may further include using session description protocol (SDP) information to distinguish a source object from its corresponding repair object. In an embodiment, transmitting the collection of related source objects may include transmitting the source objects without transmitting forward error correction (FEC) signaling information.

In an embodiment, methods may further include transmitting FEC repair data for a collection of related source objects associated with a source flow over the broadcast network so that the source objects may be received and decoded by a receiver device based on their relationship to each other, each packet carrying FEC repair data for one or more of the related source objects associated with the source flow may carry the source flow identifier identifying the source flow for which the packet carries FEC repair data, each packet carrying FEC repair data for one or more of the related source objects associated with the source flow may carry the one or more source object identifiers of the one or more source objects from which the FEC repair data carried in the packet may be generated, and the combination of the source flow identifier and the one or more source object identifiers may identify the one or more source objects from the collection of related source objects associated with the source flow from which the FEC repair data carried in the packet may be generated.

In an embodiment, the methods may further include transmitting the packets carrying FEC repair data generated from one or more source objects largely within the same interval of time that the packets carrying data for the one or more source objects are transmitted.

In an embodiment, the methods may further include associating a repair flow with one or more source flows, determining a repair flow identifier for the repair flow, carrying the repair flow identifier in each packet carrying FEC repair data associated with the repair flow, determining a collection of repair object identifiers for the repair flow, and carrying a repair object identifier from the collection of repair object identifiers in each packet carrying FEC repair data associated with the repair flow, wherein which of the source objects from the collections of related source objects of the one or more source flows associated with the repair flow the FEC repair data carried in a packet is generated may be determined at least in part by the combination of the repair flow identifier and repair object identifier carried in the packet. In an embodiment, the repair flow identifier may be carried in the Transmission Session Identifier (TSI) field. In an embodiment, the repair flow identifier may be carried in the combination of IP destination address field and the UDP port number field. In an embodiment, the repair flow identifier may be carried in the codepoint (CP) field. In an embodiment, the repair object identifiers are Transmission Object Identifiers (TOIs). In an embodiment, the repair object identifiers are Object Sequence Numbers (OSNs).

In an embodiment, the methods may further include determining repair flow metadata for the repair flow, in which the repair flow metadata signals relationships between the repair object identifier carried in a packet carrying FEC repair data and the source objects from the one or more collections of related source objects associated with source flows from which the FEC repair data in the packet is generated. In an embodiment, templates may be used to signal at least some of the relationship information in the repair flow metadata. In an embodiment, portions of the repair flow metadata for a repair flow may be provided to the receiver device in advance of when at least some of the related source objects associated with the source flows associated with the repair flow are transmitted.

In an embodiment, the methods may include transmitting the packets carrying FEC repair data generated from one or more source objects largely within the same interval of time that the packets carrying data for the one or more source objects are transmitted. In an embodiment, the FEC repair data carried in packets with a same repair flow identifier and a same repair object identifier may be generated from two source objects which are in different source flows, wherein the amount of data received in combination from packets with the same repair flow identifier and the same repair object identifier and the two source objects from which the FEC repair data in those packets is generated that is sufficient to decode the two source objects may be equal to or slightly more than the aggregate size of the two source objects. In an embodiment, portions of the repair flow identifier may be carried within different fields within a packet.

Figure 16:
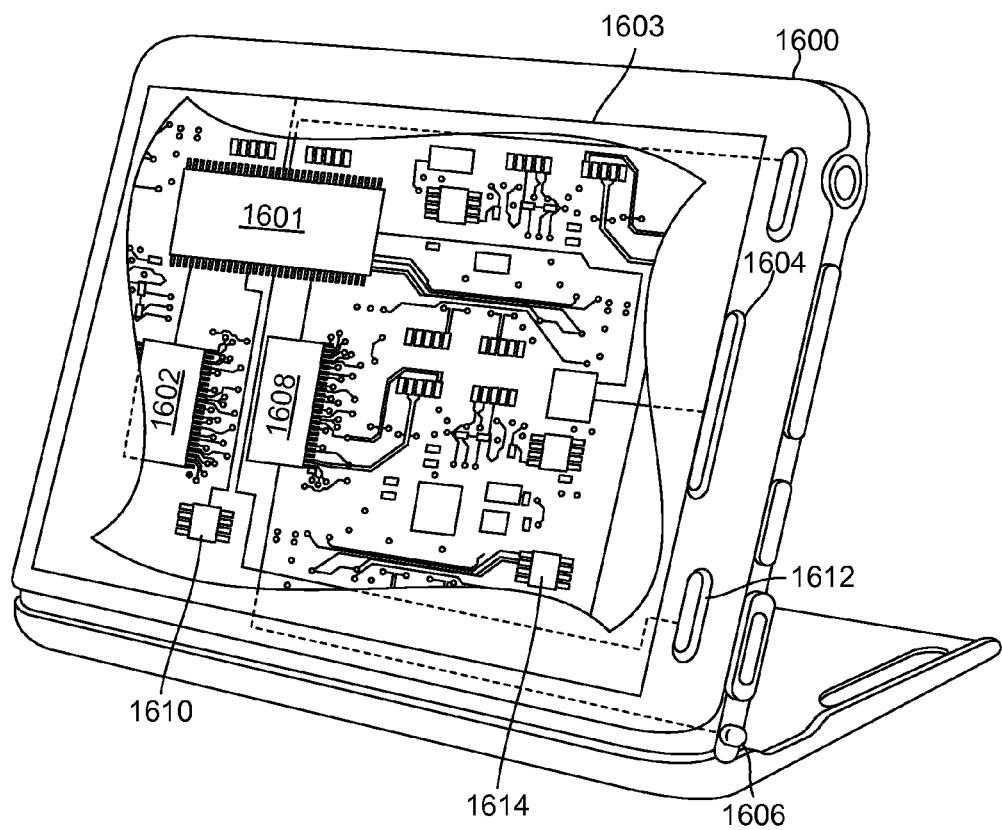
FIG. 16 is a system block diagram of a receiver device suitable for use with any of the embodiments.

FIG. 16 is a system block diagram of a mobile computing device suitable for use as a receiver device with any of the embodiments. A typical mobile computing device 1600 may include a processor 1601 coupled to internal memory 1602, to a display 1603, and to a speaker 1604. Additionally, the mobile computing device 1600 will include an antenna 1606 for sending and receiving electromagnetic radiation that may be connected to a wireless data link and/or cellular telephone transceiver 1608 coupled to the processor 1601 and a mobile multimedia broadcast receiver 1610 coupled to the processor 1601. A mobile computing device 1600 typically also includes menu selection buttons 1612 or rocker switches for receiving user inputs.

The mobile computing device 1600 may also include a sound encoding/decoding (CODEC) circuit 1614 which digitizes sound received from a microphone into data packets suitable for wireless transmission and decodes received sound data packets to generate analog signals that are provided to the speaker 1604 to generate sound. Also, one or more of the processor 1601, wireless transceiver 1608 and CODEC circuit 1614 may include a digital signal processor (DSP) circuit (not shown separately).

Figure 17:
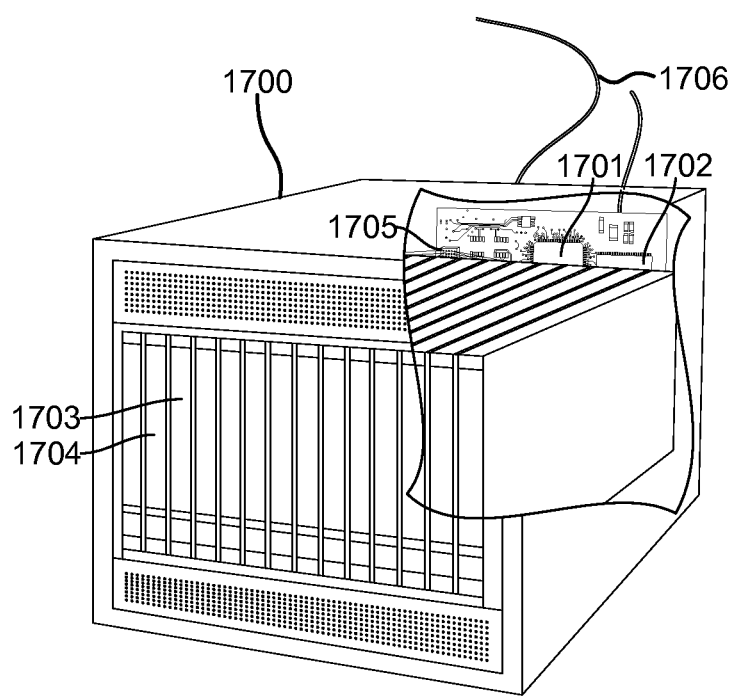
FIG. 17 is a system block of a server computer suitable for use with any of the embodiments.

The various embodiments on the broadcast side may be implemented on any of a variety of commercially available server devices, such as the server 1700 illustrated in FIG. 17. Such a server 1700 typically includes a processor 1701 coupled to volatile memory 1702 and a large capacity nonvolatile memory, such as a disk drive 1703. The server 1700 may also include a floppy disc drive, compact disc (CD) or DVD disc drive 1704 coupled to the processor 1701. The server 1700 may also include network access ports 1705 coupled to the processor 1701 for establishing data connections with a network 1706, such as a local area network coupled to other broadcast system computers and servers.

The processors 1701 may be any programmable microprocessor, microcomputer or multiple processor chip or chips that can be configured by software instructions (applications) to perform a variety of functions, including the functions of the various embodiments described above. In some mobile receiver devices, multiple processors may be provided, such as one processor dedicated to wireless communication functions and one processor dedicated to running other applications. Typically, software applications may be stored in the internal memory 1702, before they are accessed and loaded into the processor 1601, 1602. The processor 1601, 1602 may include internal memory sufficient to store the application software instructions.

Various embodiments may include methods of communicating information over a broadcast network, which may include delivering files/objects using existing technologies, protocols and/or structures; delivering files/objects in packets where each packet contains a continuous byte range of the file; delivering files/objects in packets where at least one packet with a larger starting address for the byte range is sent prior to a packet with a smaller address for the byte range; defining a new protocol handler for LCT/UDP that identifies a communication protocol suitable for the delivery of files/objects; using a code point to identify different collections of objects and assign parameters; using a session definition or session description message or component to support the delivery of files/objects and the signaling of the delivery; sending data of a file/object prior to sending the size field/header; using a start Transport Object Identifier (TOI) or an end TOI or both to signal a restricted list; using a code point to uniquely identify a static File Delivery Information (FDI) in use; using an LCT time extension header for synchronizing server and client; using an LCT time extension header for jitter or latency measurements; defining Repair Flow as a reference to the session description and code point and providing the detailed protection characteristics; defining a super-object so that it is FEC protected; using an FEC FRAMEWORK as an ALC instantiation to send only repair packets; defining an LCT extension header that enables the sending of the size of the individual FEC transport objects; using existing fields to signal or support using a Flow identifier (FLID); using TOI to identify a transport object without other modifications to the signaling or protocols; using a static FDI to signal flow declarations; signaling transport source objects protected by a repair flow so as to avoid in-band signaling within repair packet headers; and signaling source object TOIs that are to be protected by a repair flow using templating within the repair flow declaration.

The various embodiments may provide a number of enhancements and benefits over existing broadcast solutions. Embodiments provide enhanced File Delivery Over Unidirectional Transport (FLUTE)-based delivery of a sequence of related objects. Embodiments provide capability to accomplish flow object delivery; support for Dynamic Adaptive Streaming over HTTP (DASH) and other similar applications, standards, or protocols; and capability to reduce the number of objects that are required to be received before content may be recovered from the objects. Embodiments eliminate the need to deliver a file delivery table (FDT) for each object that is streamed/transmitted. Embodiments provide support for the provisioning of information to FLUTE receivers in advance, which may be accomplished before the objects are sent to or received by the FLUTE receivers. Embodiments improve delivery of timing information, uniform resource identifiers (URIs), and other identification information for objects in a flow. Embodiments support improved decision making and planning in receiver devices. Embodiments provide support for provisioning links to client applications. Embodiments support establishing and identifying relationships between objects and DASH segments of a representation described in a Media Presentation Description (MPD). Embodiments support chunk delivery/reception of content. Embodiments enable reductions of sender end-to-end latency independent of usage of forward error correction (FEC) operations or capabilities of the receiver devices. Embodiments enable reductions of receiver end-to-end latency when FEC is not used or required. Embodiments provide capability to wait or pause operations until FEC use is deemed acceptable. Embodiments support generating, sending, and receiving variable sized source packets. Embodiments support aligning source packet boundaries with underlying media structure boundaries such as access units, network abstraction layer units, samples, boxes of a file format or similar constructs. Embodiments support the delivery of source content with no FEC semantics; allowing receiver devices that do not have FEC capabilities to receive source content. Some embodiments support FEC object bundling; provide FEC protection over multiple objects; other embodiments provide FEC protection for portions of individual source objects; yet other embodiments provide FEC protection of bundles of portions of individual source objects. Embodiments enable delivering objects as complete HTTP GET responses, such as those defined in RFC 2616. Embodiments provide compatibility with, and support for the reuse of, current broadcast and FLUTE standards. Embodiments support the delivery of standard FLUTE objects using FDTs in the same session with delivery of sequences of related objects described herein without using FDTs. The various embodiments may also include a number of additional benefits and enhancements that are discussed below.

Additional enhancements and benefits over existing broadcast solutions provided by the various embodiments may also include transport of generic files and assets within MPEG Media Transport (MMT); use of code points; use of Hypertext Transfer Protocol (HTTP) headers as part of the objects; templating; use of code points and signaling in the code points to deliver content specific aspects of a file; modification of the MMT protocol include features suitable for signaling via code points; signaling an object transfer size via a trailer of the code point or entity header; delivering an object through a unidirectional protocol as a combination of an HTTP entity header and an HTTP entity body such that the object is suitable for use as a regularly delivered HTTP resource; delivering an object via chunk or sequential delivery; indicating the object's size or other information relating to the object that is not known at the start of the delivery by adding the size value or other information as part of the object delivery in a trailer; signaling an object size as part of a code point transfer; and delivering an object via an MPEG Media Transport (MMT) protocol such that the object to which the payload relates is identified by a packet_id attribute (which identifies the flow that the object belongs to) in a MMT protocol header and the transmission object identifier (TOI) attribute carried in the General File Delivery (GFD) protocol header (that identifies a particular object within a flow of objects).

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium, non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating information via a broadcast network, comprising:
   associating by a broadcast server of the broadcast network a collection of related source objects with a single flow;
   determining a flow identifier for the single flow, wherein the flow identifier indicates the association of the collection of related source objects with the single flow and the flow identifier is the same for all source objects in the collection of related source objects associated with the single flow;
   including both a transport session identifier and the flow identifier in a packet that includes data of at least one source object in the collection of related source objects associated with the single flow and a transmission object identifier (TOI) of the at least one source object in the collection of related source objects associated with the single flow; and
   transmitting source objects in the collection of related source objects associated with the single flow over the broadcast network.

2. The method of claim 1, further comprising:
   receiving the transmitted source objects in a receiver device; and
   recovering the received source objects based on their relationship to each other.

3. The method of claim 2, further comprising:
   using a byte range in the packet to identify data in the packet.

4. The method of claim 2, further comprising:
   including a byte range in the packet that identifies data of a source object in the packet.

5. The method of claim 2, wherein including the flow identifier in the packet comprises including the flow identifier in a transmission session identifier (TSI) field of the packet.

6. The method of claim 2, further comprising:
   using a combination of an Internet protocol (IP) destination address field and a user datagram protocol (UDP) port number field of the packet as the flow identifier.

7. The method of claim 2, wherein including the flow identifier in the packet comprises including the flow identifier in a combination of an Internet protocol (IP) destination address field and a user datagram protocol (UDP) port number field.

8. The method of claim 2, further comprising:
   using a codepoint (CP) field of the packet as the flow identifier.

9. The method of claim 2, wherein including the flow identifier in the packet comprises including the flow identifier in a codepoint (CP) field of a data packet.

10. The method of claim 2, wherein:
    transmitting the collection of related source objects comprises transmitting a plurality of collections of related source objects, each collection being associated with one of a plurality of different flows, each of the plurality of different flows including a unique flow identifier; and
    including the flow identifier in the packet that includes data of at least one source object in the collection of related source objects associated with the single flow comprises including the unique flow identifier of the single flow in the packet that includes data of that source object.

11. The method of claim 10, wherein transmitting the collection of related source objects comprises transmitting at least one packet that includes forward error correction (FEC) repair data, a repair flow identifier, and a repair object identifier, the method further comprising:
    associating a repair flow with one or more of the plurality of different flows;
    determining the repair flow identifier for the repair flow;
    determining a collection of repair object identifiers for the repair flow; and
    determining, based at least in part on a combination of the repair flow identifier and the repair object identifier of a packet, from which of the source objects from the associated plurality of flows the FEC repair data included in the packet is generated.

12. The method of claim 11, wherein the repair flow identifier is included in a transmission session identifier (TSI) field.

13. The method of claim 11, wherein the repair flow identifier is included in the combination of an Internet protocol (IP) destination address field and a user datagram protocol (UDP) port number field.

14. The method of claim 11, wherein the repair flow identifier is included in a codepoint (CP) field.

15. The method of claim 11, wherein the repair object identifier is a second TOI.

16. The method of claim 11, wherein the repair object identifier is an object sequence number (OSN).

17. The method of claim 11, wherein transmitting at least one packet that includes FEC repair data comprises:
transmitting at least one packet that includes FEC repair data in the same time interval as the packet that includes data for a corresponding source object.

18. The method of claim 11, further comprising:
generating FEC repair data for packets having the same repair flow identifier and same repair object identifier from two source objects in different flows so that an amount of data received in combination from the packets having the same repair flow identifier and same repair object identifier and from packets containing data for either of the two source objects that is greater than or equal to an aggregate size of the two source objects is sufficient to decode the two source objects.

19. The method of claim 11, wherein portions of the repair flow identifier are included in different data fields of the packet that includes FEC repair data.

20. The method of claim 11, further comprising:
determining a repair flow declaration for the repair flow so that the repair flow declaration includes information suitable for signaling a relationship between the repair object identifier in the packet that includes FEC repair data and source objects from the collection of related source objects associated with flows from which the FEC repair data in the packet is generated.

21. The method of claim 20, further comprising:
using a template to signal the relationship via the repair flow declaration.

22. The method of claim 20, wherein a portion of the repair flow declaration is transmitted to the receiver device in advance of at least one source object associated with one or more of the plurality of different flows associated with the repair flow.

23. The method of claim 2, further comprising:
determining a source object identifier for each source object in the collection of related source objects; and
including the source object identifier in one or more packets that include data for source objects.

24. The method of claim 23, further comprising:
using a combination of the flow identifier and the source object identifier to identify a corresponding source object in the collection of related source objects.

25. The method of claim 23, wherein including the source object identifier in the packet that includes data comprises:
including the source object identifier in the packet so that a combination of the flow identifier and the source object identifier identifies a corresponding source object for which the packet carries data.

26. The method of claim 23, further comprising:
using a transmission object identifier (TOI) as the source object identifier.

27. The method of claim 23, further comprising:
using an object sequence number (OSN) as the source object identifier.

28. The method of claim 23, further comprising:
transmitting forward error correction (FEC) repair data for the collection of related source objects associated with the single flow over the broadcast network,
wherein each packet that includes FEC repair data for one or more of related source objects associated with the single flow includes the flow identifier identifying the single flow for which the packet includes FEC repair data,
wherein each packet that includes FEC repair data for one or more of the related source objects associated with the single flow carries one or more source object identifiers of one or more source objects from which the FEC repair data carried in the packet is generated, and
wherein a combination of the flow identifier and one or more source object identifiers identifies one or more source objects from the collection of related source objects associated with the single flow from which the FEC repair data carried in the packet is generated.

29. The method of claim 28, further comprising transmitting packets carrying FEC repair data generated from the one or more source objects in the same interval of time as packets carrying data for the one or more source objects.

30. The method of claim 1, wherein:
each of the source objects in the collection of related source objects is associated with a corresponding repair object; and
transmitting the source objects in the collection of related source objects associated with the single flow over the broadcast network comprises:
transmitting the source objects independent of their corresponding repair objects.

31. The method of claim 30, further comprising:
using session description protocol (SDP) information to distinguish a source object from its corresponding repair object.

32. The method of claim 1, wherein at least one source object in the collection of related source objects includes a byte range of a file.

33. The method of claim 32, wherein a uniform resource locator (URL) is associated with the file, the method further comprising:
identifying the at least one source object via the URL and the byte range.

34. The method of claim 1, wherein at least one source object in the collection of related source objects is a file.

35. The method of claim 34, wherein a uniform resource locator (URL) is associated with the file, the method further comprising:
identifying the at least one source object via the URL.

36. The method of claim 1, wherein at least one source object in the collection of related source objects includes a hypertext transfer protocol (HTTP) header and a byte range of a file.

37. The method of claim 36, wherein at least some of the source objects includes an HTTP header, an associated file, and an HTTP trailer.

38. The method of claim 1, further comprising:
determining a flow declaration that includes information suitable for signaling relationships between a location, name, availability time, or other metadata for the collection of source objects associated with the single flow.

39. The method of claim 1, wherein transmitting the collection of related source objects comprises transmitting the collection of related source objects via multimedia broadcast multicast services (MBMS).

40. The method of claim 1, wherein transmitting the collection of related source objects comprises transmitting the collection of related source objects via file delivery over unidirectional transport (FLUTE).

41. The method of claim 1, wherein transmitting the collection of related source objects comprises transmitting the source objects without transmitting forward error correction (FEC) signaling information.

42. The method of claim 1, wherein at least some of the source objects comprise an hypertext transfer protocol (HTTP) header and a byte range of a file.

43. A device, comprising:
a processor configured with processor-executable instructions to perform operations comprising:
associating a collection of related source objects with a single flow;
determining a flow identifier for the flow, wherein the flow identifier indicates the association of the collection of related source objects with the single flow and the flow identifier is the same for all source objects in the collection of related source objects associated with the single flow;
including both a transport session identifier and the flow identifier in a packet that includes data of at least one source object in the collection of related source objects associated with the single flow and a transmission object identifier (TOI) of the at least one source object in the collection of related source objects associated with the single flow; and
transmitting source objects in the collection of related source objects associated with the single flow over a broadcast network.

44. The device of claim 43, wherein the processor is configured with processor-executable instructions to perform operations further comprising:
including a byte range in the packet that identifies data of a source object in the packet.

45. The device of claim 43, wherein the processor is configured with processor-executable instructions to perform operations such that including the flow identifier in the packet comprises including the flow identifier in a transmission session identifier (TSI) field of the packet.

46. The device of claim 43, wherein the processor is configured with processor-executable instructions to perform operations such that including the flow identifier in the packet comprises including the flow identifier in a combination of an Internet protocol (IP) destination address field and a user datagram protocol (UDP) port number field.

47. The device of claim 43, wherein the processor is configured with processor-executable instructions to perform operations such that including the flow identifier in the packet comprises including the flow identifier in a codepoint (CP) field of a data packet.

48. The device of claim 43, wherein the processor is configured with processor-executable instructions to perform operations such that:
transmitting the collection of related source objects comprises transmitting a plurality of collections of related source objects, each collection being associated with one of a plurality of different flows, each of the plurality of different flows including a unique flow identifier; and
including the flow identifier in the packet that includes data of at least one source object in the collection of related source objects associated with the single flow comprises including the unique flow identifier of the single flow in the packet that includes data of that source object.

49. The device of claim 48,
wherein the processor is configured with processor-executable instructions to perform operations such that transmitting the collection of related source objects comprises transmitting at least one packet that includes forward error correction (FEC) repair data, a repair flow identifier, and a repair object identifier, and
wherein the processor is configured with processor-executable instructions to perform operations further comprising:
associating a repair flow with one or more of the plurality of different flows;
determining the repair flow identifier for the repair flow; and
determining a collection of repair object identifiers for the repair flow.

50. The device of claim 49, wherein the processor is configured with processor-executable instructions to perform operations further comprising including the repair flow identifier in a transmission session identifier (TSI) field.

51. The device of claim 49, wherein the processor is configured with processor-executable instructions to perform operations further comprising including the repair flow identifier in the combination of an Internet protocol (IP) destination address field and a user datagram protocol (UDP) port number field.

52. The device of claim 49, wherein the processor is configured with processor-executable instructions to perform operations further comprising including the repair flow identifier in a codepoint (CP) field.

53. The device of claim 49, wherein the repair object identifier is a second TOI.

54. The device of claim 49, wherein the processor is configured with processor-executable instructions to perform operations further comprising including the repair object identifier in an object sequence number (OSN).

55. The device of claim 49, wherein the processor is configured with processor-executable instructions to perform operations such that transmitting at least one packet that includes FEC repair data comprises:
transmitting at least one packet that includes FEC repair data in the same time interval as the packet that includes data for a corresponding source object.

56. The device of claim 49, wherein the processor is configured with processor-executable instructions to perform operations further comprising:
generating FEC repair data for packets having the same repair flow identifier and same repair object identifier from two source objects in different flows such that an amount of data received in combination from the packets having the same repair flow identifier and same repair object identifier and from packets containing data for either of the two source objects that is greater than or equal to an aggregate size of the two source objects is sufficient to decode the two source objects.

57. The device of claim 49, wherein the processor is configured with processor-executable instructions to perform operations further comprising including portions of the repair flow identifier in different data fields of the packet that includes FEC repair data.

58. The device of claim 49, wherein the processor is configured with processor-executable instructions to perform operations further comprising:
determining a repair flow declaration that includes information suitable for signaling a relationship between the repair object identifier in the packet that includes FEC repair data and source objects from the collection of related source objects associated with the single flow from which the FEC repair data in the packet is generated.

59. The device of claim 58, wherein the processor is configured with processor-executable instructions to perform operations further comprising:
using a template to signal the relationship via the repair flow declaration.

60. The device of claim 58, wherein the processor is configured with processor-executable instructions to perform operations further comprising transmitting a portion of the repair flow declaration to the receiver device in advance of at least one source object associated with one or more of the plurality of different flows associated with the repair flow.

61. The device of claim 43, wherein the processor is configured with processor-executable instructions to perform operations further comprising:
determining a source object identifier for each source object in the collection of related source objects; and
including the source object identifier in one or more packets that include data for the source objects.

62. The device of claim 61, wherein the processor is configured with processor-executable instructions to perform operations further comprising:
using a combination of the flow identifier and the source object identifier to identify a corresponding source object in the collection of related source objects.

63. The device of claim 61, wherein the processor is configured with processor-executable instructions to perform operations such that including the source object identifier in the packet that includes data comprises:
including the source object identifier in the packet such that a combination of the flow identifier and the source object identifier identifies a corresponding source object for which the packet carries data.

64. The device of claim 61, wherein the processor is configured with processor-executable instructions to perform operations further comprising:
setting a transmission object identifier (TOI) as the source object identifier.

65. The device of claim 61, wherein the processor is configured with processor-executable instructions to perform operations further comprising:
setting an object sequence number (OSN) as the source object identifier.

66. The device of claim 61, wherein the processor is configured with processor-executable instructions to perform operations further comprising:
transmitting forward error correction (FEC) repair data for the collection of related source objects associated with the single flow over the broadcast network such that the source objects can be received and recovered by a receiver device based on their relationship to each other,
wherein each packet that includes FEC repair data for one or more of related source objects associated with the single flow includes the source flow identifier identifying the single flow for which the packet includes FEC repair data,
wherein each packet that includes FEC repair data for one or more of the related source objects associated with the single flow carries one or more source object identifiers of one or more source objects from which the FEC repair data carried in the packet is generated, and
wherein a combination of the flow identifier and one or more source object identifiers identifies one or more source objects from the collection of related source objects associated with the single flow from which the FEC repair data carried in the packet is generated.

67. The device of claim 66, wherein the processor is configured with processor-executable instructions to perform operations further comprising transmitting packets carrying FEC repair data generated from the one or more source objects in the same interval of time as packets carrying data for the one or more source objects.

68. The device of claim 43, wherein each of the source objects in the collection of related source objects is associated with a corresponding repair object, and wherein the processor is configured with processor-executable instructions to perform operations such that transmitting the source objects in the collection of related source objects associated with the single flow over the broadcast network comprises:
transmitting the source objects independent of their corresponding repair objects.

69. The device of claim 68, wherein the processor is configured with processor-executable instructions to perform operations further comprising:
using session description protocol (SDP) information to distinguish a source object from its corresponding repair object.

70. The device of claim 43, wherein the processor is configured with processor-executable instructions to perform operations further comprising including a byte range of a file in at least one source object in the collection of related source objects.

71. The device of claim 70, wherein the processor is configured with processor-executable instructions to perform operations further comprising:
associating a uniform resource locator (URL) with the file; and
identifying the at least one source object via the URL and the byte range.

72. The device of claim 43, wherein the processor is configured with processor-executable instructions to perform operations further comprising including a file in at least one source object in the collection of related source objects.

73. The device of claim 72, wherein the processor is configured with processor-executable instructions to perform operations further comprising:
associating a uniform resource locator (URL) with the file; and
identifying the at least one source object via the URL.

74. The device of claim 43, wherein the processor is configured with processor-executable instructions to perform operations further comprising including a hypertext transfer protocol (HTTP) header and a byte range of a file in at least one source object in the collection of related source objects.

75. The device of claim 74, wherein the processor is configured with processor-executable instructions to perform operations further comprising including an HTTP header, an associated file, and an HTTP trailer in at least some of the source objects.

76. The device of claim 43, wherein the processor is configured with processor-executable instructions to perform operations further comprising:
determining a flow declaration for a collection of source objects associated with the single flow such that the flow declaration includes information suitable for signaling relationships between a location, name, availability time, or other metadata for the collection of source objects associated with the single flow.

77. The device of claim 43, wherein the processor is configured with processor-executable instructions to perform operations such that transmitting the collection of related source objects comprises transmitting the collection of related source objects via multimedia broadcast multicast services (MBMS).

78. The device of claim 43, wherein the processor is configured with processor-executable instructions to perform operations such that transmitting the collection of related source objects comprises transmitting the collection of related source objects via file delivery over unidirectional transport (FLUTE).

79. The device of claim 43, wherein the processor is configured with processor-executable instructions to perform operations such that transmitting the collection of related source objects comprises transmitting the source objects without transmitting forward error correction (FEC) signaling information.

80. The device of claim 43, wherein the processor is configured with processor-executable instructions to perform operations further comprising including a hypertext transfer protocol (HTTP) header and a byte range of a file in at least some of the source objects.

81. A communication system, comprising:
a transmitter; and
a computing device coupled to the transmitter and configured with processor-executable instructions to perform operations comprising:
associating a collection of related source objects with a single flow;
determining a flow identifier for the single flow, wherein the flow identifier indicates the association of the collection of related source objects with the single flow and the flow identifier is the same for all source objects in the collection of related source objects associated with the single flow;
including both a transport session identifier and the flow identifier in a packet that includes data of at least one source object in the collection of related source objects associated with the single flow and a transmission object identifier (TOI) of the at least one source object in the collection of related source objects associated with the single flow; and
transmitting the source objects in the collection of related source objects associated with the single flow over a broadcast network.

82. A non-transitory computer-readable storage medium having stored thereon processor-executable software instructions configured to cause a computing device within a communication system to perform operations for communicating information via a broadcast network, the operations comprising:
associating a collection of related source objects with a single flow;
determining a flow identifier for the single flow, wherein the flow identifier indicates the association of the collection of related source objects with the single flow and the flow identifier is the same for all source objects in the collection of related source objects associated with the single flow;
including both a transport session identifier and the flow identifier in a packet that includes data of at least one source object in the collection of related source objects associated with the single flow and a transmission object identifier (TOI) of the at least one source object in the collection of related source objects associated with the single flow; and
transmitting the source objects in the collection of related source objects associated with the single flow over the broadcast network.

\* \* \* \* \*